(12) United States Patent
Zhou et al.

(10) Patent No.: US 12,362,402 B2
(45) Date of Patent: Jul. 15, 2025

(54) BATTERY MODULE, CHARGING MODULE, AND ELECTRONIC DEVICE THAT SUPPORT HIGH-POWER FAST CHARGING

(71) Applicant: Honor Device Co., Ltd., Shenzhen (CN)

(72) Inventors: Haibin Zhou, Shenzhen (CN); Zhongyong He, Shenzhen (CN); Chen Zhu, Shenzhen (CN); Yupeng Qiu, Shenzhen (CN); Zhangrong Hu, Shenzhen (CN); Fan Xu, Shenzhen (CN); Jiahua Liang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 642 days.

(21) Appl. No.: 17/763,476

(22) PCT Filed: Sep. 21, 2020

(86) PCT No.: PCT/CN2020/116363
§ 371 (c)(1),
(2) Date: Mar. 24, 2022

(87) PCT Pub. No.: WO2021/057632
PCT Pub. Date: Apr. 1, 2021

(65) Prior Publication Data
US 2022/0344733 A1    Oct. 27, 2022

(30) Foreign Application Priority Data

Sep. 25, 2019 (CN) .......................... 201910916013.6
Oct. 17, 2019 (CN) .......................... 201910990087.4
May 19, 2020 (CN) .......................... 202010426700.2

(51) Int. Cl.
*H01M 10/46* (2006.01)
*H01M 10/42* (2006.01)
(Continued)

(52) U.S. Cl.
CPC ......... *H01M 10/46* (2013.01); *H01M 10/425* (2013.01); *H01M 10/44* (2013.01);
(Continued)

(58) Field of Classification Search
CPC .... H01M 10/46; H01M 10/425; H01M 10/44; H01M 10/48; H01M 50/531; H02J 7/0042; H02J 7/0047
(Continued)

(56) References Cited

U.S. PATENT DOCUMENTS 11,075,542 B2    7/2021  Wan
11,335,977 B1*   5/2022  Zeng ...................... H01M 4/64
(Continued)

FOREIGN PATENT DOCUMENTS

CN    102916143 A    2/2013
CN    206076978 U    4/2017
(Continued)

OTHER PUBLICATIONS

Yang Yiyun et al; "Analysis on Li-Ion Battery Internal Resistance Connected in Series for BMS";Measurement & Control Technology;Dec. 31, 2014;pp. 4(with English abstract).
(Continued)

*Primary Examiner* — Nathaniel R Pelton
(74) *Attorney, Agent, or Firm* — Slater Matsil, LLP

(57) ABSTRACT

A battery module includes a battery cell, and the battery cell includes a battery cell body, a first tab, a second tab, and a third tab. The first tab, the second tab, and the third tab are separately electrically connected to the battery cell body. The first tab and the third tab have a first polarity, and the second tab has a second polarity. Working together, the second tab and the first tab are capable of inputting a voltage and a current to the battery cell body or capable of outputting a voltage and a current from the battery cell body. Working
(Continued)

together, the second tab and the third tab are capable of inputting a voltage and a current to the battery cell body or capable of outputting a voltage and a current from the battery cell body. The first polarity is different from the second polarity.

18 Claims, 52 Drawing Sheets

(51) Int. Cl.
*H01M 10/44* (2006.01)
*H01M 10/48* (2006.01)
*H01M 50/531* (2021.01)
*H02J 7/00* (2006.01)

(52) U.S. Cl.
CPC ......... *H01M 10/48* (2013.01); *H01M 50/531* (2021.01); *H02J 7/0042* (2013.01); *H02J 7/0047* (2013.01)

(58) Field of Classification Search
USPC .......................................................... 320/107
See application file for complete search history.

(56) References Cited

U.S. PATENT DOCUMENTS

| | | |
|---|---|---|
| 2005/0084745 A1 | 4/2005 | Colello et al. |
| 2009/0325042 A1 | 12/2009 | William et al. |
| 2014/0356698 A1 | 12/2014 | Kong |
| 2018/0219195 A1* | 8/2018 | Enomoto ............ H01M 50/567 |
| 2018/0248235 A1 | 8/2018 | Kim et al. |
| 2018/0342759 A1 | 11/2018 | Kuan et al. |
| 2019/0222039 A1 | 7/2019 | Liu et al. |
| 2020/0099257 A1* | 3/2020 | Qiu .................... H02J 7/00712 |
| 2022/0123396 A1 | 4/2022 | Lu et al. |
| 2022/0344733 A1 | 10/2022 | Zhou et al. |

FOREIGN PATENT DOCUMENTS

| | | |
|---|---|---|
| CN | 106936190 A | 7/2017 |
| CN | 206639877 U | 11/2017 |
| CN | 207530023 U | 6/2018 |
| CN | 207765557 U | 8/2018 |
| CN | 108598354 A | 9/2018 |
| CN | 108649261 A | 10/2018 |
| CN | 108987655 A | 12/2018 |
| CN | 208352420 U | 1/2019 |
| CN | 109786844 A | 5/2019 |
| CN | 109830766 A | 5/2019 |
| CN | 109904511 A | 6/2019 |
| CN | 110212148 A | 9/2019 |
| CN | 109950959 B | 11/2021 |
| CN | 115275365 A | 11/2022 |
| JP | H1167188 A | 3/1999 |
| JP | 2015512119 A | 4/2015 |
| KR | 20170068730 A | 6/2017 |
| RU | 2506603 C2 | 2/2014 |
| WO | 2013010473 A1 | 1/2013 |
| WO | 2016187815 A1 | 12/2016 |
| WO | 2018184583 A1 | 10/2018 |
| WO | 2019174653 A2 | 9/2019 |

OTHER PUBLICATIONS

Wang Chenxu et al;"Effect of structure design on performance of lithium-ion battery";Chinese Journal of Power Sources;Aug. 31, 2018;pp. 3(with English abstract).

* cited by examiner

BATTERY MODULE, CHARGING MODULE, AND ELECTRONIC DEVICE THAT SUPPORT HIGH-POWER FAST CHARGING

CROSS-REFERENCE TO RELATED APPLICATIONS

This patent application is a national phase filing under section 371 of PCT/CN2020/116363, filed Sep. 21, 2020, which application claims priority to Chinese Patent Application No. 201910916013.6, filed with the China National Intellectual Property Administration on Sep. 25, 2019 and entitled "BATTERY AND ELECTRONIC DEVICE THAT SUPPORT HIGH-POWER FAST CHARGING", Chinese Patent Application No. 201910990087.4, filed with the China National Intellectual Property Administration on Oct. 17, 2019 and entitled "BATTERY MODULE, CHARGING MODULE, AND ELECTRONIC DEVICE THAT SUPPORT HIGH-POWER FAST CHARGING", and Chinese Patent Application No. 202010426700.2, filed with the China National Intellectual Property Administration on May 19, 2020 and entitled "BATTERY MODULE, CHARGING MODULE, AND ELECTRONIC DEVICE THAT SUPPORT HIGH-POWER FAST CHARGING", which are incorporated herein by reference in their entireties.

TECHNICAL FIELD

Embodiments of this application relate to charging technologies, and in particular, to a battery module, a charging module, and an electronic device that support high-power fast charging.

BACKGROUND

A charging system currently used in an electronic terminal includes a processing circuit and a battery cell. The processing circuit processes a charging voltage and a charging current that are received from the outside, and provides the processed charging voltage and the processed charging current to the battery cell. The battery cell stores electrical energy based on the charging voltage and the charging current. In the conventional technology, each battery cell includes a tab having a positive polarity and a tab having a negative polarity. The tab having a positive polarity and the tab having a negative polarity provide a charging path and a discharge path for the battery cell.

As demands for fast charging of battery cells increase, to resolve a fast charging problem, more battery cells and more processing circuits may be added to the charging system in the conventional technology to increase a charging speed. However, the battery cells and the processing circuits need to occupy additional physical space, resulting in failure to meet a restriction of the electronic terminal on layout space. Therefore, if no battery cells are added, charging and discharge currents of a single battery cell need to be increased to improve charging efficiency. However, increasing the charging and discharge currents of a single battery cell easily results in a sharp increase in an amount of heat generated by the tabs, and consequently, the processing circuit and the battery cell cannot meet a restriction of the electronic terminal on an amount of heat generated.

SUMMARY OF THE INVENTION

To resolve the foregoing problem, embodiments of this application provide a battery module, a charging module, and an electronic device that support high-power fast charging, featuring a relatively small amount of heat generated and relatively small space occupied.

An embodiment of this application provides a battery module. The battery module includes a battery cell. The battery cell includes a battery cell body, a first tab, a second tab, and a third tab. The first tab, the second tab, and the third tab are separately electrically connected to the battery cell body, the first tab and the third tab have a first polarity, and the second tab has a second polarity.

Working together, the second tab and the first tab are capable of inputting a voltage and a current to the battery cell body or capable of outputting a voltage and a current from the battery cell body. Working together, the second tab and the third tab are capable of inputting a voltage and a current to the battery cell body or capable of outputting a voltage and a current from the battery cell body. The first polarity and the second polarity are polarities opposite to each other. When the first polarity is a positive polarity, the second polarity is a negative polarity. When the first polarity is a negative polarity, the second polarity is a positive polarity.

For the battery cell, the three tabs provided constitute at least two conductive paths for charging, thereby effectively improving charging efficiency of the battery cell. In addition, because the two conductive paths divide the charging current, a current transmitted in each tab is effectively reduced, and an amount of heat generated by each tab is further effectively reduced.

In an embodiment of this application, a first battery protection board is further included. The first battery protection board includes a first protection circuit, a first battery interface, and a second battery interface. The first battery interface and the second battery interface are configured to be electrically connected to a component outside the battery module.

The first battery interface is separately electrically connected to the second tab and the first tab by using the first protection circuit, and the first battery interface, the first tab, the battery cell body, the second tab, and the first protection circuit constitute a first conductive loop. The second battery interface is separately electrically connected to the second tab and the third tab by using the first protection circuit, and the second battery interface, the third tab, the battery cell body, the second tab, and the first protection circuit constitute a second conductive loop.

The first protection circuit is configured to detect voltages and currents that are in the first conductive loop and the second conductive loop, and when the voltages or the currents exceed a threshold range, the first protection circuit disconnects the first conductive loop and the second conductive loop.

The first battery protection board and the three tabs constitute two conductive loops to charge the battery cell. In addition, the first battery protection board detects, by using the first protection circuit, the charging current or a discharge current that is of the battery cell, to prevent the battery cell from being damaged due to overvoltage, undervoltage, or overcurrent during charging and discharging, thereby ensuring safety of the battery cell.

In an embodiment of this application, the first tab, the second tab, and the third tab are all disposed on a first side of the battery cell body; the first tab and the second tab are disposed on a first side of the battery cell body, and the third tab is disposed on a second side of the battery cell body; the first tab and the third tab are disposed on a first side of the battery cell body, and the second tab is disposed on a second side of the battery cell body; or the first tab is disposed on a first side of the battery cell body, the second tab is disposed on a second side of the battery cell body, and the third tab is disposed on a third side of the battery cell body.

Disposition of the three tabs is not limited by specific positions on the battery cell body. Positions at which the tabs are disposed may be adjusted based on an actual requirement, to ensure coordination between the battery cell and another circuit, thereby reducing wiring complexity and improving integration of a charging module.

In an embodiment of this application, the first tab, the second tab, and the third tab are all disposed on a first side of the battery cell body, and the first tab and the third tab are disposed on two sides of the second tab, respectively.

The three tabs are disposed on the same side of the battery cell, and the two tabs that have the same first polarity are disposed on the two sides of the one tab that has the second polarity, so that connection wiring between the two tabs and the first battery protection board is relatively even and simple.

In an embodiment of this application, a fourth tab, a fifth tab, and a sixth tab are further included. The fourth tab, the fifth tab, and the sixth tab are separately electrically connected to the battery cell body. The fourth tab and the sixth tab have the first polarity, and the fifth tab has the second polarity, or the fourth tab and the sixth tab have the second polarity, and the fifth tab has the first polarity.

Working together, the fifth tab and the fourth tab are capable of inputting a voltage and a current to the battery cell body or capable of outputting a voltage and a current from the battery cell body.

Working together, the fifth tab and the sixth tab are capable of inputting a voltage and a current to the battery cell body or capable of outputting a voltage and a current from the battery cell body.

For the battery cell, the six tabs provided constitute at least four conductive paths for charging, thereby further improving charging efficiency of the battery cell. In addition, because the four conductive paths divide the charging current to a larger degree, a current transmitted in each tab is effectively reduced, and an amount of heat generated by each tab is further effectively reduced.

In an embodiment of this application, a second battery protection board is further included. The second battery protection board includes a second protection circuit, a third battery interface, and a fourth battery interface. The third battery interface and the fourth battery interface are configured to be electrically connected to a component outside the battery module.

The third battery interface is separately electrically connected to the fifth tab and the fourth tab by using the second protection circuit, and the third battery interface, the fourth tab, the battery cell body, the fifth tab, and the second protection circuit constitute a third conductive loop. The fourth battery interface is separately electrically connected to the fifth tab and the sixth tab by using the second protection circuit, and the fourth battery interface, the sixth tab, the battery cell body, the fifth tab, and the second protection circuit constitute a fourth conductive loop.

The second protection circuit is configured to detect voltages and currents that are in the third conductive loop and the fourth conductive loop, and when the voltages or the currents exceed a threshold range, the second protection circuit disconnects the third conductive loop and the fourth conductive loop.

The second battery protection board and the other three tabs constitute other two conductive loops to charge the battery cell. In addition, the second battery protection board detects, by using the second protection circuit, the charging current or the discharge current that is of the battery cell, to prevent the battery cell from being damaged due to overvoltage, undervoltage, or overcurrent during charging and discharging, thereby ensuring safety of the battery cell.

In an embodiment of this application, the first protection circuit and the second protection circuit have a same circuit structure. Therefore, protection for the battery cell is basically consistent and synchronized, thereby further ensuring safety of the battery cell.

In an embodiment of this application, the first tab, the second tab, and the third tab are all disposed on the first side of the battery cell body, and the fourth tab, the fifth tab, and the sixth tab are all disposed on the second side of the battery cell body. The first side of the battery cell body and the second side of the battery cell body are two opposite sides of the battery cell body, or the first side of the battery cell body and the second side of the battery cell body are two adjacent sides of the battery cell body.

Three tabs are disposed on one side of the battery cell, and the other three tabs are disposed on the other side of the battery cell, with two tabs that have the same first polarity disposed on two sides of one tab that has the second polarity. In this way, connection wiring between two tabs and the first battery protection board is relatively even and simple, and the tabs have larger heat dissipation space and more even heat dissipation.

In an embodiment of this application, the first protection circuit includes a first protection control unit, a first sampling unit, and a first switch unit. The first protection control unit is separately electrically connected to the first conductive loop and the second conductive loop, and the first protection control unit detects the voltages in the first conductive loop and the second conductive loop. The first sampling unit is separately electrically connected to the second tab, the first protection control unit, and the first switch unit, and the first protection control unit detects the currents in the first conductive loop and the second conductive loop by using the first sampling unit. The first switch unit is separately electrically connected to the first protection control unit, the first sampling unit, the first battery interface, and the second battery interface. When determining that the voltage or current in the first conductive loop or the second conductive loop exceeds a first threshold range, the first protection control unit is configured to control the switch unit to cut off, to disconnect the first conductive loop and the second conductive loop.

Whether a voltage and a current that are transmitted in each tab exceed corresponding threshold ranges can be accurately determined based on the currents in the two conductive loops detected by the first sampling unit and the voltages collected by the first protection control unit. In addition, when the voltage and the current that are transmitted in each tab exceed the corresponding threshold ranges, the conductive loop connected to the tab is disconnected in a timely manner, thereby ensuring safety of the battery cell.

In an embodiment of this application, the first switch unit includes a first switch and a second switch, the first switch is located in the first conductive loop, and the second switch is located in the second conductive loop. The conductive loops connected to the tabs can be easily and timely disconnected by using the two switches.

In an embodiment of this application, the first protection circuit further includes a second protection control unit and a second switch unit.

The second protection control unit is separately electrically connected to the first conductive loop and the second conductive loop, and the second protection control unit detects the voltages in the first conductive loop and the second conductive loop.

The second protection control unit is electrically connected to the first sampling unit, and configured to detect the currents in the first conductive loop and the second conductive loop by using the first sampling unit.

The second switch unit is separately electrically connected to the second protection control unit, the first switch unit, the first battery interface, and the second battery interface.

When determining that the voltage or current in the first conductive loop or the second conductive loop exceeds a second threshold range, the second protection control unit is configured to control the second switch unit to cut off, to disconnect the first conductive loop and the second conductive loop.

Specifically, the first threshold range is the same as the second threshold range, or the first threshold range is less than or greater than the second threshold range.

When the first protection circuit fails, the second protection control unit and the second switch unit can replace the first protection control unit and the first switch unit in the first protection circuit in a timely manner to protect the battery cell. In other words, the first protection circuit and the second protection circuit can replace each other and work synchronously, thereby further improving reliability of protection for the battery cell.

In an embodiment of this application, the second switch unit includes a third switch and a fourth switch, the third switch is located in the first conductive loop, and the fourth switch is located in the second conductive loop. The conductive loops connected to the tabs can be easily and timely disconnected by using the two switches.

In an embodiment of this application, the battery cell body is of a winding structure. The battery cell includes one first electrode plate that has the first polarity and one second electrode plate that has the second polarity. The first tab and the third tab are disposed on the first electrode plate, and the second tab is disposed on the second electrode plate. The first electrode plate and the second electrode plate are wound to form the battery cell with three tabs, and the first tab, the second tab, and the third tab are at different positions on the battery cell. A plurality of tabs are separately disposed on different electrode plates, and the electrode plates are wound to form the battery cell. This effectively simplifies a manufacturing process of the three tabs.

In an embodiment of this application, the battery cell is of a winding structure. The battery cell includes one first electrode plate that has the first polarity and one second electrode plate that has the second polarity. The first tab, the third tab, the fourth tab, and the sixth tab are disposed on the first electrode plate, and the second tab and the fifth tab are disposed on the second electrode plate. The first electrode plate and the second electrode plate are wound to form the battery cell with six tabs, and the first tab, the second tab, the third tab, the fourth tab, the fifth tab, and the sixth tab are at different positions on the battery cell. A plurality of tabs are separately disposed on different electrode plates, and the electrode plates are wound to form the battery cell. This effectively simplifies a manufacturing process of the six tabs.

In an embodiment of this application, the battery cell is of a laminated structure. The battery cell includes at least two first electrode plates that have the first polarity and at least two second electrode plates that have the second polarity. A first sub-tab and a third sub-tab are disposed on each first electrode plate, and a second sub-tab is disposed on each second electrode plate. All the first electrode plates and all the second electrode plates are laminated to form the battery cell, all the first sub-tabs are electrically connected to form the first tab, all the second sub-tabs are electrically connected to form the second tab, all the third sub-tabs are electrically connected to form the third tab, and the first tab, the second tab, and the third tab are at different positions on the battery cell. A plurality of tabs are separately disposed on different electrode plates, and the electrode plates are sequentially stacked to form the battery cell. This effectively simplifies a manufacturing process of the three tabs.

In an embodiment of this application, the battery cell is of a laminated structure. The battery cell includes at least two first electrode plates that have the first polarity and at least two second electrode plates that have the second polarity. A first sub-tab, a third sub-tab, a fourth sub-tab, and a sixth sub-tab are disposed on each first electrode plate, and a second sub-tab and a fifth sub-tab are disposed on each second electrode plate. All the first electrode plates and all the second electrode plates are laminated to form the battery cell, all the first sub-tabs are electrically connected to form the first tab, all the second sub-tabs are electrically connected to form the second tab, all the third sub-tabs are electrically connected to form the third tab, all the fourth sub-tabs are electrically connected to form the fourth tab, all the fifth sub-tabs are electrically connected to form the fifth tab, all the sixth sub-tabs are electrically connected to form the sixth tab, and the first tab, the second tab, the third tab, the fourth tab, the fifth tab, and the sixth tab are at different positions on the battery cell. A plurality of tabs are separately disposed on different electrode plates, and the electrode plates are sequentially stacked to form the battery cell. This effectively simplifies a manufacturing process of the six tabs.

In an embodiment of this application, the battery cell includes a battery cell body, a first tab, a second tab, a third tab, and a fourth tab. The first tab, the second tab, the third tab, and the fourth tab are separately electrically connected to the battery cell body, the first tab and the third tab have a first polarity, and the second tab and the fourth tab have a second polarity. Working together, the second tab and the first tab are capable of inputting a voltage and a current to the battery cell body or capable of outputting a voltage and a current from the battery cell body. Working together, the fourth tab and the third tab are capable of inputting a voltage and a current to the battery cell body or capable of outputting a voltage and a current from the battery cell body. The first polarity is a positive polarity, and the second polarity is a negative polarity; or the first polarity is a negative polarity, and the second polarity is a positive polarity.

For the battery cell, the four tabs provided constitute at least two conductive paths for charging, thereby effectively improving charging efficiency of the battery cell. In addition, because the two conductive paths are separate from each other and divide a charging current, a current transmitted in each tab is effectively reduced, and an amount of heat generated by each tab is further effectively reduced.

In an embodiment of this application, the first tab and the second tab are disposed on a first side of the battery cell body, and the third tab and the fourth tab are disposed on a second side of the battery cell body; or the first tab is disposed on a first side of the battery cell body, and the second tab, the third tab, and the fourth tab are disposed on a second side of the battery cell body.

In an embodiment of this application, the battery module further includes a first battery protection board and a second battery protection board. The first battery protection board includes a first protection circuit and a first battery interface, and the second battery protection board includes a second protection circuit and a second battery interface. The first battery interface is separately electrically connected to the second tab and the first tab by using the first protection circuit, and the first battery interface, the first tab, the battery cell body, the second tab, and the first protection circuit constitute a first conductive loop. The second battery interface is separately electrically connected to the third tab and the fourth tab by using the second protection circuit, and the second battery interface, the third tab, the battery cell body, the fourth tab, and the second protection circuit constitute a second conductive loop. The first protection circuit is configured to detect a voltage and a current that are in the first conductive loop, and when the voltage or the current exceeds a threshold range, the first protection circuit disconnects the first conductive loop. The second protection circuit is configured to detect a voltage and a current that are in the second conductive loop, and when the voltage or the current exceeds a threshold range, the second protection circuit disconnects the second conductive loop.

In an embodiment of this application, the battery cell is of a winding structure. The battery cell body includes one first electrode plate that has the first polarity and one second electrode plate that has the second polarity. The first tab and the third tab are disposed on the first electrode plate, and the second tab and the fourth tab are disposed on the second electrode plate. The first electrode plate and the second electrode plate are wound to form the battery cell body with four tabs, and the first tab, the second tab, the third tab, and the fourth tab are at different positions on the battery cell body. A plurality of tabs are separately disposed on different electrode plates, and the electrode plates are wound to form the battery cell. This effectively simplifies a manufacturing process of the four tabs.

In an embodiment of this application, the battery cell body is of a laminated structure. The battery cell body includes at least two first electrode plates that have the first polarity and at least two second electrode plates that have the second polarity. A first sub-tab and a third sub-tab are disposed on each first electrode plate, and a second sub-tab and a fourth sub-tab are disposed on each second electrode plate. All the first electrode plates and all the second electrode plates are laminated to form the battery cell body, all the first sub-tabs are electrically connected to form the first tab, all the second sub-tabs are electrically connected to form the second tab, all the third sub-tabs are electrically connected to form the third tab, and all the fourth sub-tabs are electrically connected to form the fourth tab. The first tab, the second tab, the third tab, and the fourth tab are at different positions on the battery cell body. A plurality of tabs are separately disposed on different electrode plates, and the electrode plates are sequentially stacked to form the battery cell. This effectively simplifies a manufacturing process of the four tabs.

In an embodiment of this application, a charging module is provided, including the foregoing battery module and a circuit board. The circuit board is electrically connected to the battery module. The circuit board is configured to: receive a first charging voltage provided by the outside, convert the charging voltage into the voltage and current, and output the voltage and current to the battery module. In the charging module, because the battery cell in the battery module includes at least two conductive paths for charging by using tabs, charging paths of the battery cell are effectively added, a current borne by each tab is effectively reduced, and an amount of heat generated by each tab is effectively reduced while a charging time is shortened.

In an embodiment of this application, the circuit board includes a first circuit board and a third circuit board. The first circuit board includes an interface configured to receive the first charging voltage, and the first circuit board converts the first charging voltage into a second charging voltage, and transmits the second charging voltage to the third circuit board. The third circuit board is electrically connected to the battery module, and configured to convert the second charging voltage into the voltage and output the voltage to the battery module. The first circuit board and the third circuit board work together to process the received charging voltage into the voltage appropriate for use by the battery cell during charging, thereby ensuring safety of the battery cell during charging.

In an embodiment of this application, the circuit board includes a first circuit board and a third circuit board. The first circuit board includes an interface configured to receive the first charging voltage, and the first circuit board transmits the first charging voltage to the third circuit board. The third circuit board is electrically connected to the battery module, and configured to convert the first charging voltage into the voltage and output the voltage to the battery module. The first circuit board and the third circuit board work together to process the received charging voltage into the voltage appropriate for use by the battery cell during charging, thereby ensuring safety of the battery cell during charging.

In an embodiment of this application, the circuit board further includes a second circuit board. The first circuit board and the third circuit board are disposed on two opposite sides of the battery module, and the second circuit board is separately electrically connected to the first circuit board and the third circuit board across the battery cell body. The first circuit board and the third circuit board are connected by using the second circuit board, thereby ensuring flexibility in determining positions of the first circuit board and the third circuit board.

In an embodiment of this application, the charging module is configured to provide an operating power supply for a functional circuit.

In an embodiment of this application, an electronic device is provided, including a functional circuit and the foregoing charging module. The charging module is configured to provide an operating power supply for the functional circuit.

In an embodiment of this application, a battery cell is of a winding structure. The winding battery cell includes one positive electrode plate and one negative electrode plate. A positive tab and a negative tab are separately disposed on the positive electrode plate and the negative electrode plate. At least two tabs having a same polarity are disposed at different positions on at least one of the positive electrode plate and the negative electrode plate. The at least two tabs having a same polarity form at least two tabs having a same polarity at different positions of the battery cell formed through winding, so that the battery cell formed through winding includes at least three tabs.

In an embodiment of this application, a battery cell is of a laminated structure. The laminated battery cell includes more than one positive electrode plate and more than one negative electrode plate. At least one positive tab and at least one negative tab are separately disposed on each positive electrode plate and each negative electrode plate. In the positive electrode plates or the negative electrode plates, at least two positive (negative) tabs are disposed at different positions on at least one positive (negative) electrode plate, or positive (negative) tabs on at least two positive (negative) electrode plates are located at different positions on the electrode plates, so that the laminated battery cell includes at least three tabs.

In an embodiment of this application, the battery cell includes at least three tabs. The three tabs are located on a same side of the battery cell, or the three tabs are separately located on different sides of the battery cell.

In the embodiments of this application, a multi-battery-interface and a multi-tab mode is used, to improve a through-current capacity of the battery cell.

In a multi-tab solution, there may be three tabs, four tabs, six tabs, or N tabs. A negative tab or a positive tab may be shared during charging and discharging. For example, in a three-tab solution, three tabs include two positive tabs and one negative tab, and the negative tab is shared (as shown in FIG. 2A); or three tabs include two negative tabs and one positive tab, and the positive tab is shared (as shown in FIG. 8). In a six-tab solution, the six tabs may double the tabs in the three-tab solution. Further, more tabs may be included, for example, eight tabs, nine tabs, or 12 tabs.

In the embodiments of this application, a charger IC (charging circuit) with an efficient differential pressure ratio (for example, 4:1 or another larger ratio) is used to perform voltage step-down. Under a condition that an external charging cable (and a PD protocol) limits an input through-current bottleneck to be 5 A, charging power is increased by increasing an input voltage.

The multi-tab solution in the embodiments of this application may use, for example, one of the following manners.

A: A mode in which a tab is added and a tab is reused (that is, the foregoing shared positive tab or shared negative tab) is used, to split a current. This reduces not only impedance of a tab but also an amount of heat generated by a battery cell body (including a battery cell and a battery protection board). Structurally, a volume of a shared tab may be increased. For example, a width, a length, and/or a thickness of the shared tab may be increased.

B: Tabs are increased. A battery cell has a structure with tabs on two sides, to increase a through-current capacity of the battery cell, including but not limited to structures such as a four-tab structure and a six-tab structure. The four-tab structure is shown in FIG. 9 below, in which there is one pair of positive and negative tabs on each of two sides of a battery cell. The six-tab structure is shown in FIG. 14A below, in which there are three tabs on each of two sides of a battery cell. FIG. 14A shows that a negative tab is shared. Similarly, a positive tab may be alternatively shared.

In solutions such as the three-tab solution and the six-tab solution in the embodiments of this application, a protection IC (that is, a protection IC in a battery protection board) may be multiplexed through tab distributing and circuit optimization, thereby implementing high-power charging for a case in which a single battery cell is used, and avoiding a safety problem existing when two battery cells are used.

In the embodiments of this application, the following problems existing when a single battery cell is used can be resolved: an insufficient through-current capacity and a large amount of heat generated, and the following problems existing when two battery cells are used can also be resolved: high costs, a need to add an additional set of protection ICs, and a large capacity loss in a case of splitting.

In the embodiments of this application, by using a plurality of tabs of a battery, an amount of heat generated by the battery cell is reduced, and a through-current capacity of the battery cell is increased. In the embodiments of this application, a protection solution of one set of protection ICs is implemented through planning of dual-battery interface current paths. When this solution is compared with a dual-battery-cell solution, costs are reduced and safety is high while an amount of heat generated by a battery cell is reduced. In the embodiments of this application, by using a plurality of tabs and a charger IC with an efficient differential pressure ratio (for example, 4:1), a higher-power charging solution is implemented, without increasing an overall amount of heat generated. In the embodiments of this application, a higher-power through-current capacity is provided by using a plurality of tabs, thereby implementing high-power charging for a case in which a single battery cell is used, and resolving a problem caused when two battery cells are used.

DETAILED DESCRIPTION OF ILLUSTRATIVE EMBODIMENTS

Figure 1:
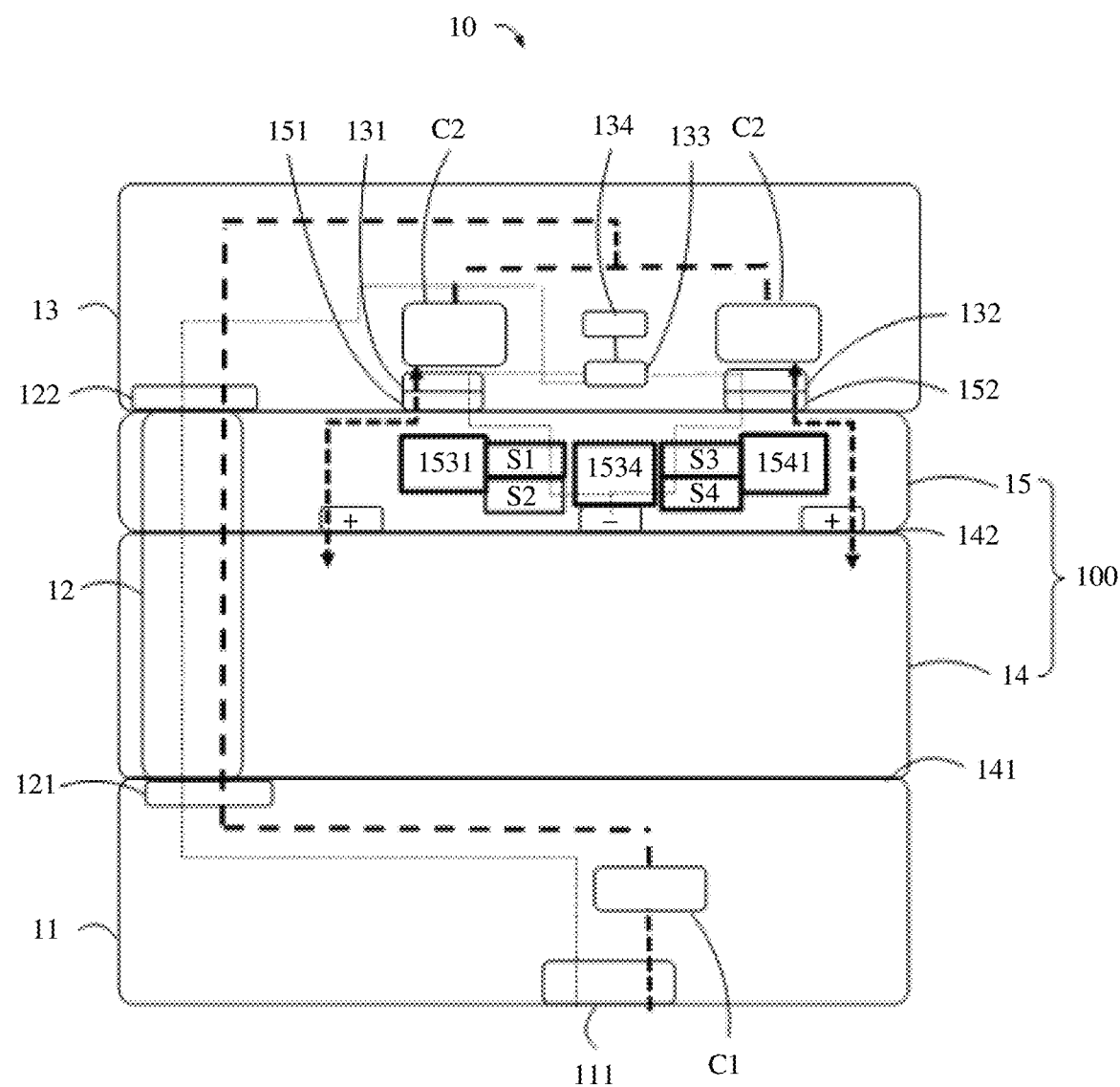
FIG. 1 is a circuit block diagram of a charging module according to an embodiment of this application.

FIG. 1 is a circuit block diagram of a charging module 10 according to an embodiment of this application.

As shown in FIG. 1, the charging module 10 includes a first circuit board 11, a second circuit board 12, a third circuit board 13, and a battery module 100 that includes a battery cell 14 and a first battery protection board 15. The first circuit board 11, the second circuit board 12, and the third circuit board 13 work together to process a charging voltage and a charging current that are received from the outside into a voltage and a current that are appropriate for the battery module 100 to perform charging. The battery module 100 receives the processed voltage and current, and performs charging to store electrical energy. In addition, the battery module 100 can also release the stored electrical energy to the third circuit board 13 to perform discharging, and provide a driving power supply for the third circuit board 13 and another functional circuit (not shown in the figure).

Specifically, the first circuit board 11 is configured to: receive a first charging voltage and a first charging current from the outside, perform voltage conversion on the first charging voltage, and convert the first charging voltage into a second charging voltage. The second circuit board 12 is electrically connected to the first circuit board 11 and the third circuit board 13, and configured to provide the first charging voltage and the first charging current to the third circuit board 13. The third circuit board 13 is electrically connected to the first battery protection board 15, and configured to convert the second charging voltage into a battery cell voltage and provide the battery cell voltage to the first battery protection board 15. In addition, the first circuit board and the third circuit board 13 also convert the first charging current into a battery cell current.

The first battery protection board 15 is electrically connected to the battery cell 14, and configured to transmit the battery cell voltage and the battery cell current to the battery cell 14 by using at least two conductive paths, so that the battery cell 14 performs charging to store electrical energy. In another direction, the battery cell 14 transmits the battery cell voltage and the battery cell current to the first battery protection board 15 by using the at least two conductive paths, so that the battery cell 14 releases the stored electrical energy to the third circuit board 13 to perform discharging.

In this embodiment, the battery cell voltage is less than the first charging voltage and the second charging voltage. The battery cell voltage is a rated voltage at which the battery cell 14 is charged or discharges. For example, the battery cell voltage is 5 volts (V), and the first charging current is 12 amperes (A). In another embodiment of this application, the first circuit board 11 may be directly electrically connected to the third circuit board 13, without the second circuit board 12 performing connecting. In other words, in another embodiment, there may be no second circuit board 12, and the first circuit board 11 and the third circuit board 13 are directly electrically connected. Alternatively, in another embodiment, the first circuit board 11 and the third circuit board 13 may be implemented by a same circuit board, that is, the first circuit board 11 and the third circuit board 13 are a same circuit board, and there is no second circuit board 12.

It should be noted that a plurality of functional circuits and a plurality of conductive lines are disposed on each of the first circuit board 11, the second circuit board 12, and the third circuit board 13, to process the received voltage and current and transmit the processed voltage and current. More specifically, the first circuit board 11 includes a first transmission interface 111 and a first voltage conversion unit C1. The first transmission interface 111 is configured to be electrically connected to an external power supply system, and receive the first charging voltage and the first charging current. In this embodiment, for example, the first transmission interface 111 may be a mini USB interface, a micro USB 2.0 interface, a micro USB 2.0 interface, or a type-C interface, the first charging voltage is 12 volts (V), and the first charging current is 5 amperes (A).

The first voltage conversion unit C1 is electrically connected to the first transmission interface 111, and configured to convert the first charging voltage into the second charging voltage, for example, may step down the first charging voltage. In this embodiment, the first voltage conversion unit C1 can step down an input voltage by ½ at most, and then outputs a voltage. In other words, a minimum value of the second charging voltage (an output voltage) may be ½ of the first charging voltage (an input voltage). In a charging process, the first voltage conversion unit C1 determines magnitude of voltage step-down based on an actual requirement. Certainly, in another embodiment of this application, the first voltage conversion unit C1 may have another voltage step-down capability (voltage step-down of 4:1, 3:1, or another ratio). For example, the first voltage conversion unit C1 may be a 4:1 charger IC (charger IC), and is capable of stepping down an output voltage into ¼ of an input voltage. It should be noted that in another embodiment, there may be no need to convert the first charging voltage, for example, there is no need to step down the first charging voltage. For example, if a voltage value of the first charging voltage is relatively low, there is no need to perform step-down. In this case, the first circuit board 11 may not include the first voltage conversion unit C1, and the first circuit board 11 may directly transmit the first charging voltage to the third circuit board 13.

The second circuit board 12 includes a first connection interface 121 and a second connection interface 122. The first connection interface 121 is electrically connected to the first circuit board 11, and the second connection interface 122 is electrically connected to the third circuit board 13. In this embodiment, the first circuit board 11 and the third circuit board 13 are disposed at positions on two opposite sides of the battery cell 14. In this case, the second circuit board 12 electrically connects the first circuit board 11 to the third circuit board 13 across the two opposite sides of the battery cell 14, to transmit the second charging voltage to the third circuit board 13. In this embodiment, the second circuit board 12 may be a flexible circuit board.

It should be noted that positions at which the first circuit board 11, the second circuit board 12, and the third circuit board 13 are disposed are not limited in this embodiment of this application. Structures in the embodiments and the accompanying drawings are merely examples of connection relationships, and do not limit specific arrangement of components. For example, the second circuit board 12 in FIG. 1 is on the left side in the figure, but in an actual product, the second circuit board 12 may be disposed at any appropriate position. For example, for balance purposes, the second circuit board 12 may be disposed at an intermediate position, that is, the battery cell and the protection circuit may be symmetrical with respect to the second circuit board 12.

The third circuit board 13 includes a first conductive interface 131, a second conductive interface 132, and two second voltage conversion units C2. In a specific implementation process, usually, the third circuit board 13 may further include another circuit element, to implement charging and discharging functions of an electronic device through cooperation. For example, the third circuit board 13 may further include a first sampling unit 133 and a coulometer 134. The first sampling unit 133 is electrically connected to the first conductive interface 131 and the second conductive interface 132. The coulometer 134 is electrically connected to the first sampling unit 133. The first sampling unit 133 may be a sampling resistor, configured to perform sampling during current detection or electricity quantity detection. The coulometer 134 (also referred to as a coulomb counter) is configured to measure an electricity quantity of a battery. The coulometer 134 may measure an electricity quantity of a battery by using the sampling resistor.

The two second voltage conversion units C2 are separately electrically connected to the second connection interface 122, and separately configured to receive the second charging voltage and the charging current, and convert the second charging voltage into the battery cell voltage, for example, may step down the second charging voltage into the battery cell voltage. In this embodiment, the second voltage conversion unit C2 may be a 2:1 charger IC, can step down an input voltage by ½ at most, and then outputs a voltage. In other words, a minimum value of the battery cell voltage (an output voltage) may be ½ of the second charging voltage (an input voltage). In a charging process, the second voltage conversion unit C2 determines magnitude of voltage step-down based on an actual requirement. In another embodiment of this application, the second voltage conversion unit C2 may have another voltage step-down capability (voltage step-down of 4:1, 3:1, or another ratio). For example, the second voltage conversion unit C2 may be a 4:1 charger IC (charger IC), and is capable of stepping down an output voltage into ¼ of an input voltage.

It should be noted that the voltages in the embodiments of this application are merely examples, and in an actual charging process of the battery module 100, a charging or discharge voltage fluctuates. A current maximum battery cell voltage allowed when the battery module wo is charged does not exceed 5 V. Generally, a maximum battery cell voltage is 40.22 V or 4.45 V.

The two second voltage conversion units C2 are separately electrically connected to the first conductive interface 131 and the second conductive interface 132, to separately provide the battery cell voltage and the battery cell current to the first conductive interface 131 and the second conductive interface 132. In other words, the first conductive interface 131 receives the battery cell voltage and the battery cell current, and the second conductive interface 132 also receives the battery cell voltage and the battery cell current.

In an embodiment of this application, the two second voltage conversion units C2 may be, for example, charger ICs (charger ICs). It may be that the two charger ICs are both primary charger ICs, or it may be that one charger IC is a primary charger IC, and the other charger IC is a secondary charger IC. In addition to performing voltage conversion, the primary charger IC further supports another charging function, for example, may further support a buck structure charging, a USB OTG (USB on-the-go) function, and the like. The secondary charger IC is mainly configured to perform functions such as voltage conversion and increasing a charging current.

Figure 2A:
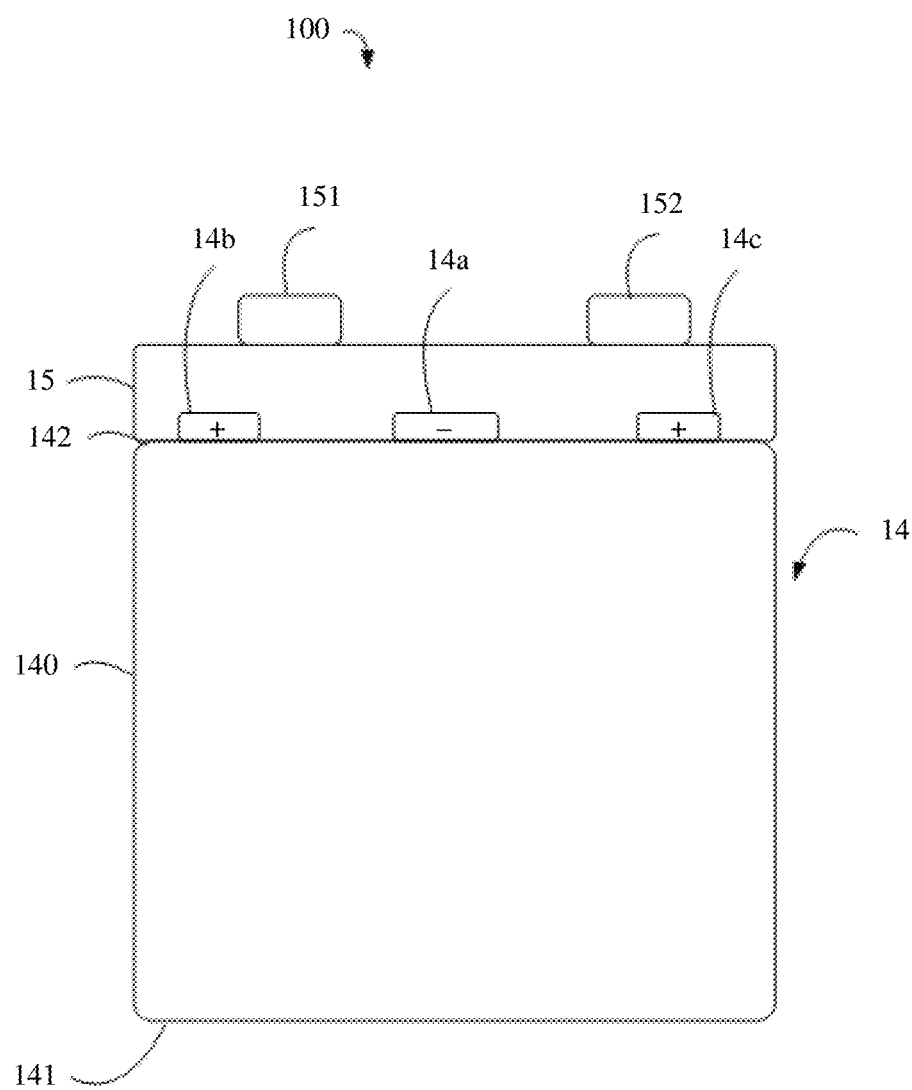
FIG. 2A and FIG. 2B are schematic diagrams of a planar structure of a battery cell.

With reference to FIG. 1, FIG. 2A is a schematic diagram of a planar structure of the battery cell 14.

As shown in FIG. 1 and FIG. 2A, the battery cell 14 includes a battery cell body 140, and a first side 141 and a second side 142 that are opposite to each other. The first circuit board 11 is disposed on the side of the first side 141 of the battery cell 14, and the third circuit board 13 and the first battery protection board 15 are disposed on the side of the second side 142 of the battery cell. The second circuit board 12 is separately electrically connected to the first circuit board 11 and the third circuit board 13 across the first side 141 and the second side 142 of the battery cell 14.

In this embodiment, a tab 14*a*, a tab 14*b*, and a tab 14*c* are disposed on the second side 142 of the battery cell body 140. The tab 14*a* has a polarity 1, and the tab 14*b* and the tab 14*c* have a polarity 2. The polarity 1 and the polarity 2 are opposite. The polarity 1 is a positive polarity, and the polarity 2 is a negative polarity; or the polarity 1 is a negative polarity, and the polarity 2 is a positive polarity.

The tab 14*b* and the tab 14*a* form positive and negative electrodes of a conductive loop, and the tab 14*c* and the tab 14*a* form positive and negative electrodes of a conductive loop. In this case, by separately using the two conductive loops, a voltage and a current are input to the battery cell body 140 (charging), or a voltage and a current are output from the battery cell body 140 (discharging).

In this embodiment, the tab 14*b* and the tab 14*c* may be directly electrically connected. In other words, voltages (potentials) at the tab 14*b* and the tab 14*c* are the same.

Therefore, the battery cell 14 includes two conductive loops for charging or discharging. In this case, charging efficiency of the battery cell 14 can be improved, and a charging time can be reduced, without increasing a charging current transmitted in each tab. It should be noted that positions of these tabs in the battery cell are not limited in this embodiment, and solutions in this embodiment can be implemented, provided that electrical connection relationships are the same. The positions of the tabs in the battery cell are described in detail in a subsequent embodiment of a specific structure of the battery cell.

Figure 3A:
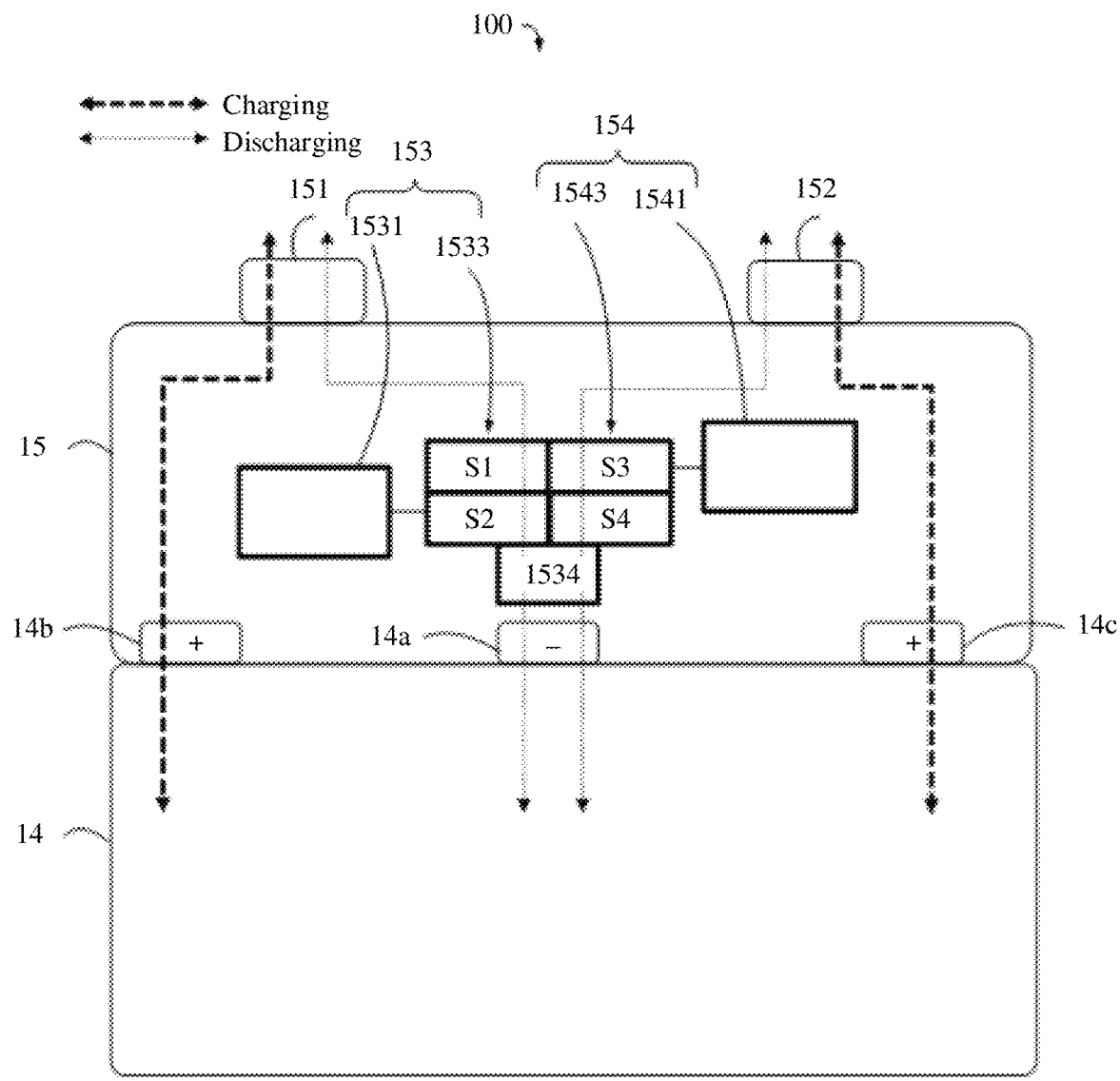
FIG. 3A and FIG. 3B are circuit block diagrams of a first battery protection board shown in FIG. 1.

With reference to FIG. 1, FIG. 3A is a circuit block diagram of the first battery protection board 15 shown in FIG. 1.

As shown in FIG. 3A, the first battery protection board 15 includes a first battery interface 151, a second battery interface 152, a first protection circuit 153, and a second protection circuit 154.

The first battery interface 151 is electrically connected to the first conductive interface 131 (FIG. 1), and the second battery interface 152 is electrically connected to the second conductive interface 132 (FIG. 1).

The first protection circuit 153 is electrically connected between the first battery interface 151 and the tabs 14*a*, 14*b*, and 14*c*, and the first protection circuit 153 is also electrically connected between the second battery interface 152 and the tabs 14*a*, 14*b*, and 14*c*. The first protection circuit 153 is configured to: during charging or discharging of the battery cell 14, and when a voltage and a current that are between the first battery interface 151 and the tabs 14*a*, 14*b*, and 14*c*, and a voltage and a current that are between the second battery interface 152 and the tabs 14*a*, 14*b*, and 14*c* exceed threshold ranges, disconnect a conductive path between the first battery interface 151 and the tabs 14*a*, 14*b*, and 14*c* and a conductive path between the second battery interface 152 and the tabs 14*a*, 14*b*, and 14*c*, to prevent the battery cell 14 from being damaged.

The second protection circuit 154 is electrically connected between the first battery interface 151 and the tabs 14*a*, 14*b*, and 14*c*, and the second protection circuit 154 is also electrically connected between the second battery interface 152 and the tabs 14*a*, 14*b*, and 14*c*. The second protection circuit 154 is configured to: during charging or discharging of the battery cell 14, and when a voltage and a current that are between the first battery interface 151 and the tabs 14*a*, 14*b*, and 14*c*, and a voltage and a current that are between the second battery interface 152 and the tabs 14*a*, 14*b*, and 14*c* exceed threshold ranges, disconnect the conductive path between the first battery interface 151 and the tabs 14*a*, 14*b*, and 14*c* and the conductive path between the second battery interface 152 and the tabs 14*a*, 14*b*, and 14*c*, to prevent the battery cell 14 and prevent the battery cell 14 from being damaged.

The first protection circuit 153 and the second protection circuit 154 simultaneously protect the battery cell 14. When any one of the first protection circuit 153 and the second protection circuit 154 fails, the other one can protect the battery cell 14. In other words, the first protection circuit 153 and the second protection circuit 154 may serve as backups of each other. When a first protection control unit 1531 fails, a second protection control unit 1541 performs voltage and current protection. Alternatively, when the second protection control unit 1541 fails, the first protection control unit 1531 performs voltage and current protection.

The threshold ranges that correspond to the first protection circuit 153 and that are for the voltages and the currents that are input and output by the battery cell 14 may be the same as or different from the threshold ranges that correspond to the second protection circuit 154 and that are for the voltages and the currents that are input and output by the battery cell 14. When the first protection circuit 153 and the second protection circuit 154 correspond to different ranges, the protection circuit that first reaches the threshold range performs an action of disconnecting a path. When the first protection circuit 153 and the second protection circuit 154 correspond to the same ranges, a protection circuit of the two that detects earlier that the voltage or current exceeds the corresponding threshold range performs a protection operation. More specifically, the first battery interface 151, the tab 14*b*, the battery cell body, the tab 14*a*, and the first protection circuit 153 constitute a first conductive loop. The first conductive loop transmits the battery cell voltage and the battery cell current.

In this embodiment, the first conductive loop includes a first conductive path P1 and a third conductive path P3. The first conductive path P1 is located between the first battery interface 151 and the tab 14*b*, and the third conductive path P3 is located between the first battery interface 151 and the tab 14*a*.

The second battery interface 152, the tab 14*c*, the battery cell body, the tab 14*a*, and the first protection circuit 153 constitute a second conductive loop. The second conductive loop transmits the battery cell voltage and the battery cell current.

In this embodiment, the second conductive loop includes a second conductive path P2 and a fourth conductive path P4. The second conductive path P2 is located between the second battery interface 152 and the tab 14*c*, and the fourth conductive path P4 is located between the second battery interface 152 and the tab 14*a*.

Optionally, the third conductive path P3 and the fourth conductive path P4 are directly electrically connected by using a conductive line, so that voltages flowing in the third conductive path P3 and the fourth conductive path P4 are basically the same, and currents flowing in the third conductive path P3 and the fourth conductive path P4 are basically the same.

The first protection circuit 153 is configured to detect voltages and currents that are in the first conductive loop and the second conductive loop. When the voltages exceed a first voltage threshold range, the first protection circuit 153 disconnects the first conductive loop and the second conductive loop, to prevent the battery cell 14 from being charged in an overvoltage condition or from discharging in an undervoltage condition. When the currents exceed a first current threshold, the first protection circuit 153 disconnects the two conductive loops, to prevent the battery cell 14 from being charged or discharging in an overcurrent condition.

Likewise, the second protection circuit 154 is also configured to detect the voltages and the currents that are in the first conductive loop and the second conductive loop. When the voltages exceed a second voltage threshold range, the second protection circuit 154 disconnects the two conductive loops, to prevent the battery cell 14 from being charged in an overvoltage condition or from discharging in an undervoltage condition. When the currents exceed a second current threshold, the second protection circuit 154 disconnects the two conductive loops, to prevent the battery cell 14 from being charged or discharging in an overcurrent condition.

In this embodiment, the first voltage threshold range may be from an undervoltage threshold 1 to an overvoltage threshold 1, where the undervoltage threshold 1 is less than the overvoltage threshold 1. The second voltage threshold range may be from an undervoltage threshold 2 to an overvoltage threshold 2, where the undervoltage threshold 2 is less than the overvoltage threshold 2.

When the first voltage threshold range is the same as the second voltage threshold range, the undervoltage threshold 1 is equal to the undervoltage threshold 2, and the overvoltage threshold 1 is equal to the overvoltage threshold 2.

When the first voltage threshold range is different from the second voltage threshold range, the undervoltage threshold 1 is not equal to the undervoltage threshold 2, or the overvoltage threshold 1 is not equal to the overvoltage threshold 2. In an embodiment, the undervoltage threshold 2 is less than the undervoltage threshold 1, and the overvoltage threshold 2 is greater than the overvoltage threshold 1; or the undervoltage threshold 2 is greater than the undervoltage threshold 1, and the overvoltage threshold 2 is greater than the overvoltage threshold 1.

For example, the first voltage threshold range may be, for example, 2.4 V to 4.422 V, and the second voltage threshold range may be, for example, 2.2 V to 4.45 V. In other words, the overvoltage threshold 1 is 4.422 V, the undervoltage threshold 1 is 2.4 V, the overvoltage threshold 2 is 4.45 V, and the undervoltage threshold 2 is 2.2 V. Alternatively, the first voltage threshold range may be, for example, 2.2 V to 4.422 V, and the second voltage threshold range may be, for example, 2.4 V to 4.45 V. That a voltage exceeds a voltage threshold range means that the voltage is less than an undervoltage threshold or greater than an overvoltage threshold.

In this embodiment, the first current threshold or the second current threshold is a specific value. The first current threshold and the second current threshold may be the same or different. That a current exceeds a current threshold means that the current is greater than or equal to the current threshold.

Figure 4A:
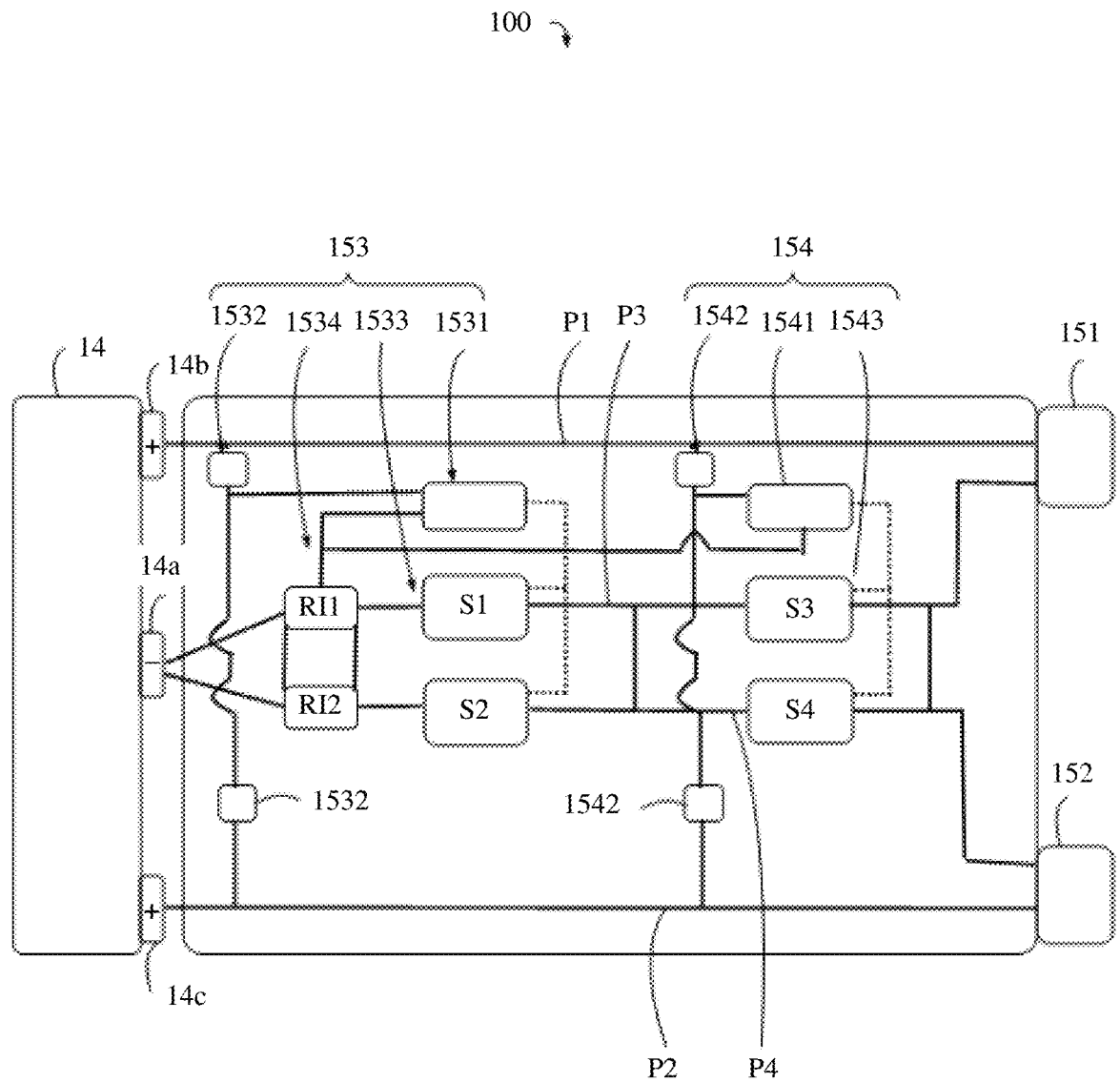
FIG. 4A is a circuit block diagram of a first protection circuit and a second protection circuit that are shown in FIG. 1.

With reference to FIG. 1, FIG. 4A is a circuit block diagram of the first protection circuit 153 and the second protection circuit 154 that are shown in FIG. 1.

As shown in FIG. 4A, the first protection circuit 153 includes the first protection control unit 1531, a first voltage sampling unit 1532, a first current sampling unit 1534, and a first switch unit 1533.

The first protection control unit 1531 is separately electrically connected to the first conductive loop and the second conductive loop. The first protection control unit 1531 detects the voltages and the currents that are in the first conductive loop and the second conductive loop, and determines whether detected voltages and currents exceed corresponding threshold ranges. When the voltages and the currents exceed the corresponding threshold ranges, the first protection control unit 1531 outputs a protection signal to the first switch unit 1533. The first switch unit 1533 disconnects the first conductive loop and the second conductive loop based on the protection signal, thereby protecting the battery cell 14, and preventing the battery cell 14 from being damaged due to overvoltage, overcurrent, or undervoltage.

The first voltage sampling unit 1532 is separately electrically connected to the tab 14b, the tab 14c, and the first protection control unit 1531, and configured to detect a battery cell voltage and transmit the detected battery cell voltage to the first protection control unit 1531. The first voltage sampling unit 1532 may be, for example, a sampling resistor. Optionally, there may alternatively be no voltage sampling unit in this embodiment of this application, and a voltage in a conductive loop is directly detected by a protection control unit.

The first current sampling unit 1534 is separately electrically connected to the tab 14a, the first protection control unit 1531, and the first switch unit 1533, and configured to detect the currents in the first conductive loop and the second conductive loop and transmit the currents to the first protection control unit 1531. The first current sampling unit 1534 may be, for example, a sampling resistor.

The first switch unit 1533 is separately electrically connected to the first protection control unit 1531, the first current sampling unit 1534, the first battery interface 151, and the second battery interface 152. The first switch unit 1533 is located in the third conductive path P3 in the first conductive loop and the fourth conductive path P4 in the second conductive loop.

In this embodiment, the first switch unit 1533 may include a first switch S1 and a second switch S2.

The first switch S1 is separately electrically connected to the first current sampling unit 1534, the first protection control unit 1531, and a third switch S3 in the second protection circuit 154. The first switch S1 is in an on or off state based on the protection signal provided by the first protection control unit 1531.

The second switch S2 is separately electrically connected to the first current sampling unit 1534, the first protection control unit 1531, and a fourth switch S4 in the second protection circuit 154. The second switch S2 is in an on or off state based on the protection signal provided by the first protection control unit 1531.

In this embodiment, the first switch S1 and the second switch S2 are synchronously turned on or synchronously cut off, and the first switch S1 and the second switch S2 may be implemented by using a same type of transistors MOS. For example, the first switch S1 and the second switch S2 are both N-type or P-type transistors. Certainly, the first switch S1 and the second switch S2 may be alternatively implemented by using different types of transistors or other elements.

As shown in FIG. 4A, the second protection circuit 154 may be further included in this embodiment of this application. The second protection circuit 154 includes the second protection control unit 1541, a second voltage sampling unit 1542, and a second switch unit 1543.

The second protection control unit 1541 is separately electrically connected to the first conductive loop and the second conductive loop. The second protection control unit 1541 detects the voltages and the currents that are in the first conductive loop and the second conductive loop, determines whether the voltages exceed the second voltage threshold range, and determines whether the currents exceed a corresponding current threshold. When the voltages and the currents exceed the corresponding threshold ranges, the second protection control unit 1541 outputs a protection signal to the second switch unit 1543. The second switch unit 1543 disconnects the first conductive loop and the second conductive loop based on the protection signal.

The second voltage sampling unit 1542 is separately electrically connected to the tab 14*b*, the tab 14*c*, and the second protection control unit 1541, and configured to detect a voltage and transmit the detected voltage to the second protection control unit 1541. In this embodiment, circuit structures of the first voltage sampling unit 1532 and the second voltage sampling unit 1542 may be the same. Optionally, there may alternatively be no voltage sampling unit in this embodiment of this application, and a voltage in a conductive loop is directly detected by a protection control unit.

In this embodiment, because the first battery interface 151 and the second battery interface 152 are directly electrically connected by using a conductive line, that is, the third conductive path P3 and the fourth conductive path P4 are short-circuited to each other, currents flowing in the third conductive path P3 and the fourth conductive path P4 are basically the same.

The second switch unit 1543 is separately electrically connected to the second protection control unit 1541, the first switch unit 1533, the first battery interface 151, and the second battery interface 152. The second switch unit 1543 is located in the third conductive path P3 in the first conductive loop and the fourth conductive path P4 in the second conductive loop.

In this embodiment, the second switch unit 1543 includes the third switch S3 and the fourth switch S4.

The third switch S3 is separately electrically connected to the first switch S1, the second protection control unit 1541, and the first battery interface 151. The third switch S3 is in an on or off state based on the protection signal provided by the second protection control unit 1541.

When the third switch S3 and the first switch S1 are both in the on state, the first conductive loop is closed, and the first conductive path P1 and the third conductive path P3 are electrically on. When the third switch S3 or the first switch S1 is in the off state, the first conductive loop is open, and the first conductive path P1 and the third conductive path P3 are electrically off.

The fourth switch S4 is separately electrically connected to the second switch S2, the second protection control unit 1541, and the second battery interface 152. The fourth switch S4 is in an on or off state based on the protection signal provided by the second protection control unit 1541.

When the fourth switch S4 and the second switch S2 are both in the on state, the second conductive loop is closed, and the second conductive path P2 and the fourth conductive path P4 are electrically on. In other words, the battery cell current and the battery cell voltage can be transmitted between the second battery interface 152 and the tab 14*a*. When the fourth switch S4 or the second switch S2 is in the off state, the second conductive loop is open, and the second conductive path P2 and the fourth conductive path P4 are electrically off.

In this embodiment, the third switch S3 and the fourth switch S4 are synchronously turned on or synchronously cut off, and the third switch S3 and the fourth switch S4 may be implemented by using a same type of transistor MOS, for example, both being N-type or P-type transistors. Certainly, the third switch S3 and the fourth switch S4 may be alternatively implemented by using different types of transistors or other elements.

Figure 2B:
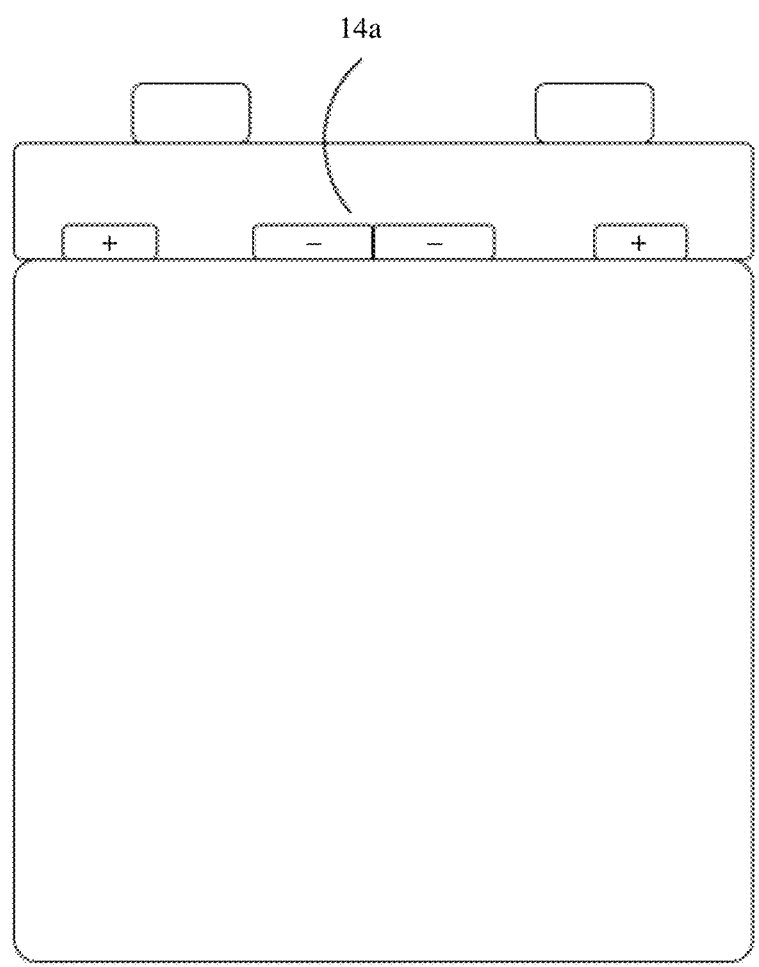
Figure 3B:
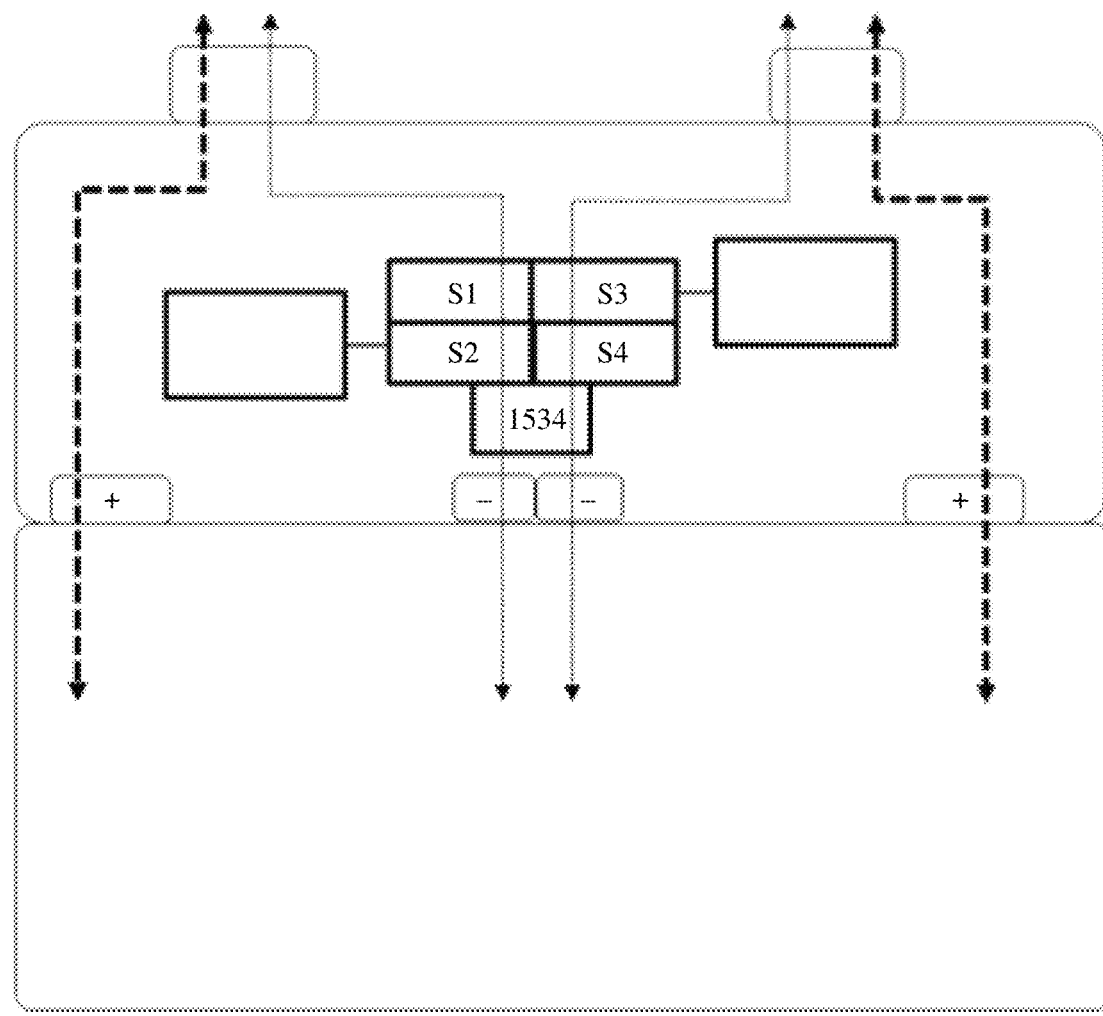
Figure 4B:
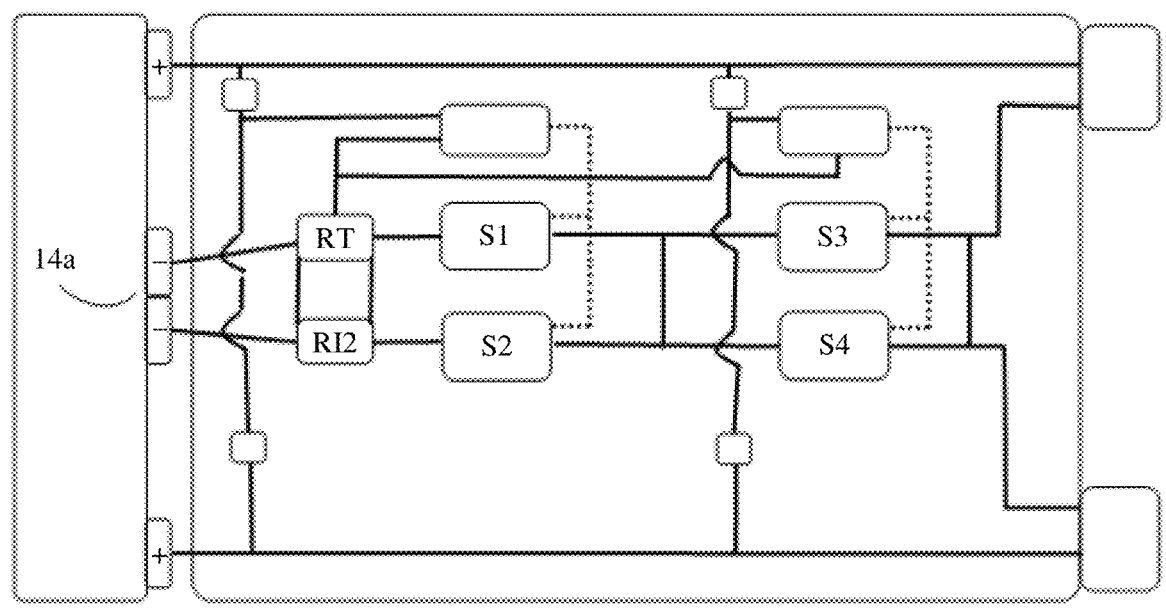
FIG. 4B is a circuit block diagram of a first protection circuit and a second protection circuit according to another embodiment of this application.

In another implementation, the tab 14*a* may be divided into two tabs. When cooperating with each other, the two tabs have a same function as the tab 14*a*. As shown in FIG. 2B, the tab 14*a* may be two tabs having a same polarity (may also be referred to as sub-tabs). One of the two tabs and the tab 14*b* form positive and negative electrodes of one conductive loop, and are capable of inputting a voltage and a current to the battery cell body or capable of outputting a voltage and a current from the battery cell body. The other of the two tabs and the tab 14*c* form positive and negative electrodes of another conductive loop, and are capable of inputting a voltage and a current to the battery cell body or capable of outputting a voltage and a current from the battery cell body. The two conductive loops are similar to the two conductive loops in FIG. 2A. Correspondingly, when the tab 14*a* is divided into two tabs having a same polarity, a corresponding circuit block diagram of the first battery protection board 15 is shown in FIG. 3B, and a corresponding circuit block diagram of the first protection circuit 153 and the second protection circuit 154 is shown in FIG. 4B. A difference between FIG. 3B and FIG. 3A is that the tab 14*a* is divided into two tabs having a same polarity. A difference between FIG. 4B and FIG. 4A is that the tab 14*a* is divided into two tabs having a same polarity.

Figure 5:
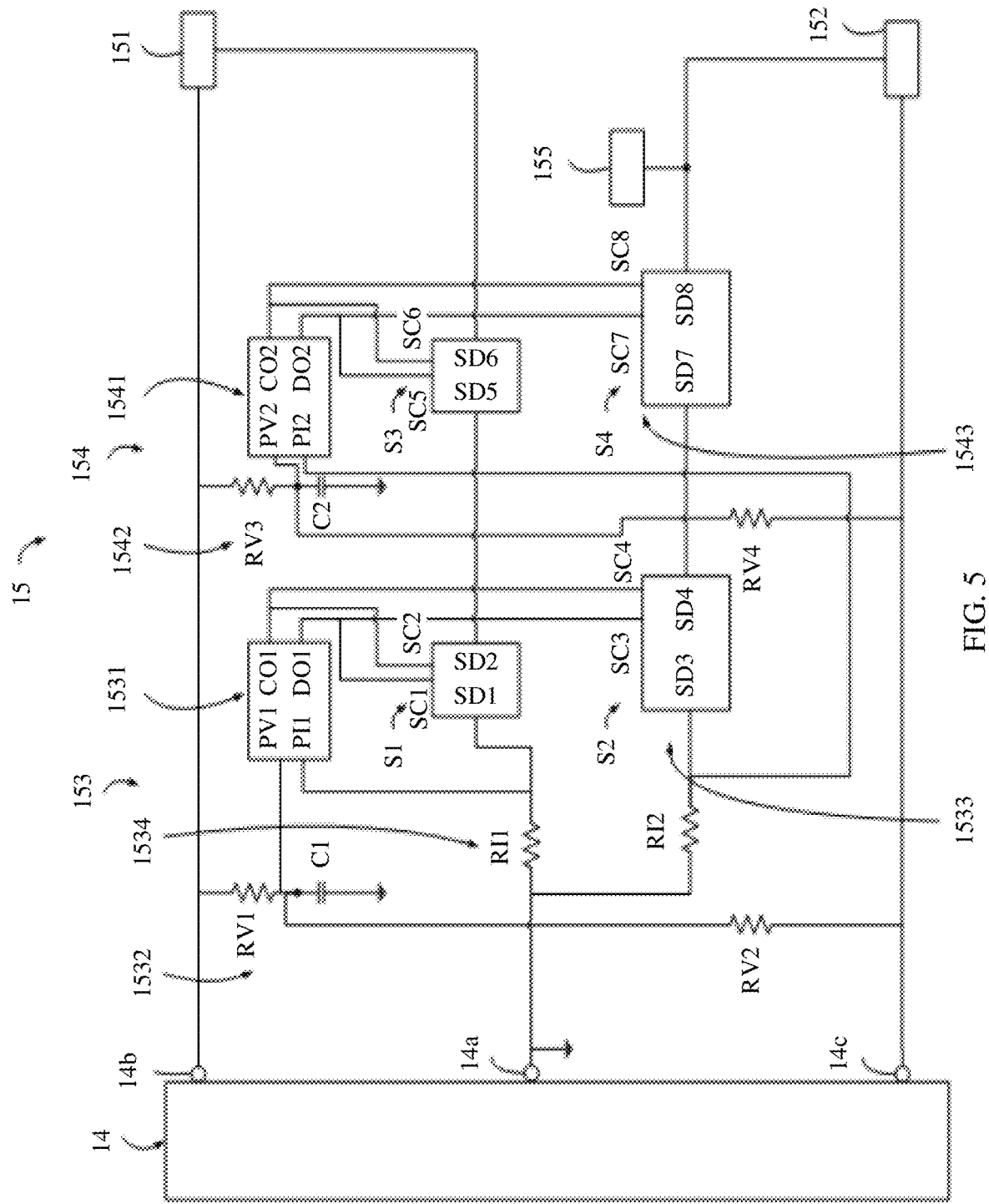
FIG. 5 is a schematic diagram of a specific circuit structure of a first protection board in a battery module shown in FIG. 1.

FIG. 5 is a schematic diagram of a specific circuit structure of a first protection board 15 in the battery module 100 shown in FIG. 1.

The first voltage sampling unit 1532 includes a first voltage detection resistor RV1 and a second voltage detection resistor RV2. The first voltage sampling resistor RV1 is electrically connected to the tab 14*b* in the first conductive path P1, and the second sampling resistor RV2 is electrically connected to the tab 14*c* in the second conductive path P2. The first voltage sampling resistor RV1 and the second sampling resistor RV2 are configured to collect a voltage on the first conductive path P1 and a voltage on the second conductive path P2, respectively.

In this embodiment, because the tab 14*b* and the tab 14*c* are directly electrically connected, the first voltage sampling resistor RV1 and the second voltage sampling resistor RV2 are connected in parallel. Therefore, the first voltage sampling unit 1532 can collect an average value of the voltage on the first conductive path P1 and the voltage on the second conductive path P2, and provide the average voltage value to the first protection control unit 1531.

In another embodiment of this application, it may be that only the first voltage detection resistor RV1 is disposed in the first voltage sampling unit 1532, so that a voltage that is on the first conductive path P1 and that is detected by the first voltage detection resistor RV1 is used as a charging or discharge voltage of the battery cell 14. Alternatively, it may be that only the second voltage detection resistor RV2 is disposed in the first voltage sampling unit 1532, so that a voltage that is on the second conductive path P2 and that is detected by the second voltage detection resistor RV2 is used as a charging or discharge voltage of the battery cell 14.

The first current detection unit 1534 includes a first current detection resistor RI1 and a second current detection resistor RI2. The first current sampling resistor RI1 is electrically connected between the tab 14*a* and the first battery interface 151, and the second sampling resistor RV2 is electrically connected between the tab 14*a* and the second battery interface 152. The first current sampling resistor RI1 and the second current sampling resistor RI2 are configured to collect a current on the third conductive path P3 and a current on the fourth conductive path P4, respectively.

In this embodiment, because the first battery interface 151 and the second battery interface 152 are directly electrically connected by using a conductive line, that is, the third conductive path P3 and the fourth conductive path P4 are short-circuited to each other, currents flowing in the third conductive path P3 and the fourth conductive path P4 are basically the same.

The second voltage sampling unit 1542 includes a third voltage detection resistor RV3 and a fourth voltage detection resistor RV4. The third voltage sampling resistor RV3 is electrically connected to the tab 14b in the first conductive path P1, and the fourth sampling resistor RV4 is electrically connected to the tab 14c in the second conductive path P2. The third voltage sampling resistor RV3 and the fourth sampling resistor RV4 are configured to collect a voltage on the first conductive path P1 and a voltage on the second conductive path P2, respectively.

In this embodiment, because two tabs, tab 14b and tab 14c, are directly electrically connected, the third voltage sampling resistor RV3 and the fourth voltage sampling resistor RV4 are connected in parallel. Therefore, the second voltage sampling unit 1542 can collect an average value of the voltage on the first conductive path P1 and the voltage on the second conductive path P2, and provide the average voltage value to the first protection control unit 1531.

In another embodiment of this application, it may be that only the third voltage detection resistor RV3 is disposed in the second voltage sampling unit 1542, so that a voltage that is on the first conductive path P1 and that is detected by the third voltage detection resistor RV3 is used as a charging or discharge voltage of the battery cell 14. Alternatively, it may be that only the fourth voltage detection resistor RV4 is disposed in the second voltage sampling unit 1542, so that a voltage that is on the second conductive path P2 and that is detected by the fourth voltage detection resistor RV4 is used as a charging or discharge voltage of the battery cell 14.

As shown in FIG. 5, the first protection control unit 1531 includes a first voltage detection terminal PV1, a first current detection terminal PI1, a first charging control terminal CO1, and a first discharge control terminal DO1.

Specifically, the first voltage detection terminal PV1 is electrically connected to the first voltage detection resistor RV1 and the second voltage detection resistor RV2, and configured to detect a voltage.

The first current detection terminal PI1 is electrically connected to the first current detection resistor RI1 and the second current detection resistor RI2, and configured to detect a current.

The first charging control terminal CO1 and the first discharge control terminal DO1 are both electrically connected to the first switch S1, and configured to output the protection signal to control the first switch S1 to be in the on or off state.

The first protection control unit 1531 determines whether a voltage detected by the first voltage detection terminal PV1 and a current detected by the first current detection terminal PI1 exceed threshold ranges. When the voltage or the current exceeds the threshold range, the first protection control unit 1531 outputs the protection signal from the first charging control terminal CO1 and the first discharge control terminal DO1.

In this embodiment, the first switch S1 in the first switch unit 1533 includes a first control terminal SC1, a second control terminal SC2, a first conductive terminal SD1, and a second conductive terminal SD2.

The first control terminal SC1 is electrically connected to the first discharge control terminal DO1, the second control terminal SC2 is electrically connected to the first charging control terminal CO1, the first conductive terminal SD1 is electrically connected to the tab 14a, and the second conductive terminal SD2 is electrically connected to the first battery interface 151 by using the second switch unit 1543.

The protection signal output by the first protection control unit 1531 from the first charging control terminal CO1 and the first discharge control terminal DO1 controls the first switch S1 to be turned on or cut off by using the first control terminal SC1 and the second control terminal SC2. When the first switch S1 is turned on under control of the protection signal, the first conductive terminal SD1 and the second conductive terminal SD2 are electrically on. When the first switch S1 is cut off under control of the protection signal, the first conductive terminal SD1 and the second conductive terminal SD2 are electrically off.

In this embodiment, the first switch S1 can be bidirectionally on. In other words, for the third conductive path P3 in the first conductive loop, when a current flows from the first tab 14a to the first battery interface 151 when the battery cell 14 is charged, the first switch S1 can be turned on or cut off; and when a current flows from the first battery interface 151 to the first tab 14a when the battery cell 14 discharges, the first switch S1 can be turned on or cut off.

In addition, the first charging control terminal CO1 and the first discharge control terminal DO1 are both electrically connected to the second switch S2, and configured to output the protection signal to control the second switch S2 to be in the on or off state.

The second switch S2 in the first switch unit 1533 includes a third control terminal SC3, a fourth control terminal SC4, a third conductive terminal SD3, and a fourth conductive terminal SD4.

The third control terminal SC3 is electrically connected to the first discharge control terminal DO1, the fourth control terminal SC4 is electrically connected to the first charging control terminal CO1, the third conductive terminal SD3 is electrically connected to the tab 14a, and the fourth conductive terminal SD4 is electrically connected to the second battery interface 152 by using the second switch unit 1543.

The protection signal output by the first protection control unit 1531 from the first charging control terminal CO1 and the first discharge control terminal DO1 controls the second switch S2 to be turned on or cut off by using the third control terminal SC3 and the fourth control terminal SC4. When the second switch S2 is turned on under control of the protection signal, the third conductive terminal SD3 and the fourth conductive terminal SD4 are electrically on. When the second switch S2 is cut off under control of the protection signal, the third conductive terminal SD3 and the fourth conductive terminal SD4 are electrically off.

In this embodiment, the second switch S2 can be bidirectionally on. In other words, for the fourth conductive path P4 in the second conductive loop, when a current flows from the first tab 14a to the second battery interface 152 when the battery cell 14 is charged, the second switch S2 can be turned on or cut off; and when a current flows from the second battery interface 152 to the first tab 14a when the battery cell 14 discharges, the first switch S1 can be turned on or cut off.

The second protection control unit 1541 includes a second voltage detection terminal PV2, a second current detection terminal PI2, a second charging control terminal CO2, and a second discharge control terminal DO2.

Specifically, the second voltage detection terminal PV2 is electrically connected to the third voltage detection resistor RV3 and the fourth voltage detection resistor RV4, and configured to detect a voltage.

The second current detection terminal PI2 is electrically connected to the first current detection resistor RI1 and the second current detection resistor RI2, and configured to detect a current.

The second protection control unit 1541 determines whether a voltage detected by the second voltage detection terminal PV2 and a current detected by the second current detection terminal PI2 exceed threshold ranges. When the voltage or the current exceeds the threshold range, the second protection control unit 1541 outputs the protection signal from the second charging control terminal CO2 and the second discharge control terminal DO2.

The second charging control terminal CO2 and the second discharge control terminal DO2 are both electrically connected to the third switch S3, and configured to output the protection signal to control the third switch S3 to be in the on or off state.

In this embodiment, the third switch S3 in the second switch unit 1543 includes a fifth control terminal SC5, a sixth control terminal SC6, a fifth conductive terminal SD5, and a sixth conductive terminal SD6.

The fifth control terminal SC5 is electrically connected to the second discharge control terminal DO2, the sixth control terminal SC6 is electrically connected to the second charging control terminal CO2, the fifth conductive terminal SD5 is electrically connected to the second conductive terminal SD2 of the first switch S1, and the sixth conductive terminal SD6 is electrically connected to the first battery interface 151.

The protection signal output by the second protection control unit 1541 from the second charging control terminal CO2 and the second discharge control terminal DO2 controls the third switch S3 to be turned on or cut off by using the fifth control terminal SC5 and the sixth control terminal SC6. When the third switch S3 is turned on under control of the protection signal, the fifth conductive terminal SD5 and the sixth conductive terminal SD6 are electrically on. When the third switch S3 is cut off under control of the protection signal, the fifth conductive terminal SD5 and the sixth conductive terminal SD6 are electrically off.

In this embodiment, the third switch S3 can be bidirectionally on. In other words, for the third conductive path P3 in the first conductive loop, when the battery cell 14 is charged or discharges, the third switch S3 can be turned on or cut off.

In addition, the second charging control terminal CO2 and the second discharge control terminal DO2 are both electrically connected to the fourth switch S4, and configured to output the protection signal to control the fourth switch S4 to be in the on or off state.

The fourth switch S4 in the second switch unit 1543 includes a seventh control terminal SC7, an eighth control terminal SC8, a seventh conductive terminal SD7, and an eighth conductive terminal SD8.

The seventh control terminal SC7 is electrically connected to the second discharge control terminal DO2, the eighth control terminal SC8 is electrically connected to the second charging control terminal CO2, the seventh conductive terminal SD7 is electrically connected to the fourth conductive terminal SD4 of the second switch S2, and the eighth conductive terminal SD8 is electrically connected to the second battery interface 152.

The protection signal output by the second protection control unit 1541 from the second charging control terminal CO2 and the second discharge control terminal DO2 controls the fourth switch S4 to be turned on or cut off by using the seventh control terminal SC7 and the eighth control terminal SC8. When the fourth switch S4 is turned on under control of the protection signal, the seventh conductive terminal SD7 and the eighth conductive terminal SD8 are electrically on. When the fourth switch S4 is cut off under control of the protection signal, the seventh conductive terminal SD7 and the eighth conductive terminal SD8 are electrically off.

In this embodiment, the fourth switch S4 can be bidirectionally on.

In this embodiment, the first battery protection board 15 may further include an anti-counterfeiting unit 155. The anti-counterfeiting unit 155 is electrically connected to the second conductive path P2, and configured to detect the battery cell voltage and the battery cell current that the battery cell 14 can withstand, to prevent the battery cell 14 from being damaged due to a mismatch between the battery cell 14 and the battery cell voltage or the battery cell current.

With reference to FIG. 1 and FIG. 5, the following specifically describes working processes of the first protection board 15 in the battery module 100 when the battery cell 14 is charged (storing electrical energy) and discharges (releasing electrical energy).

A process in which the battery cell 14 is charged is as follows.

The battery cell voltage and the battery cell current that are output by the third circuit board 13 from the first conductive interface 131 and the second conductive interface 132 are transmitted to the first battery interface 151 and the second battery interface 152 of the first battery protection board 15.

For the first conductive loop corresponding to the first battery interface 151, the battery cell voltage and the battery cell current are transmitted from the first battery interface 151 to the tab 14*b* through the first conductive path P1.

The battery cell voltage charges a first capacitor C1 through the first voltage detection resistor RV1. When a charging voltage of the first capacitor C1 reaches a conduction threshold voltage Vth of the first switch S1, the first protection control unit 1531 outputs a conduction signal to the first charging control terminal CO1, to control the first switch S1 to be in the on state.

The battery cell voltage charges a second capacitor C2 through the third voltage detection resistor RV3. When a charging voltage of the second capacitor C2 reaches a conduction threshold voltage Vth of the third switch S3, the second protection control unit 1541 outputs a conduction signal to the second charging control terminal CO2, to control the third switch S3 to be in the on state.

Inside the battery cell 14, the battery cell current is transmitted from the tab 14*b* to the tab 14*a*, transmitted from the tab 14*a* to the first conductive terminal SD1 of the first switch S1 through the first current detection resistor RI1, and then transmitted to the second conductive terminal SD2.

Because the third switch S3 is also in the on state, and the fifth conductive terminal SD5 of the third switch S3 is electrically connected to the second conductive terminal SD2, the battery cell current is transmitted to the first battery interface 151 through the second conductive terminal SD2, the fifth conductive terminal SD5, and the sixth conductive terminal SD6. In this way, the battery cell 14 is charged in the first conductive loop.

Likewise, for the second conductive loop corresponding to the second battery interface 152, the battery cell voltage and the battery cell current are transmitted from the second battery interface 152 to the tab 14c through the second conductive path P2.

The battery cell voltage charges the first capacitor C1 through the second voltage detection resistor RV2. When the charging voltage of the first capacitor C1 reaches a conduction threshold voltage Vth of the second switch S2, the first protection control unit 1531 outputs a conduction signal to the first charging control terminal CO1, to control the second switch S2 to be in the on state.

The battery cell voltage charges the second capacitor C2 through the fourth voltage detection resistor RV4. When the charging voltage of the second capacitor C2 reaches a conduction threshold voltage Vth of the fourth switch S4, the second protection control unit 1541 outputs a conduction signal to the second charging control terminal CO2, to control the fourth switch S4 to be in the on state.

Inside the battery cell 14, the battery cell current is transmitted from the tab 14c to the tab 14a, transmitted from the tab 14a to the third conductive terminal SD3 of the second switch S2 through the second current detection resistor RI2, and then transmitted to the fourth conductive terminal SD4.

Because the fourth switch S4 is also in the on state, and the seventh conductive terminal SD7 of the fourth switch S4 is electrically connected to the third conductive terminal SD3, the battery cell current is transmitted to the second battery interface 152 through the third conductive terminal SD3, the seventh conductive terminal SD7, and the eighth conductive terminal SD8. In this way, the battery cell 14 is charged in the second conductive loop.

In the charging process, when a voltage and a current on the first conductive path P1 or the second conductive path P2 exceed corresponding threshold ranges, that is, when overvoltage or undervoltage, and overcurrent occur, the first protection control unit 1531 and the second protection control unit 1541 perform protection for the battery cell 14. Herein, the following values are used as an example: An undervoltage threshold corresponding to the first protection control unit 1531 is 2.4 V, an overvoltage threshold corresponding to the first protection control unit 1531 is 4.422 V, an undervoltage threshold corresponding to the second protection control unit 1541 is 2.2 V, and an overvoltage threshold corresponding to the second protection control unit 1541 is 4.45 V.

Specifically, when undervoltage occurs on the first conductive path P1 or the second conductive path P2, for example, when a voltage of the battery cell 14 is less than 2.4 V, the first protection control unit 1531 outputs a protection signal to the first charging control terminal CO1, to control the first switch S1 and the second switch S2 to be in the off state (that is, a disconnected state), thereby disconnecting the first conductive loop and the second conductive loop.

When overvoltage occurs on the first conductive path P1 or the second conductive path P2, for example, when a voltage of the battery cell 14 is greater than 4.422 V, the first protection control unit 1531 outputs a protection signal to the first charging control terminal CO1, to control the first switch S1 and the second switch S2 to be in the off state, thereby disconnecting the first conductive loop and the second conductive loop.

If the first protection control unit 1531 fails, that is, the first protection control unit 1531 cannot timely and accurately disconnect the first conductive loop or the second conductive loop when overvoltage or undervoltage occurs on the battery cell 14, the second protection control unit 1541 can timely and accurately disconnect the first conductive loop or the second conductive loop when overvoltage or undervoltage occurs on the battery cell 14.

For example, if the first protection control unit 1531 fails, when the voltage of the battery cell 14 is less than 2.2 V, the second protection control unit 1541 outputs a protection signal to the second charging control terminal CO2, to control the third switch S3 and the fourth switch S4 to be in the off state, thereby disconnecting the first conductive loop and the second conductive loop.

If the first protection control unit 1531 fails, when the voltage of the battery cell 14 is greater than 4.45 V, the second protection control unit 1541 outputs a protection signal to the second charging control terminal CO2, to control the third switch S3 and the fourth switch S4 to be in the off state, thereby disconnecting the first conductive loop and the second conductive loop.

Likewise, when overcurrent or undercurrent occurs on the third conductive path P3 or the fourth conductive path P4, working principles of the first protection control unit 1531 and the second protection control unit 1541 are the same as working principles used when overvoltage or undervoltage occurs on the battery cell. Details are not described herein again.

A process in which the battery cell 14 discharges is as follows.

Inside the battery cell 14, the battery cell voltage and the battery cell current flow from the tab 14a to the tab 14b and the tab 14c, separately.

For the first conductive loop corresponding to the first battery interface 151, the battery cell voltage and the battery cell current are transmitted from the tab 14b to the first battery interface 151 through the first conductive path P1, and then are transmitted from the first battery interface 151 to the first tab 14a through the third switch S3 and the first switch S1. In this way, in the first conductive loop, the battery cell 14 discharges to the first battery interface 151.

Likewise, for the second conductive loop corresponding to the second battery interface 152, the battery cell voltage and the battery cell current are transmitted from the tab 14c to the second battery interface 152 through the second conductive path P2, and then are transmitted from the second battery interface 152 to the first tab 14a through the fourth switch S4 and the second switch S2. In this way, in the second conductive loop, the battery cell 14 discharges to the second battery interface 152.

In the discharging process, when a voltage and a current on the first conductive path P1, the second conductive path P2, the third conductive path P3, or the fourth conductive path P4 exceed corresponding threshold ranges, that is, when overvoltage or undervoltage, and overcurrent or undercurrent occur, the first protection control unit 1531 and the second protection control unit 1541 perform protection for the battery cell 14. A protection procedure is similar to that in the charging process. Details are not described herein again.

For a circuit of the battery cell in the charging battery module 10 shown in FIG. 1 to FIG. 5, one battery cell 14 can include at least two conductive loops for charging and discharging. This improves charging efficiency. When the battery cell 14 is compared with a battery cell with one conductive loop, at least half of a charging time is reduced, and in addition, a current borne by each tab is also reduced relatively, and therefore, an amount of heat generated by each tab is also effectively reduced, that is, the amount of the heat generated by each tab can be controlled while high charging efficiency is implemented.

For example, when a battery cell has only two tabs, a current of 12 A is used for charging, and impedance of a protection board is 20 mOHM, an amount of heat generated by the tabs and the protection board is $P=I^2R=144*20=2.88$ W.

However, for the battery cell 14 in this embodiment, because the battery cell 14 includes three tabs and at least two conductive loops, each conductive loop has a current of 6 A after the current is divided. If impedance of the protection board is 20 mOHM, an amount of heat generated by the tabs and the protection board is $P=2*I^2R=2*36*20=1.44$ W. It can be learned that the total amount of heat generated is reduced by half (reduced from 2.88 W to 1.44 W).

Figure 6:
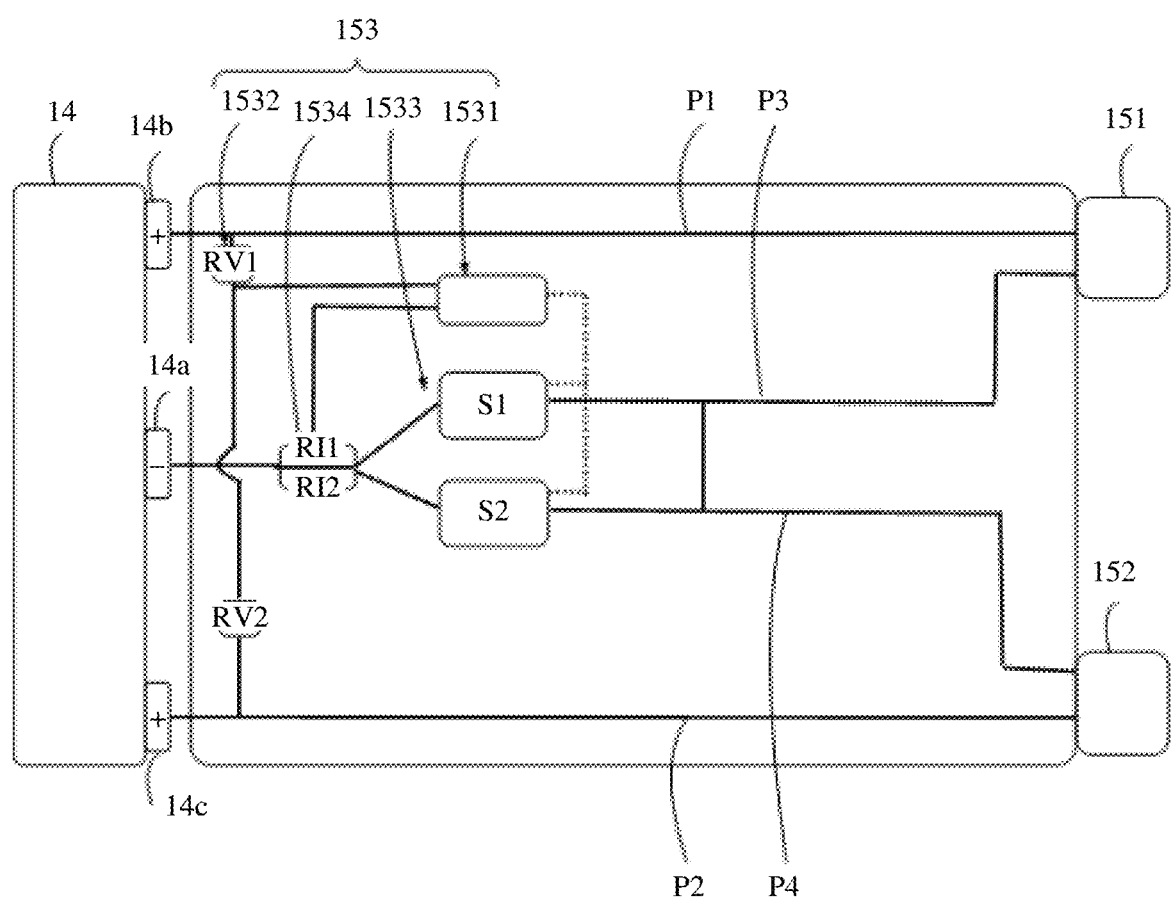
FIG. 6 is a circuit block diagram of a battery module in a charging module according to another embodiment of this application.

FIG. 6 is a circuit block diagram of a battery module 100 according to another embodiment of this application. As shown in FIG. 6, the battery module wo has a structure basically the same as a structure of the battery module wo shown in FIG. 4A, and an only different is that a first battery protection board 15 includes only a first protection circuit 153 and does not include a second protection circuit 154. As previously described, the second protection circuit serves as a backup of the first protection circuit. If the first protection circuit fails, the second protection circuit may perform voltage protection and current protection for a battery cell. Therefore, the solutions in the embodiments of this application can also be implemented when there is only one protection circuit. Optionally, to further improve reliability of protection, a quantity of protection circuits may also be increased. For example, the battery module 100 may include three, four, or more protection circuits. For a newly added protection circuit, refer to structures and layouts that are of the first protection circuit and the second protection circuit.

Figure 7:
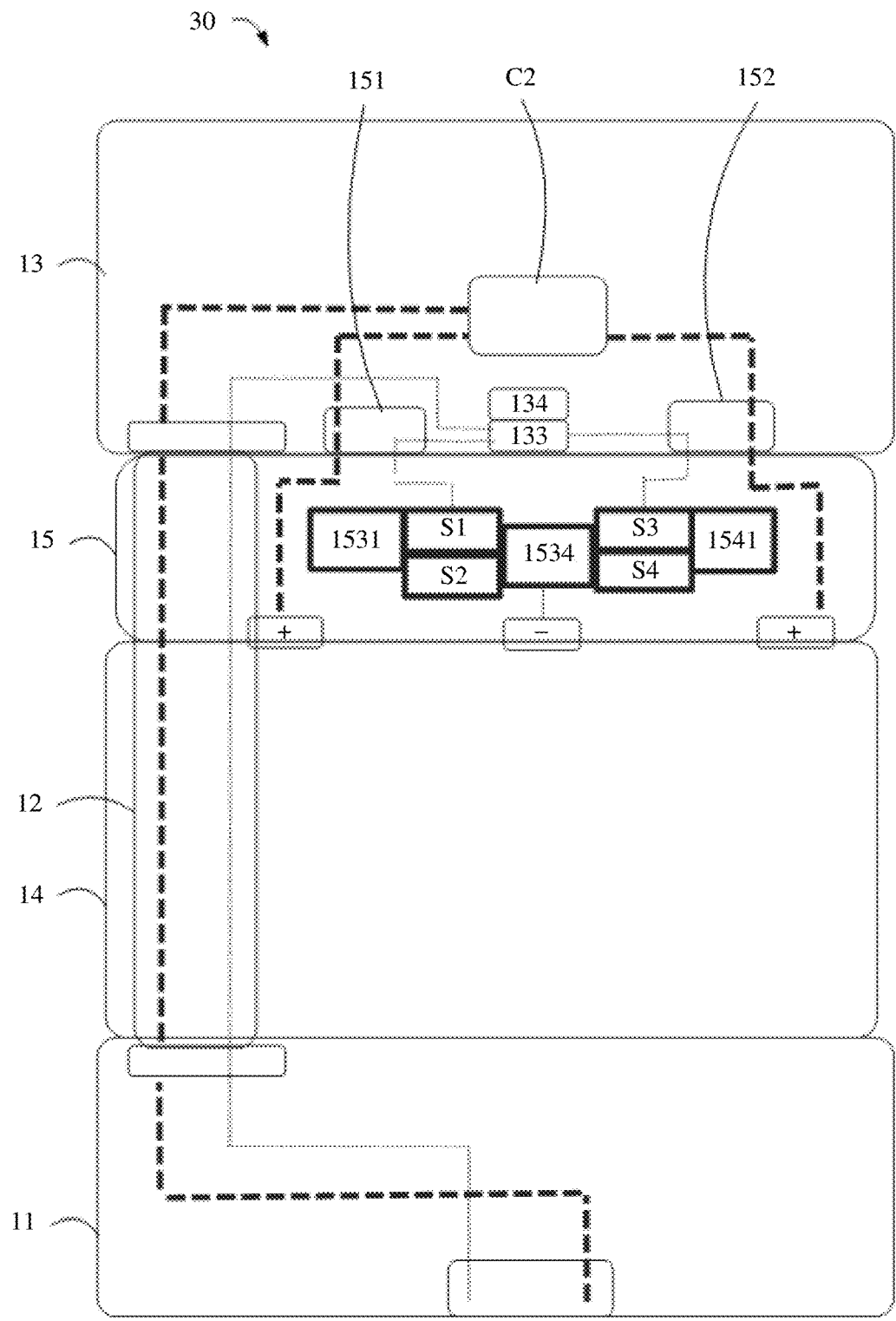
FIG. 7 is a circuit block diagram of a charging module according to another embodiment of this application.

FIG. 7 is a circuit block diagram of a charging module 30 according to another embodiment of this application.

In this embodiment, a circuit of the charging module 30 is basically the same as that of the charging module 10 shown in FIG. 1, and a different is as follows: No first voltage conversion unit C1 is disposed on a first circuit board 11, and one second voltage conversion unit C2 is disposed on a third circuit board 13. The second voltage conversion unit C2 directly converts a first charging voltage into a battery cell voltage, and provides the battery cell voltage to a first battery interface 151 and a second battery interface 152, separately. The second voltage conversion unit C2 in this embodiment has higher voltage conversion efficiency than the voltage conversion units C1 and C2 in the charging module 10. For example, the conversion efficiency may be doubled. For example, if the voltage conversion units C1 and C2 in the charging module 10 are both 2:1 charger ICs, the second voltage conversion unit C2 in this embodiment may be a 4:1 charger IC.

Figure 8:
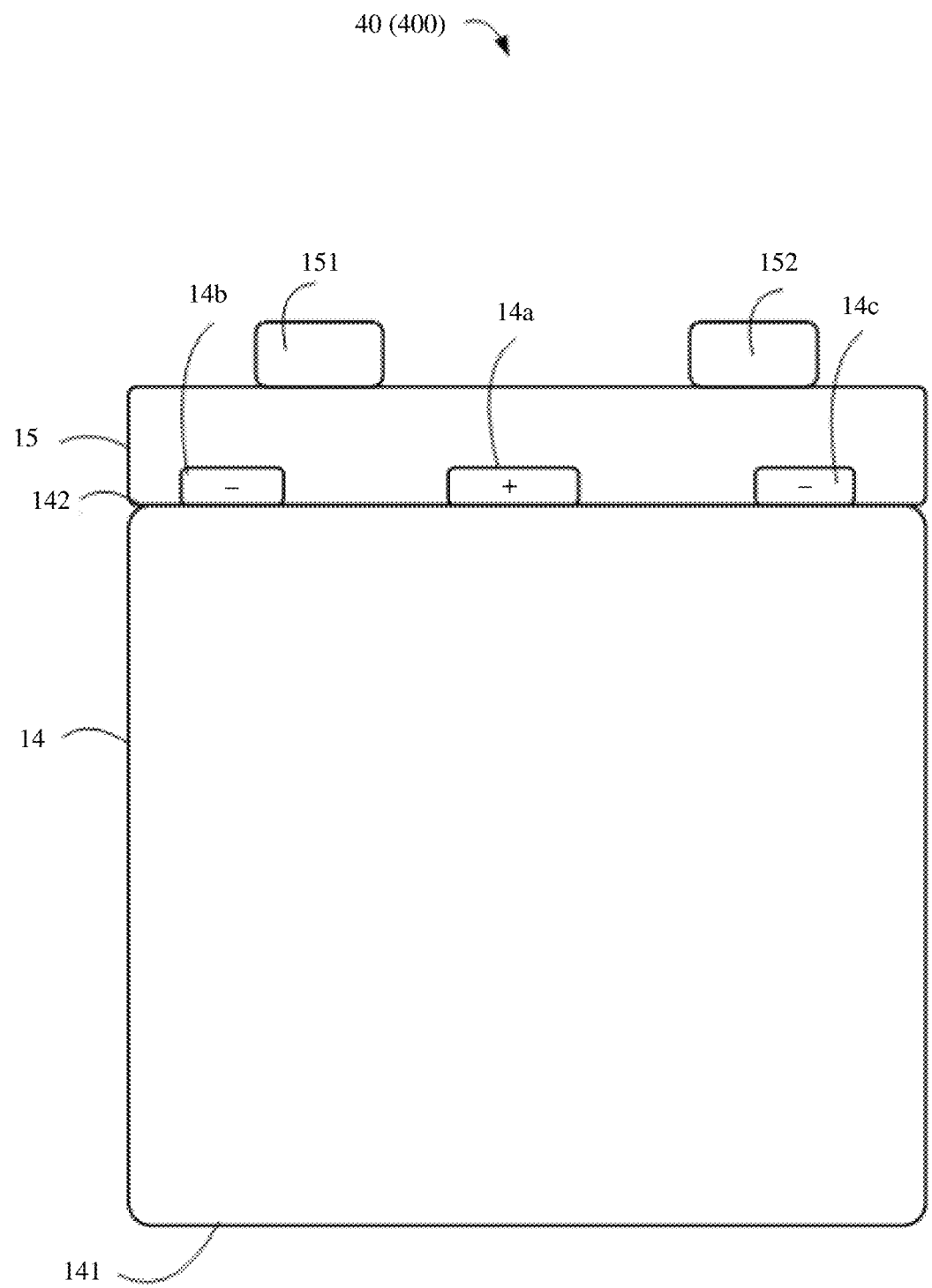
FIG. 8 is a circuit block diagram of a battery module in a charging module according to another embodiment of this application.

FIG. 8 is a circuit block diagram of a battery module 400 in a charging module 40 according to another embodiment of this application.

As shown in FIG. 8, a circuit of the battery module 400 is basically the same as that of the battery module wo shown in FIG. 1 and FIG. 2A, and a different is that a tab 14a in a battery cell 14 has a positive polarity, and a tab 14b and a tab 14c in the battery cell 14 has a negative polarity.

Figure 9:
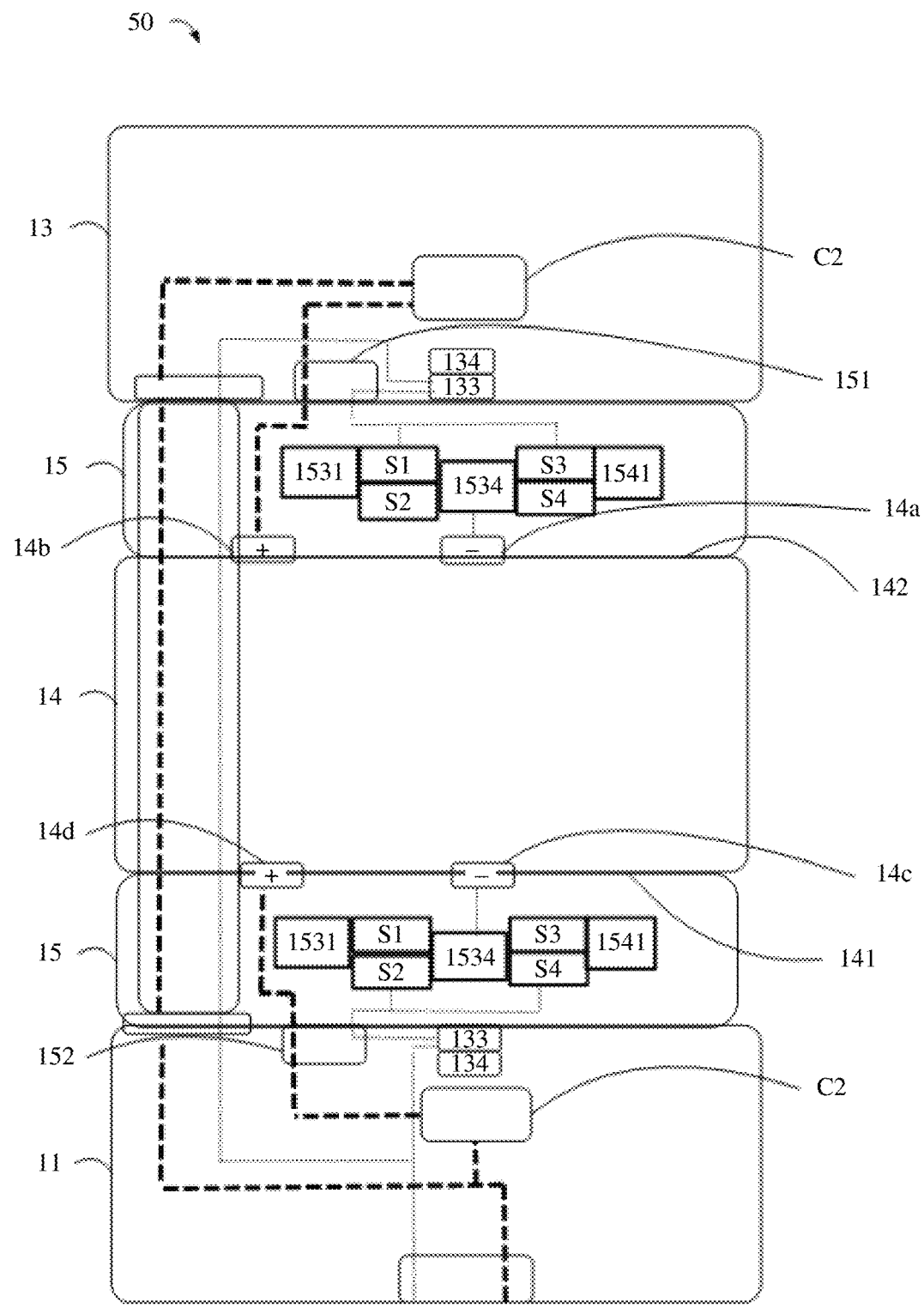
FIG. 9 is a circuit block diagram of a charging module according to another embodiment of this application.

FIG. 9 is a circuit block diagram of a charging module 50 according to another embodiment of this application.

As shown in FIG. 9, a circuit of a battery module 500 in the charging module 50 is similar to a circuit of the battery module 100 in the charging module 10 shown in FIG. 1, and a difference is as follows: A battery cell 14 in the battery module 500 includes four tabs and two first battery protection boards 15, and a first battery interface 151 and a second battery interface 152 are separately disposed on two opposite sides of the battery cell 14.

Specifically, the four tabs are separately a tab 14a, a tab 14b, a tab 14c, and a tab 14d. The tab 14a and the tab 14b are disposed on a second side 142 of the battery cell 14, and the tab 14c and the tab 14d are disposed on a first side 141 of the battery cell 14. The tab 14a and the tab 14c have a first polarity, and the tab 14b and the tab 14d have a second polarity. In this embodiment, the first polarity is a negative polarity, and the second polarity is a positive polarity.

In addition, in this embodiment, no first voltage conversion unit C1 is disposed on a first circuit board 11, and one second voltage conversion unit C2 is disposed on a third circuit board 13. The second voltage conversion unit C2 directly converts a first charging voltage into a battery cell voltage, and provides the battery cell voltage to the first battery interface 151 and the second battery interface 152, separately. For example, the second voltage conversion unit C2 may be a 4:1 charger IC.

Figure 10:
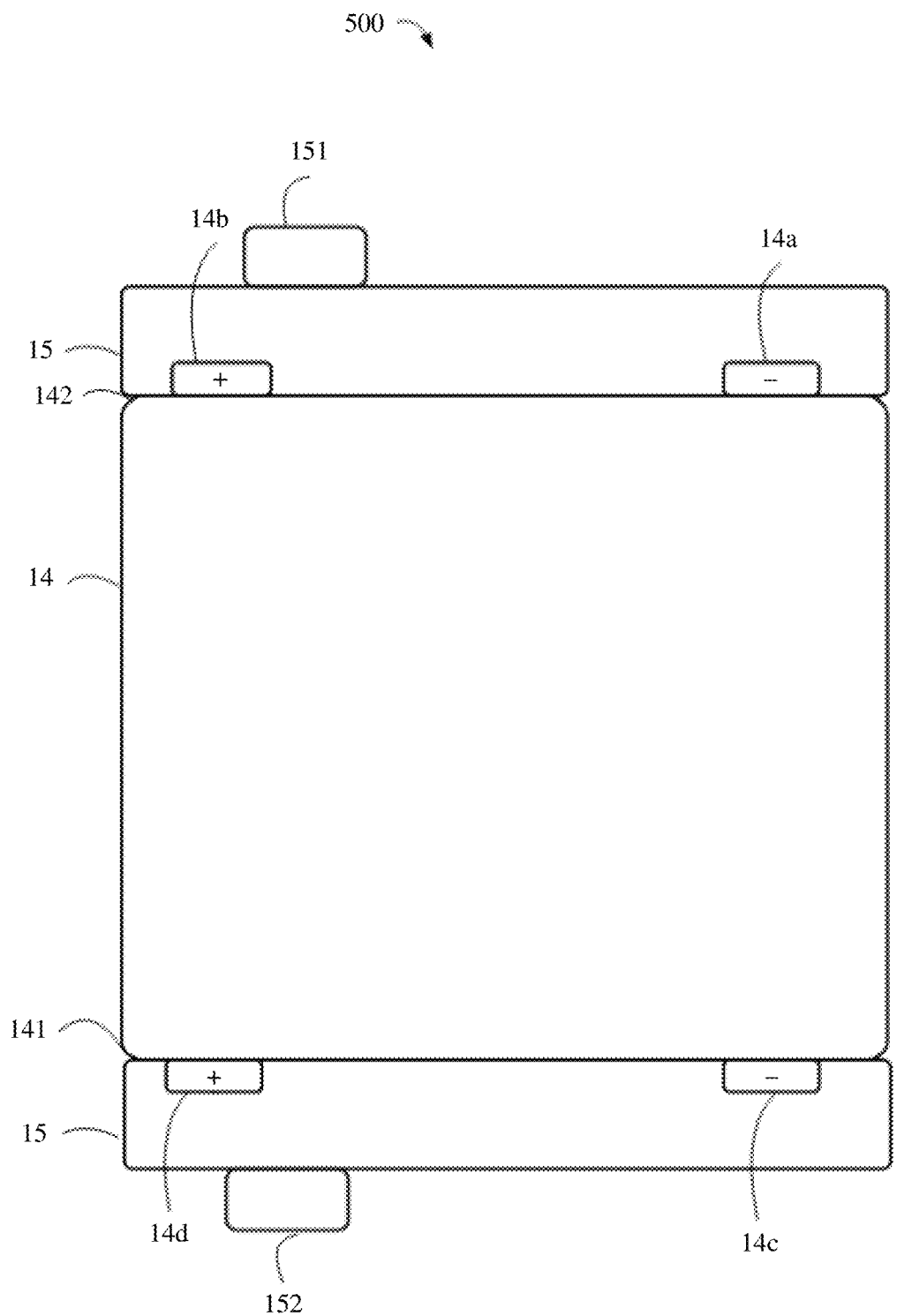
FIG. 10 is a circuit block diagram of a charging module.

FIG. 10 is a circuit block diagram of the charging module 50. As shown in FIG. 10, the two first battery protection boards 15 are separately disposed on the first side 141 and the second side 142 of the battery cell 14. In other words, one first battery protection board 15 is electrically connected to the tab 14a and the tab 14b, and the other first battery protection board 15 is electrically connected to the tab 14c and the tab 14d.

Figure 11:
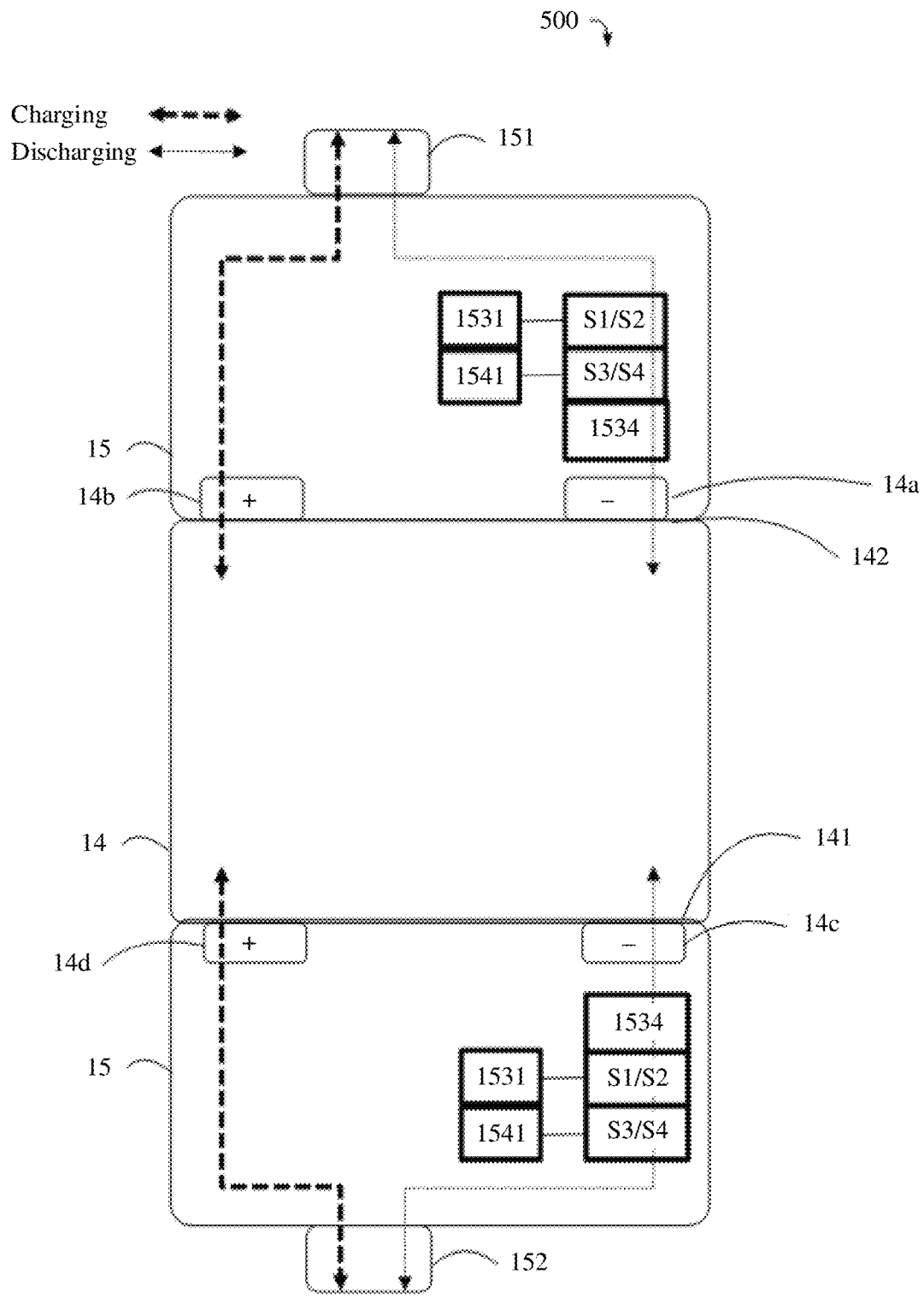
FIG. 11 is a schematic diagram of a circuit structure of a battery module.
Figure 12:
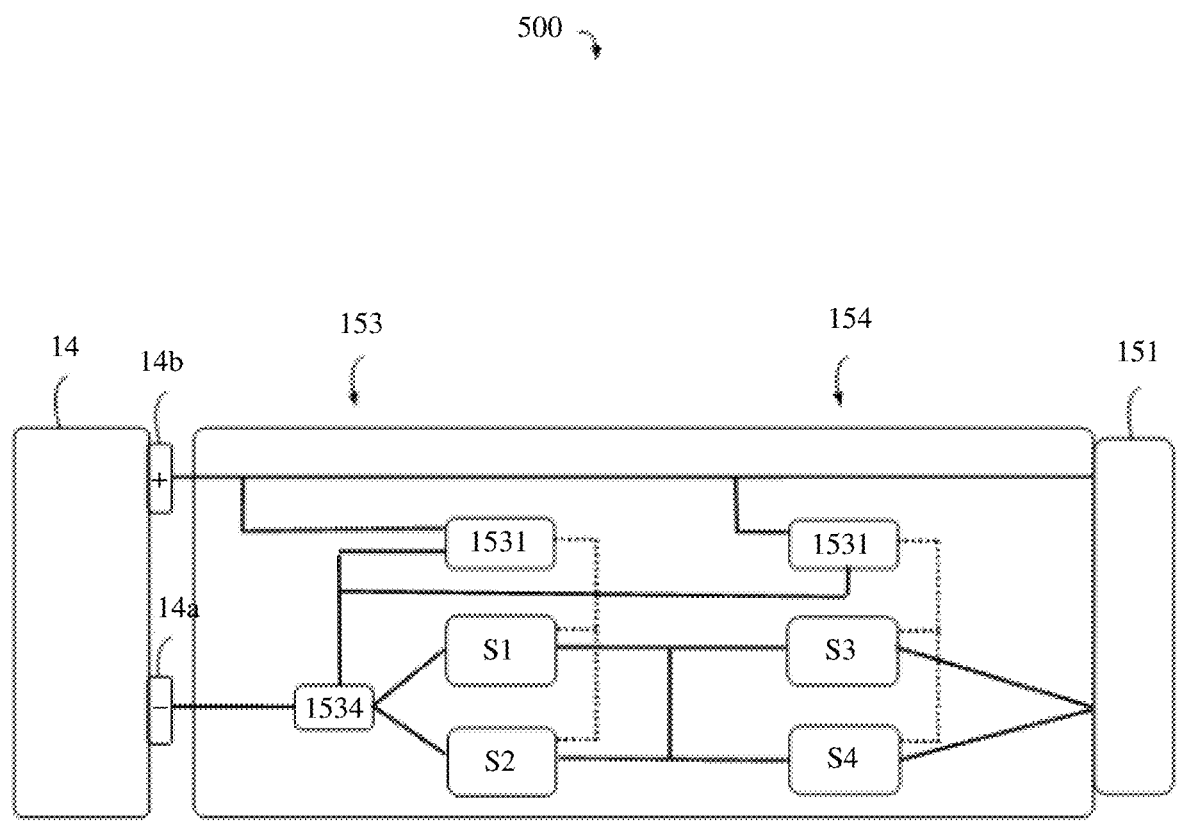
FIG. 12 is a schematic diagram of a circuit structure of one of first battery protection boards.

More specifically, FIG. 11 is a schematic diagram of a circuit structure of the battery module 500, and FIG. 12 is a schematic diagram of a circuit structure of one of the first battery protection boards 15.

As shown in FIG. 11 and FIG. 12, the first battery protection board 15 located on the second side 142 of the battery cell 14 is electrically connected to the first battery interface 151, the tab 14a, and the tab 14b, and they constitute a first conductive loop; and the first battery protection board 15 located on the first side 141 of the battery cell 14 is electrically connected to the second battery interface 152, the tab 14c, and the tab 14d, and they constitute a second conductive loop.

As shown in FIG. 12, the first battery protection board 15 includes two protection circuits 153 and 154. The protection circuits 153 and 154 perform voltage protection and current protection for the conductive loops. For specific principles, refer to a description in the foregoing embodiment. In an embodiment shown in FIG. 12, the two protection circuits 153 and 154 are both electrically connected to the first battery interface 152. In the other battery protection board, both protection circuits are electrically connected to the second battery interface 151. It may be understood that the two protection circuits 153 and 154 serve as backups of each other. Therefore, it may alternatively be that only one protection circuit is disposed on one battery protection board, or more protection circuits are disposed on one battery protection board.

Figure 13:
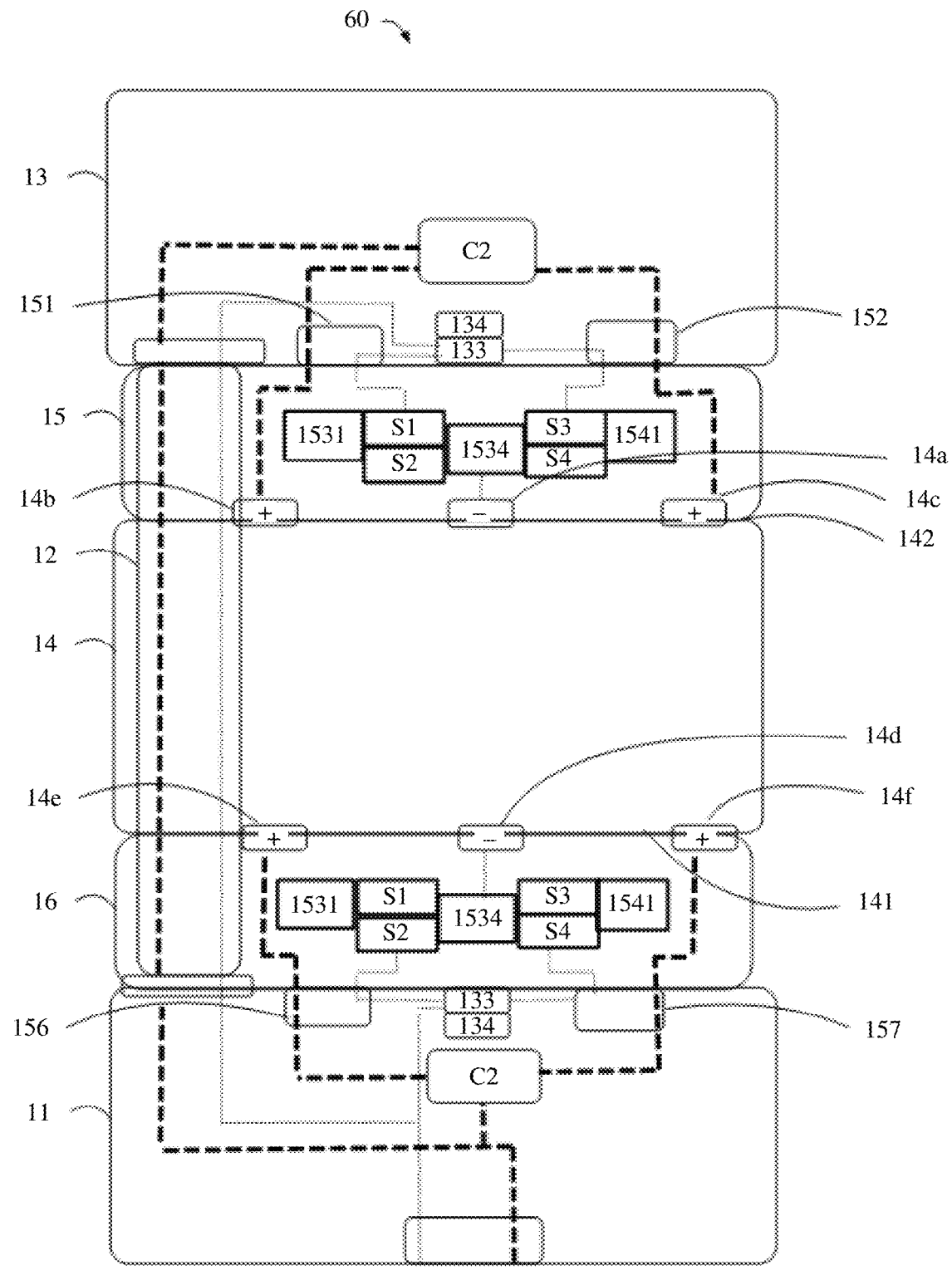
FIG. 13 is a circuit block diagram of a charging module according to another embodiment of this application.

FIG. 13 is a circuit block diagram of a charging module 60 according to another embodiment of this application.

As shown in FIG. 13, a circuit of a battery module 600 included in the charging module 60 is similar to a circuit of the battery module 100 included in the charging module 10 shown in FIG. 1, and a difference is that a battery cell 14 in the battery module 600 includes six tabs, two battery protection boards, and four battery interfaces. To be specific, compared with the battery module 100, the battery module 600 has three more tabs, one more battery protection board, and two more battery interfaces. It may be understood that the battery module 600 may be equivalent to two three-tab batteries but has only one battery cell body.

Specifically, compared with the battery module 100 shown in FIG. 1 and FIG. 2A, the battery module 600 included in the charging module 60 includes more components. On a basis of the battery module 100, as shown in FIG. 13, the battery module 600 further includes a second battery protection board 16, a third battery interface 156, and a fourth battery interface 157 that are disposed on the first side 141 of the battery cell 14. A circuit structure, a connection manner, and a working principle that are of the second battery protection board 16 are completely the same as those of the first battery protection board 15.

In addition, compared with the charging module 10, the charging module 60 has an additional voltage conversion unit C3 on a circuit board. As shown in FIG. 13, a first circuit board 11 includes a third voltage conversion unit C3. The third battery interface 156 and the fourth battery interface 157 are separately electrically connect to the third voltage conversion unit C3 on the first circuit board 11, to transmit a voltage and a current to the battery cell 14. The third voltage conversion unit C3 may be the same as a second voltage conversion unit C2 on a third circuit board. It should be noted that in another embodiment, the third voltage conversion unit C3 or the second voltage conversion unit C2 may be replaced by two or more conversion units with low conversion efficiency. For example, one 4:1 charger IC (C3 or C2) may be replaced by two or three 2:1 charger ICs. For example, three 2:1 charger ICs are used to implement two voltage step-downs in the embodiment shown in FIG. 1, whereas one 4:1 charger IC is used to implement voltage step down in the embodiment shown in FIG. 7. In the charging module 60, a voltage and a current are received from the outside through a first transmission interface iii, and then divided and separately transmitted to the third voltage conversion unit C3 on the first circuit board 11 and the second voltage conversion unit C2 on the third circuit board 13. For a subsequent processing flow, refer to a description in the foregoing embodiments (the embodiments shown in FIG. 1 to FIG. 8) of a three-tab battery cell.

Figure 14A:
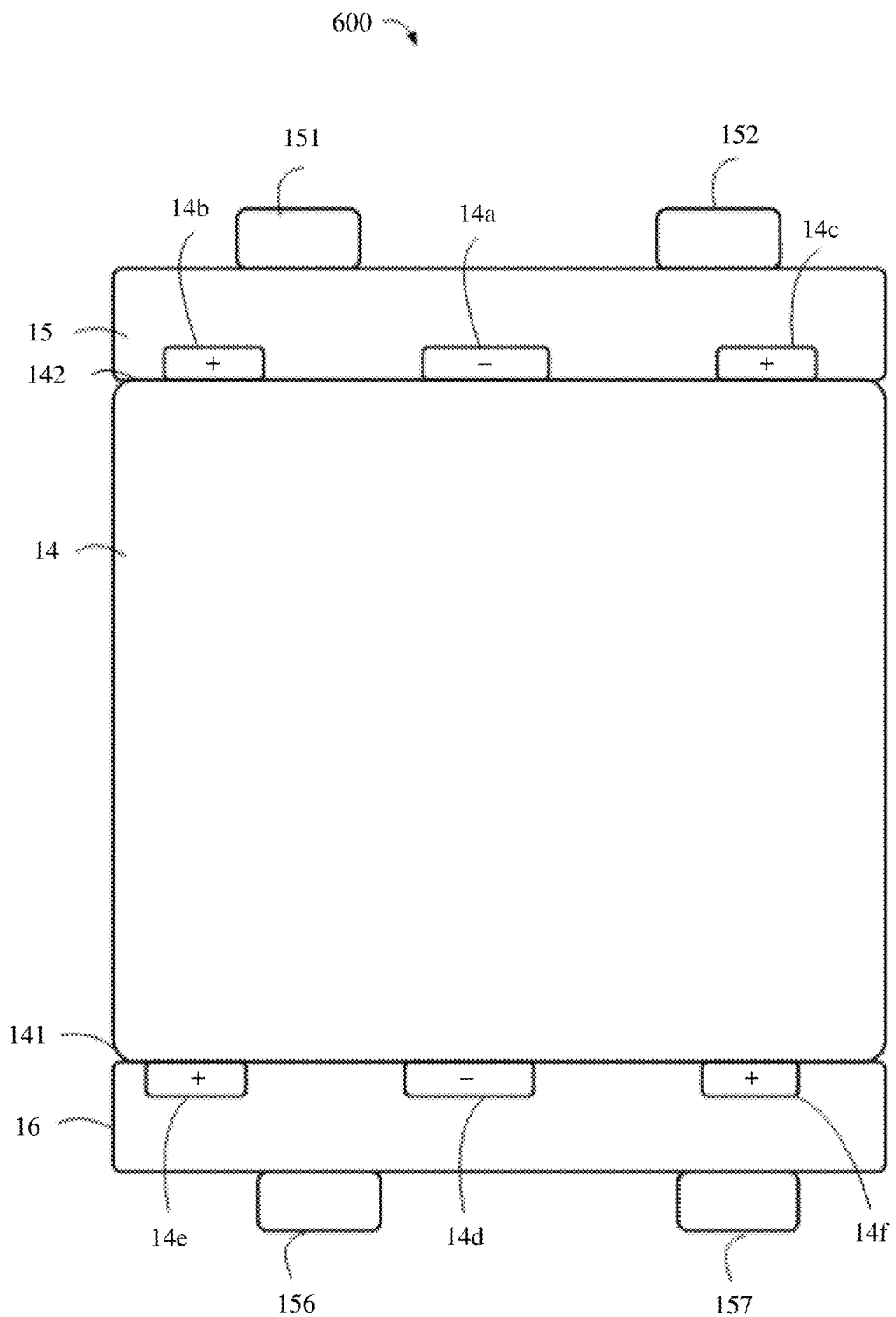
FIG. 14A is a schematic structural diagram of a battery module in a charging module shown in FIG. 13.

FIG. 14A is a schematic structural diagram of the battery module 600 in the charging module 60 shown in FIG. 13. As shown in FIG. 14A, in addition to a tab 14a, a tab 14b, and a tab 14c that are disposed on a second side 142, the battery cell 14 further includes a tab 14d, a tab 14e, and a tab 14f that are disposed on the first side 141. The tab 14e, the tab 14f, and the tab 14b have the same polarity as the tab 14c, and the tab 14d has the same polarity as the tab 14a. The tab 14e and the tab 14f are disposed on left and right sides of the tab 14d at a preset distance. For a structure and a layout that are of the tab 14d, the tab 14e, and the tab 14f, refer to those of the tab 14a, the tab 14b, and the tab 14c in the foregoing embodiment.

Figure 15:
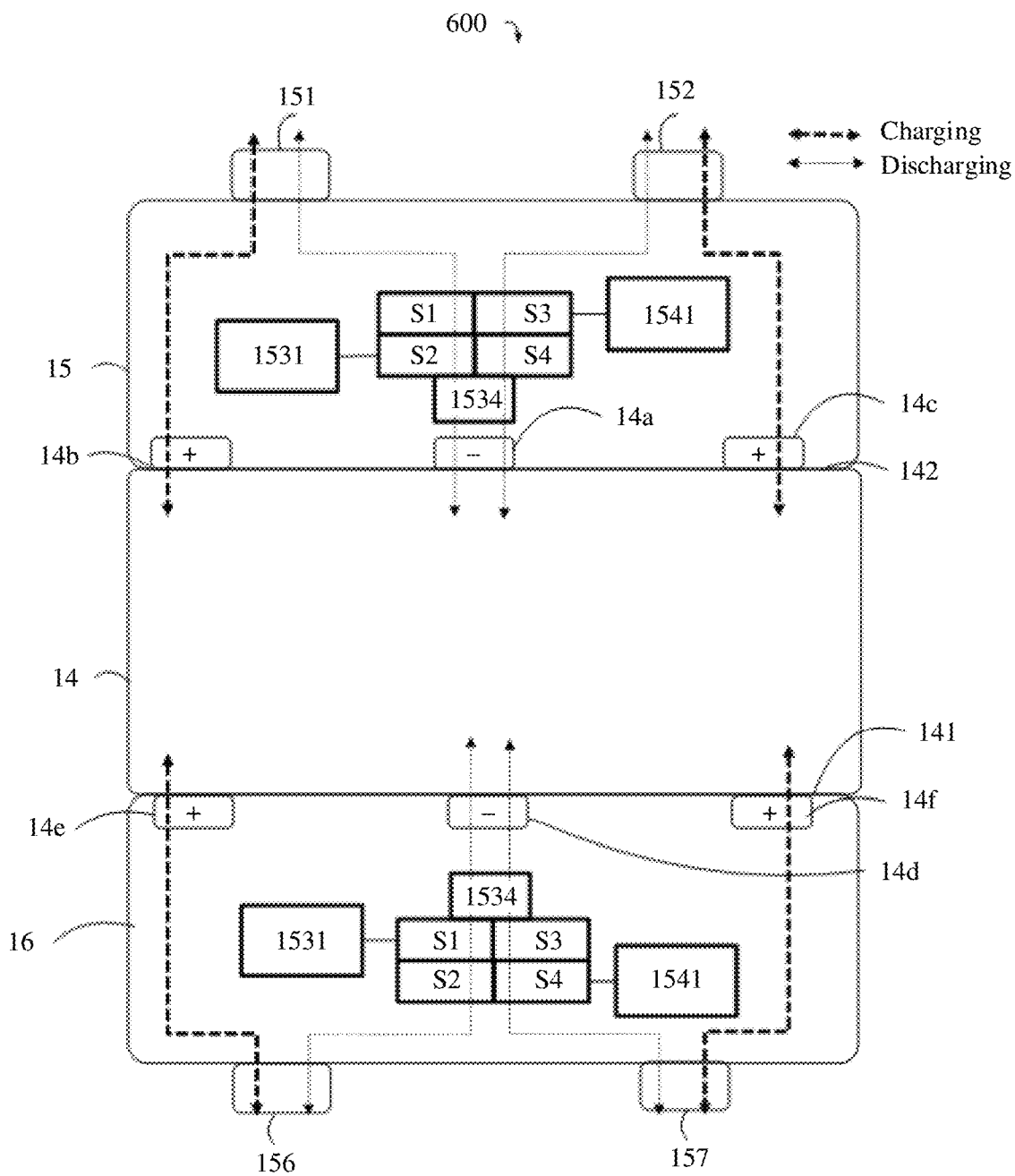
FIG. 15 is a schematic diagram of a circuit structure of a battery module in a charging module shown in FIG. 13.

FIG. 15 is a schematic diagram of a circuit structure of the battery module 600 in the charging module 60 shown in FIG. 13. As shown in FIG. 15, the second battery protection board 16 is disposed on the first side 141 of the battery cell 14, configured to receive a battery cell voltage and a battery cell current from the first circuit board 11, and electrically connected to the tab 14d, the tab 14e, and the tab 14f by using the third battery interface 156 and the fourth battery interface 157. Because the circuit structure, the connection manner, and the working principle that are of the second battery protection board 16 are the same as those of the first battery protection board 15, the specific connection manner of the second battery protection board 16 is not descried again in this embodiment.

It should be noted that in an implementation solution of a four-tab battery cell or a six-tab battery cell, during charging, upper and lower ends of the battery cell may be used, that is, four tabs or six tabs are all used for charging; and during discharging, it may be that only tabs and a circuit that are at one end of the battery cell are used. For example, when the four-tab battery cell discharges, it may be that only two tabs (for example, one positive tab and one negative tab that are connected to a third circuit board) are used for discharging. When the six-tab battery cell discharges, it may also be that only a loop formed by some tabs is used for discharging. Certainly, it may alternatively be that all tabs are used for discharging.

Figure 14B:
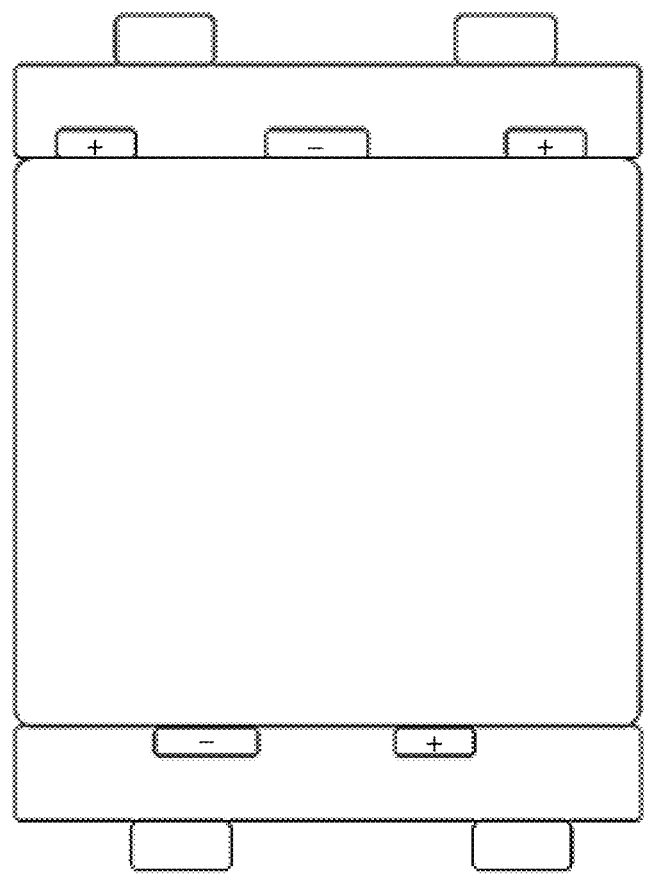
FIG. 14B is a schematic diagram of a five-tab battery module according to an embodiment of this application.

As shown in FIG. 14B, another embodiment of this application further provides a battery module with five tabs (may be referred to as a five-tab battery module). Compared with the six-tab battery module shown in FIG. 14A, the five-tab battery module also includes two battery protection boards and four battery interfaces, and a difference is that one side of a battery cell of the five-tab battery module includes three tabs, and the other side of the battery cell includes two tabs. For a structure and a corresponding circuit structure that are of the three tabs, refer to a description in the embodiment shown in FIG. 1 to FIG. 8. For a structure and a corresponding circuit structure that are of the two tabs, refer to a description of two tabs in the four-tab structure shown in FIG. 9 to FIG. 12. It may be understood that a six-tab battery module may be equivalent to two three-tab batteries but has only one battery cell body; a four-tab battery module may be equivalent to two two-tab batteries but has only one battery cell body; and a five-tab battery module may be equivalent to one three-tab battery and one two-tab battery but has only one battery cell body.

In the five-tab battery module, it may be that three of the tabs are disposed on one side of a battery cell body, and the other two tabs are disposed on the other side of the battery cell body. The two sides may be two opposite sides, two adjacent sides, or two spaced-apart sides.

In another embodiment of this application, on a basis of the four-tab battery module in the embodiment shown in FIG. 9 to FIG. 12, a battery module may further include two more tabs, that is, another six-tab battery module is provided. The six-tab battery module may include one battery cell body, six tabs, three battery protection boards, and six battery interfaces, that is, be equivalent to three two-tab battery modules. Positions of the six tabs are not limited. It may be that every two tabs are located on a side of the battery cell body, that is, tabs are disposed on each of three sides of the battery cell body, and two tabs in different polarities are disposed on each side. Among the six tabs, three tabs have a first polarity, and the other three tabs have a second polarity. The three tabs in the same polarity are disposed on a same electrode plate.

The following provides test data obtained when an existing two-tab battery cell structure and the charging modules provided in the embodiments of this application are charged.

A result of testing a charging module whose battery cell includes only two tabs (the conventional technology) is as follows.

| Charging current (A) | Charging efficiency | Total power consumption (W) |
|---|---|---|
| 8 | 0.964 | 5.195 |
| 7 | 0.97 | 4.026 |
| 6 | 0.974 | 3.062 |

-continued

| Charging current (A) | Charging efficiency | Total power consumption (W) |
|---|---|---|
| 5 | 0.975 | 2.337 |
| 4 | 0.975 | 1.746 |
| 3 | 0.975 | 1.262 |

A result of testing the charging module wo (three tabs) in the embodiment shown in FIG. 1 is as follows.

| Charging current (A) | Charging efficiency | Total power consumption (W) |
|---|---|---|
| 13 | 0.98 | 5.503 |
| 12 | 0.98 | 4.799 |
| 10 | 0.98 | 3.615 |
| 8 | 0.98 | 2.615 |
| 6 | 0.98 | 1.799 |
| 4 | 0.98 | 1.167 |

A result of testing the charging module 500 (four tabs) in the embodiment shown in FIG. 9 is as follows.

| Charging current (A) | Charging efficiency | Total power consumption (W) |
|---|---|---|
| 16 | 0.98 | 6.430 |
| 14 | 0.98 | 5.180 |
| 12 | 0.98 | 4.073 |
| 10 | 0.98 | 3.111 |
| 8 | 0.98 | 2.292 |
| 6 | 0.98 | 1.618 |

A result of testing the charging module 600 (six tabs) in the embodiment shown in FIG. 13 is as follows.

| Charging current (A) | Charging efficiency | Total power consumption (W) |
|---|---|---|
| 24 | 0.98 | 8.105 |
| 20 | 0.98 | 6.054 |
| 16 | 0.98 | 4.313 |
| 14 | 0.98 | 3.559 |
| 12 | 0.98 | 2.883 |
| 10 | 0.98 | 2.284 |

The following can be learned from the foregoing test results.

When a first charging current (a charging current input from the outside) is 8 A, for an existing solution in which a battery cell has only two tabs, overall power consumption of the battery cell is 50.195 W, whereas overall power consumption of the charging module including three tabs in the embodiment of this application is only 2.615 W, and overall power consumption of the charging module including four tabs in the embodiment of this application is only 2.292 W.

When the first charging current is 12 A, the overall power consumption of the charging module including three tabs in the embodiment of this application is 4.799 W, the overall power consumption of the charging module including four tabs in the embodiment of this application is 40.073 W, and overall power consumption of the charging module including six tabs in the embodiment of this application is 2.883 W.

Compared with the conventional technology, power consumption of the charging modules in the embodiments of this application is greatly reduced, and a charging rate is effectively improved. Therefore, when a power consumption requirement is met, the charging modules provided in the embodiments of this application can perform high-power fast charging. For example, if overall power consumption is required to be about 5 W to 6 W, a three-tab solution in the embodiments of this application can support a current of about 12 A to 13 A, that is, can support charging power of about 60 W to 65 W (12 A*5 V=60 W, 13 A*5 V=65 W) (a charging voltage is 5 V); a four-tab solution in the embodiments of this application can support a current of about 14 A to 16 A, that is, can support charging power of about 70 W to 90 W; and a six-tab solution in the embodiments of this application can support a current of about 20 A, that is, can support charging power of about 100 W. In the solutions provided in the embodiments of this application, power consumption corresponding to the six-tab solution is lower than power consumption corresponding to the four-tab solution, and the power consumption corresponding to the four-tab solution is lower than power consumption corresponding to the three-tab solution. In other words, the six-tab solution can support higher-power charging than the four-tab solution, and the four-tab solution can support higher-power charging than the three-tab solution.

The following describes a structure of a battery cell 14 in the embodiments of this application.

A battery cell may include two electrode plates. Each electrode plate includes an active area (Active Area, AA), and further, may include a surrounding area (that is, non-active area, Non active Area, NA). The active areas AA are coated with conductive materials. The conductive materials with which the active areas of the two electrode plates are coated work together to store and release electrical energy. The two electrode plates have different polarities. Each electrode plate has one or more tabs. The two electrode plates are wound together to form the battery cell. The tabs on the electrode plates are tabs of the battery cell. Based on a quantity of tabs required by the battery cell, the corresponding quantity of tabs are disposed on the electrode plates.

Figure 16A:
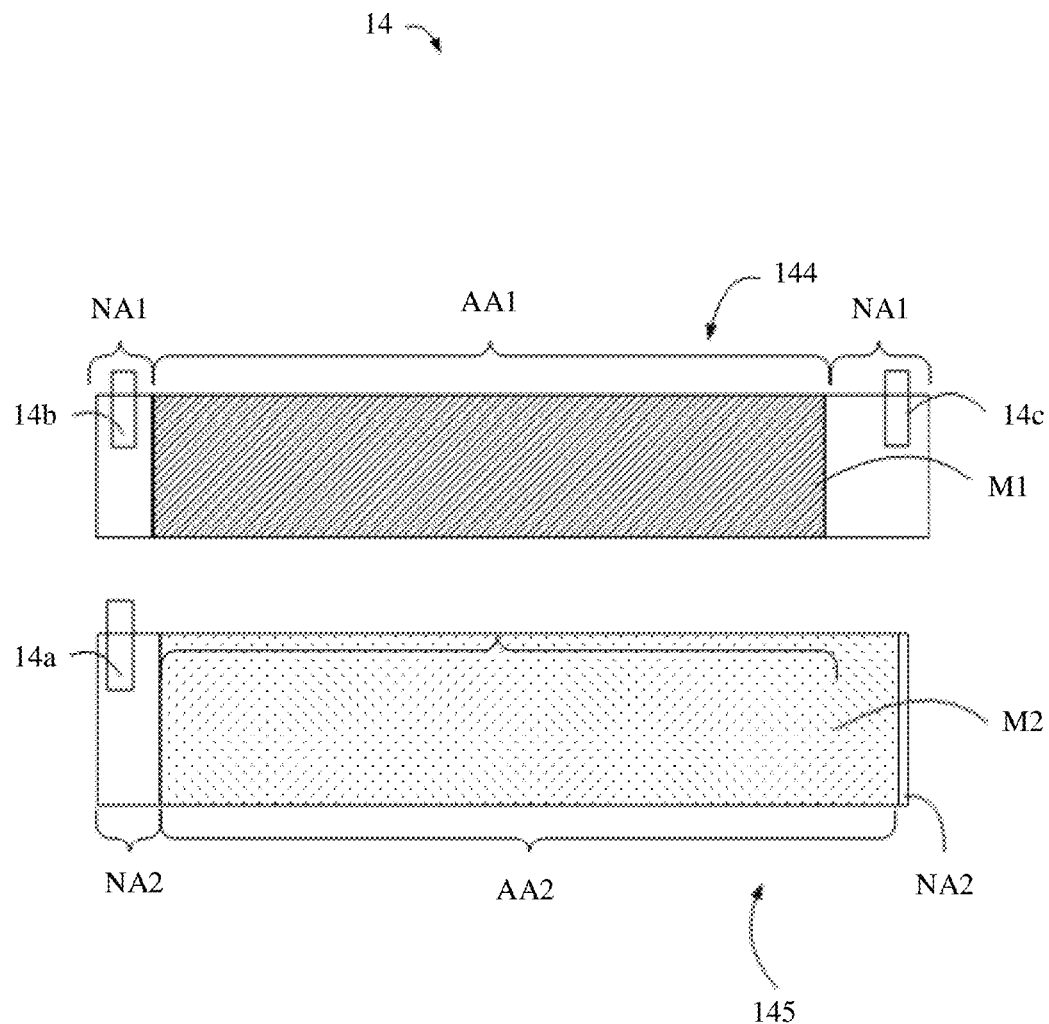
FIG. 16A to FIG. 16C are schematic exploded structural diagrams of a battery cell with three tabs according to an embodiment of this application.

FIG. 16A is a schematic exploded structural diagram of a battery cell 14 with three tabs according to an embodiment of this application.

As shown in FIG. 16A, the battery cell 14 includes two electrode plates that have different polarities, namely, an electrode plate 144 and an electrode plate 145. For example, the electrode plate 144 has a first polarity, and the electrode plate 145 has a second polarity; or the electrode plate 144 has a second polarity, and the electrode plate 145 has a first polarity.

The electrode plate 144 includes a first active area AA1 and two first non-active areas NA1.

The first active area AA1 is coated with a first conductive material M1. The two first non-active areas NA1 are located on two opposite sides of the first active area AA1. One tab is disposed in each first non-active area NA1, for example, tabs 14*b* and 14*c* shown in FIG. 16A.

The electrode plate 145 includes a second active area AA2 and two second non-active areas NA2. Alternatively, in another implementation, the electrode plate 145 may include only one non-active area NA2 (not shown in the figure).

The second active area AA2 is coated with a second conductive material M2. The two second non-active areas NA2 are located on two opposite sides of the second active area AA2. One tab is disposed in one of the second non-active areas NA2, for example, a tab 14*a*.

The first conductive material M1 and the second conductive material M2 work together to store and release electrical energy.

Figure 17:
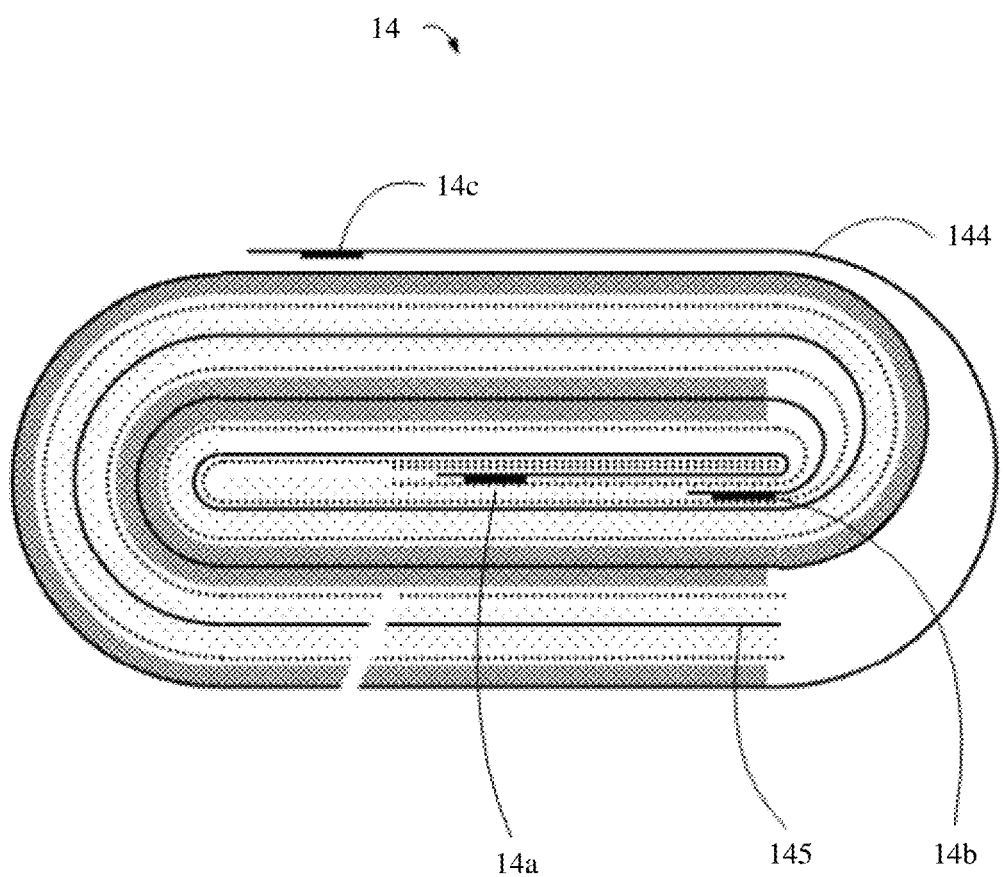
FIG. 17 is a top view of the battery cell shown in FIG. 16A.

FIG. 17 is a top view of the battery cell 14 shown in FIG. 16A. As shown in FIG. 17, the electrode plate 144 and the electrode plate 145 are wound together. The tab 14a and the tab 14b are adjacently disposed inside a winding structure, and with the electrode plate 144 and the electrode plate 145 being wound, the tab 14c is located at an outer edge of the winding structure.

Figure 18:
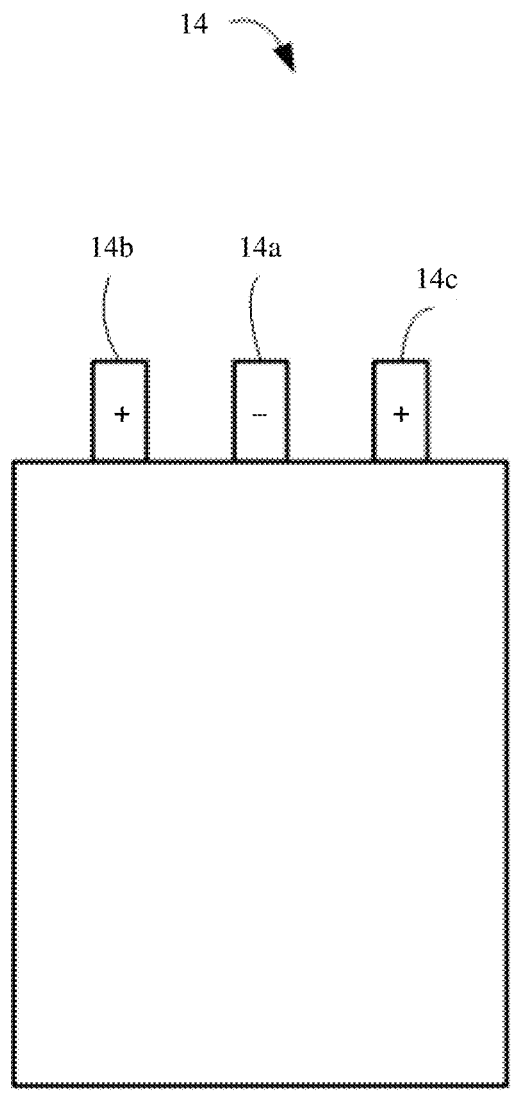
FIG. 18 is a schematic diagram of a frontal structure of the battery cell shown in FIG. 16A.

FIG. 18 is a schematic diagram of a frontal structure of the battery cell 14 shown in FIG. 16A. The two tabs 14b and 14c are located on left and right sides of the tab 14a.

In the embodiments of this application, the tab 14b and the tab 14c are the same. The tab 14b and the tab 14c are used only for distinguishing between identifiers. In other words, in the embodiments of this application, positions of the tab 14b and the tab 14c can be interchanged.

FIG. 16A and FIG. 17 are merely schematic diagrams of a structure of a three-tab battery cell. In another implementation, the three-tab battery cell may alternatively be of another structure. In the structure, two tabs on an electrode plate 144 may be located at other different positions.

For example, the two tabs may be located in non-active areas at two ends of the electrode plate 144, as shown in FIG. 16A.

Figure 19:
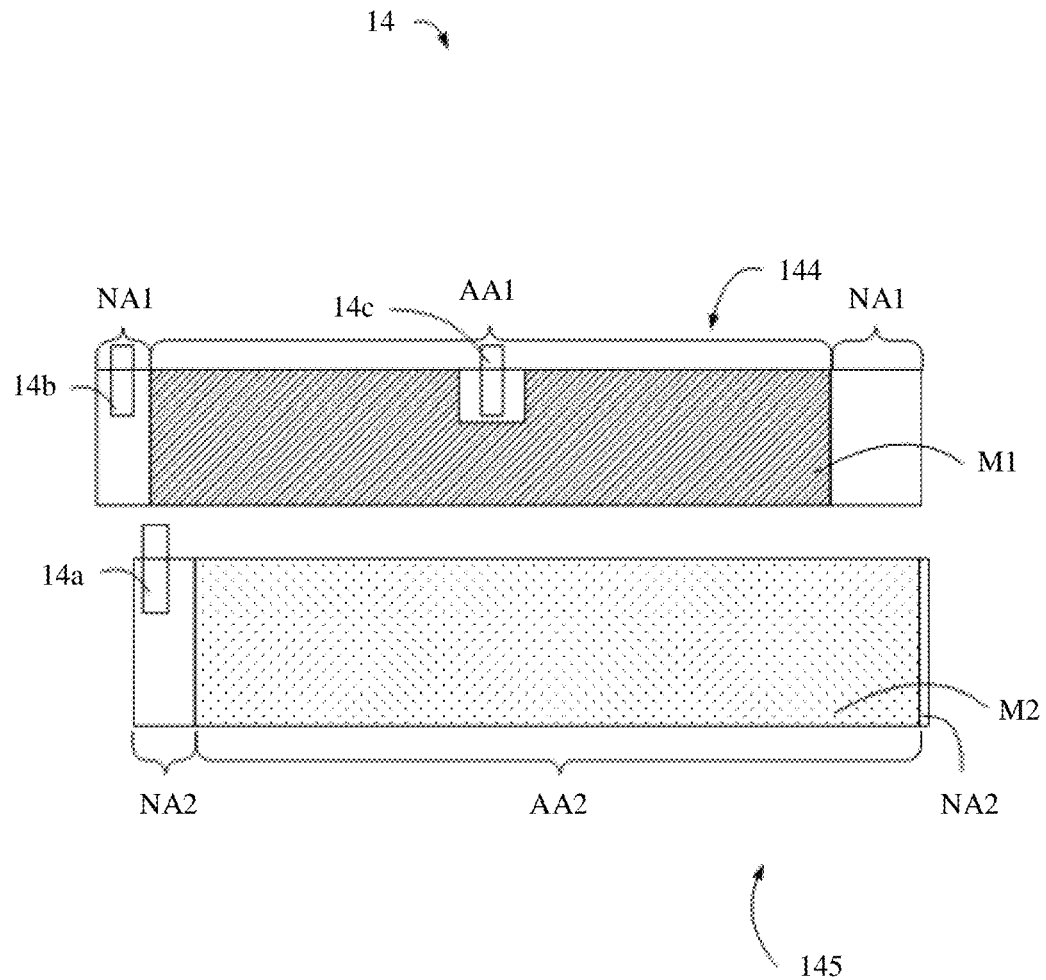
FIG. 19 is a schematic exploded structural diagram of a battery cell with three tabs according to an embodiment of this application.

Alternatively, for the two tabs, it may be that one is located in a non-active area at one end of the electrode plate 144, and the other is located in an active area AA of the electrode plate 144. As shown in FIG. 19, a tab 14b is located in a non-active area NA1 of an electrode plate 144 (on a left or right end of the electrode plate 144), and a tab 14c is located in a first active area AA1 of the electrode plate 144.

Figure 16B:
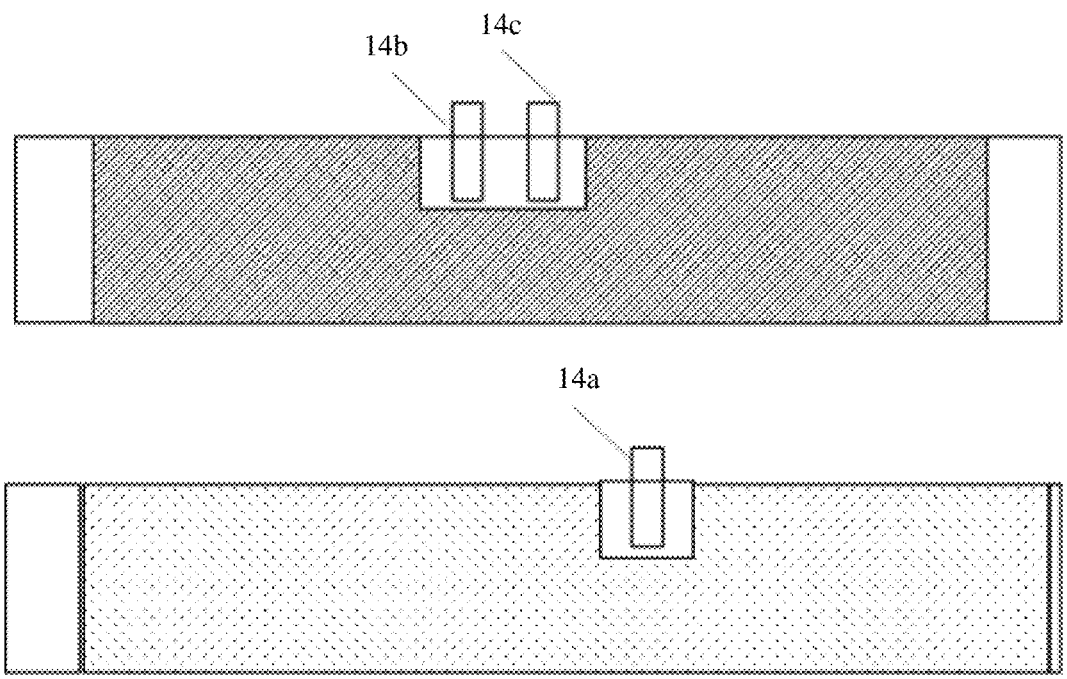
Figure 16C:
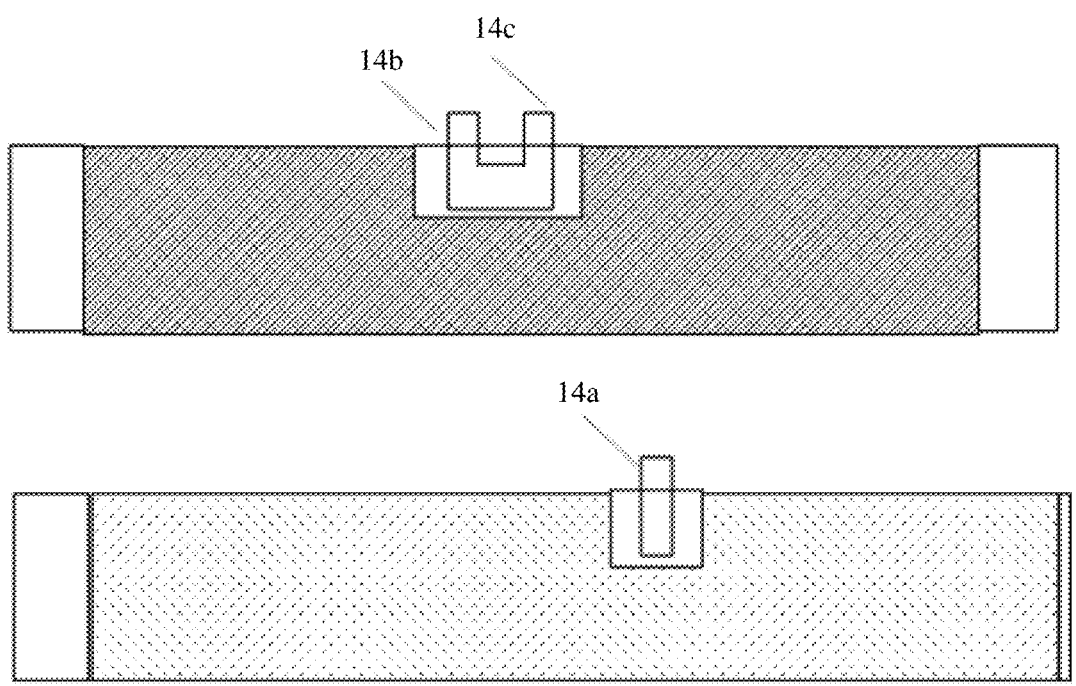

Alternatively, as shown in FIG. 16B, it may be that a tab 14b and a tab 14c are both located in a first active area of an electrode plate 144. When both tabs are located in an active area of an electrode plate, the two tabs may be or may not be connected. As shown in FIG. 16C, an end that is of a tab 14b and that is disposed on an electrode plate is connected to an end that is of a tab 14c and that is disposed on the electrode plate. In appearance, the two tabs are separated, but inside the electrode plate, the two tabs may be connected.

A tab may be disposed in an active area AA of an electrode plate 144 in the following two manners. In one manner, after the active area AA1 is coated with a conductive material, part of the conductive material is removed at a preset position, and then the tab is electrically disposed at the preset position, for example, the tab may be welded to the electrode plate. In the other manner, the tab is electrically connected to the electrode plate, and then the electrode plate is coated with a conductive material, except for a position of the tab.

Figure 20:
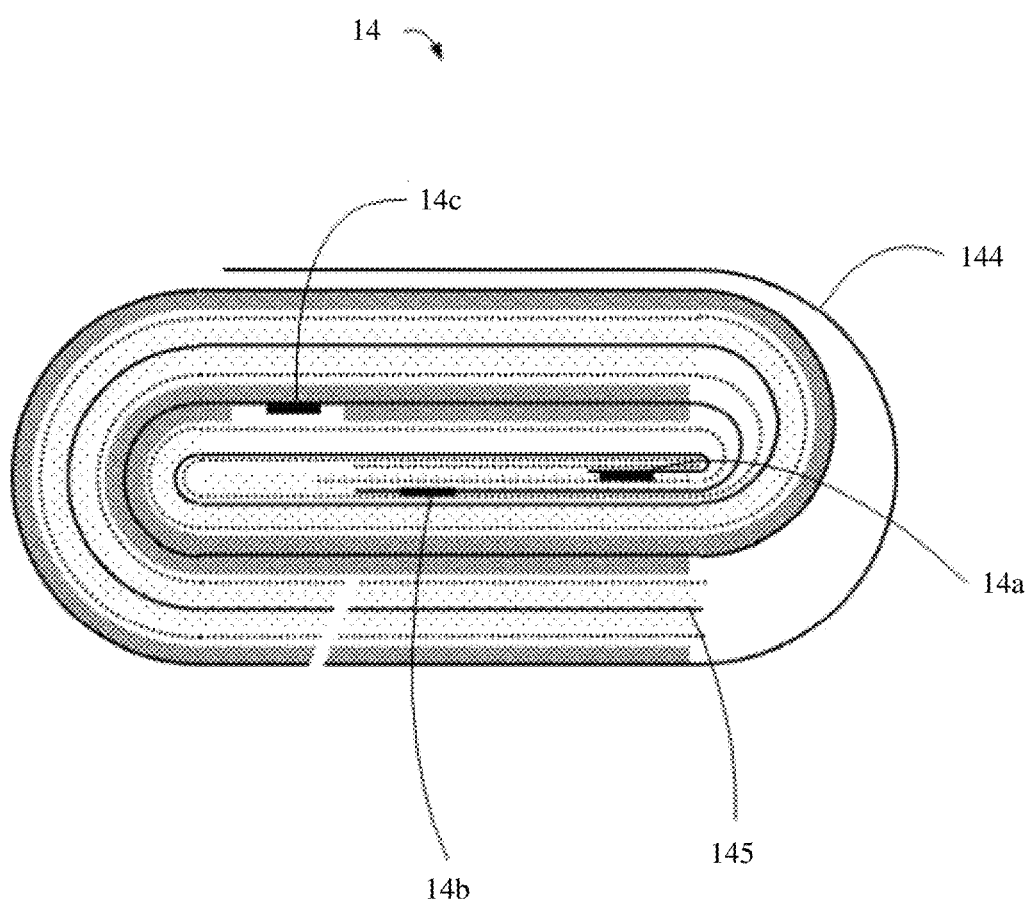
FIG. 20 is a top view of the battery cell shown in FIG. 19.

FIG. 20 is a top view of a battery cell 14 shown in FIG. 19. As shown in FIG. 20, the electrode plate 144 and an electrode plate 145 are wound together. A tab 14a and the tab 14c are adjacently disposed inside a winding structure, and with the electrode plate 144 and the electrode plate 145 being wound, the tab 14b is located at another position on the winding structure. For a frontal structure of the battery cell 14 shown in FIG. 19 and FIG. 20, refer to FIG. 18.

Alternatively, a tab 14b and a tab 14c may be both located in an active area AA. For example, the tab 14b and the tab 14c are both located in an active area AA1 of the electrode plate 144.

Figure 21:
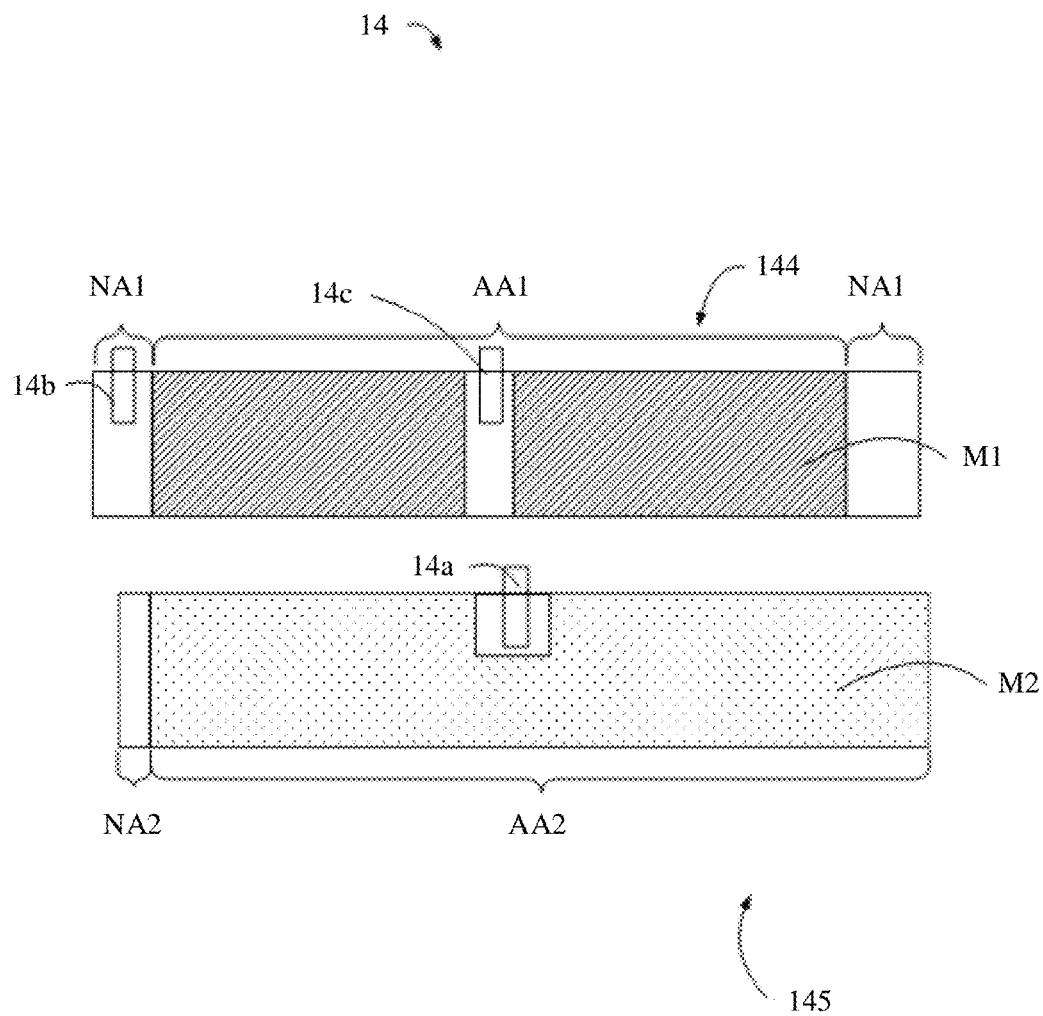
FIG. 21 is a schematic exploded structural diagram of a battery cell with three tabs according to an embodiment of this application.

Alternatively, a tab 14a on an electrode plate 145 and a tab 14c on the electrode plate 144 may be both located in active areas AA, separately. As shown in FIG. 21, a tab 14a is located in an active area AA2 of an electrode plate 145, and a tab 14c is located in an active area AA1 of an electrode plate 144.

In another embodiment, a tab on an electrode plate 145 may be alternatively located at different positions on the electrode plate. The tab may be located in a non-active area at either end of the electrode plate 145, as shown in FIG. 16A. Alternatively, the tab may be located in an active area of the electrode plate 145. As shown in FIG. 21, a tab 14a is located in a second active area AA2 of an electrode plate 145.

Figure 22:
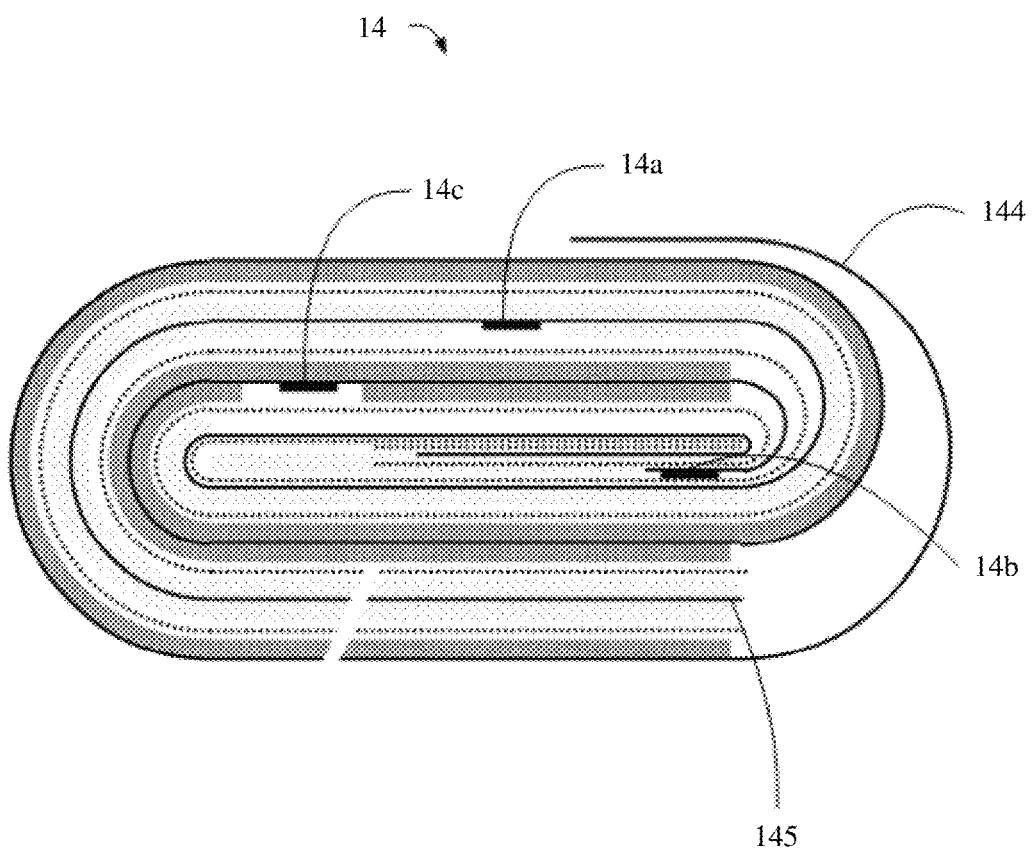
FIG. 22 is a top view of the battery cell shown in FIG. 21.

FIG. 22 is a top view of a battery cell 14 shown in FIG. 21. As shown in FIG. 22, the electrode plate 144 and the electrode plate 145 are wound together. The tab 14a and the tab 14c are adjacently disposed inside a winding structure, and with the electrode plate 144 and the electrode plate 145 being wound, a tab 14b is located at another position on the winding structure. For a frontal structure of the battery cell 14 shown in FIG. 21 and FIG. 22, refer to FIG. 18.

Figure 23:
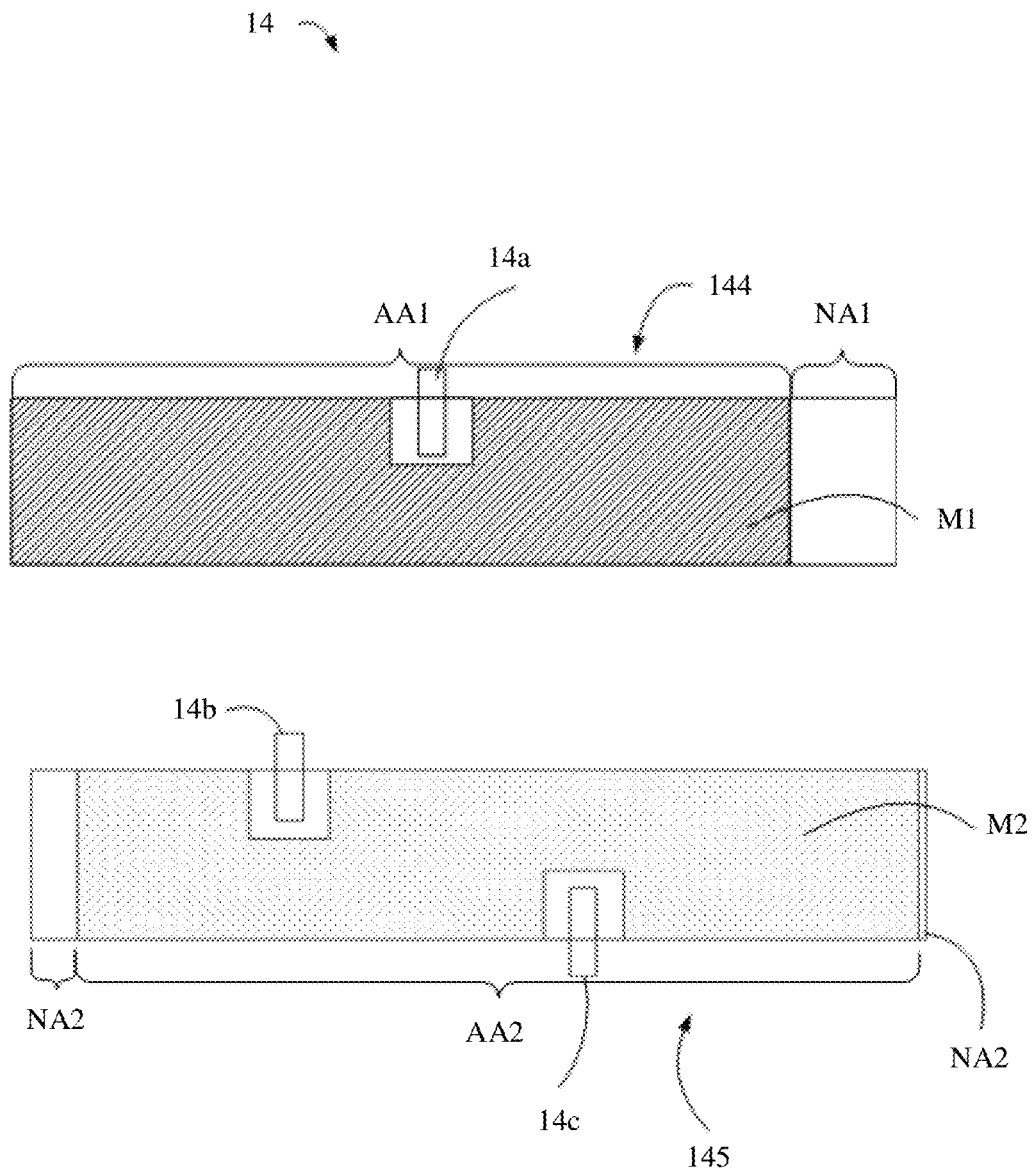
FIG. 23 is a schematic exploded structural diagram of a battery cell with three tabs according to an embodiment of this application.

In the embodiments of this application, to form a three-tab battery cell, it may be that one tab is disposed on any electrode plate, and two tabs are disposed on the other electrode plate. As shown in FIG. 23, a tab 14a may be disposed on an electrode plate 144, and a tab 14b and a tab 14c may be disposed on an electrode plate 145.

Optionally, a plurality of tabs disposed on an electrode plate may face different directions. As in the foregoing embodiments shown in FIG. 16A to FIG. 22, the tab 14a, the tab 14b, and the tab 14c all face a same direction. As shown in the figures, they all face upwards. In another embodiment, the three tabs may face different arbitrary directions.

Figure 24:
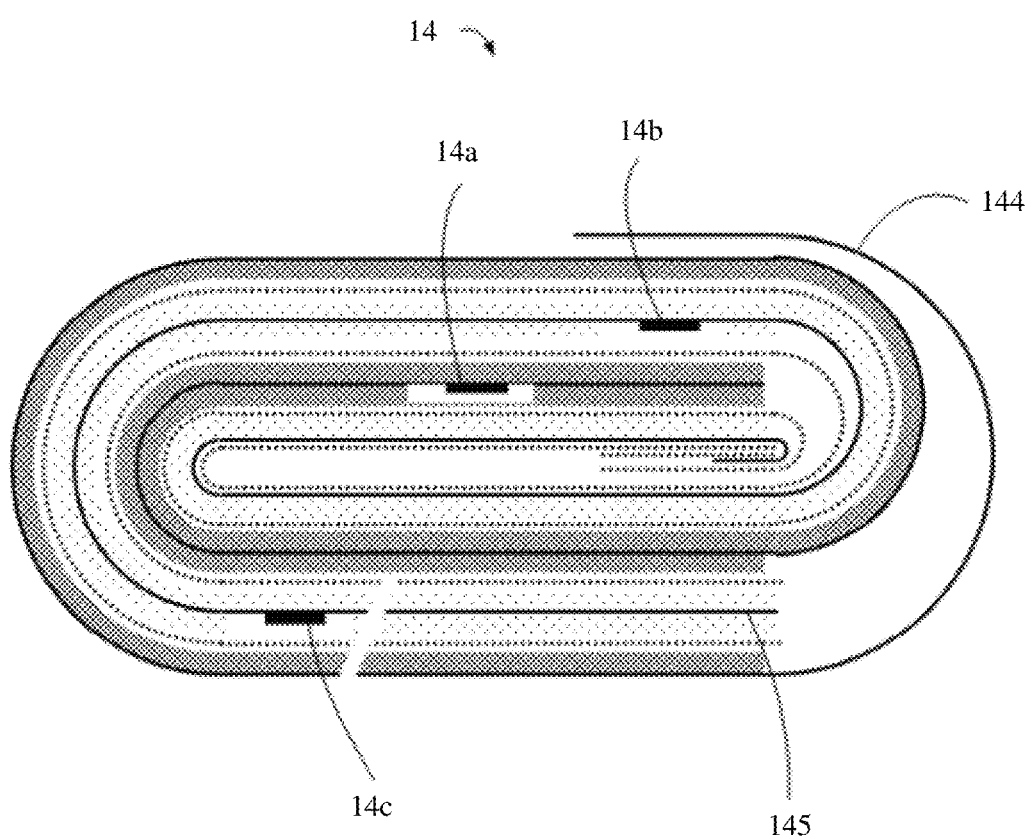
FIG. 24 is a top view of the battery cell shown in FIG. 23.
Figure 25:
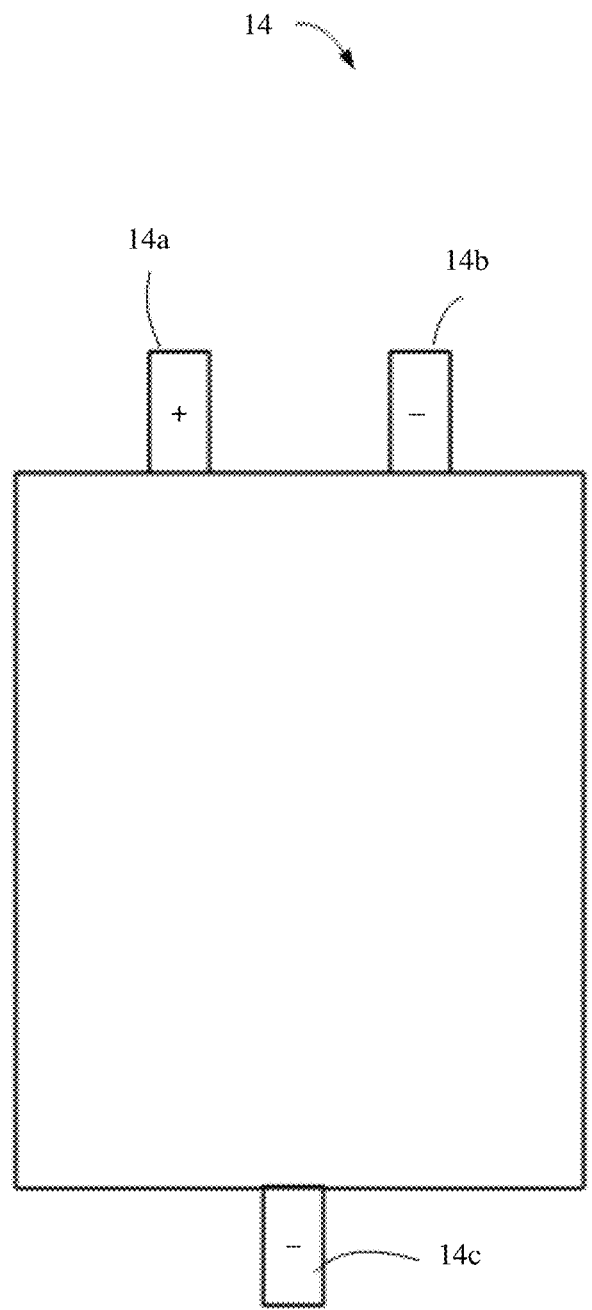
FIG. 25 is a schematic diagram of a frontal structure of the battery cell shown in FIG. 24.

For example, it may be that any two of the three tabs face a same direction, and the other faces a different direction. As shown in FIG. 23, the tab 14b and the tab 14a face a same direction, that is, face upwards as shown in the figure, and the tab 14c faces a direction different from the direction that the tab 14b faces, that is, faces downwards as shown in the figure. It may be understood that it may alternatively be that the tab 14b and the tab 14a both face downwards, and the tab 14c faces upwards. FIG. 24 is a top view of a battery cell 14 shown in FIG. 23. FIG. 25 is a schematic diagram of a frontal structure of the battery cell 14 shown in FIG. 24.

Figure 26:
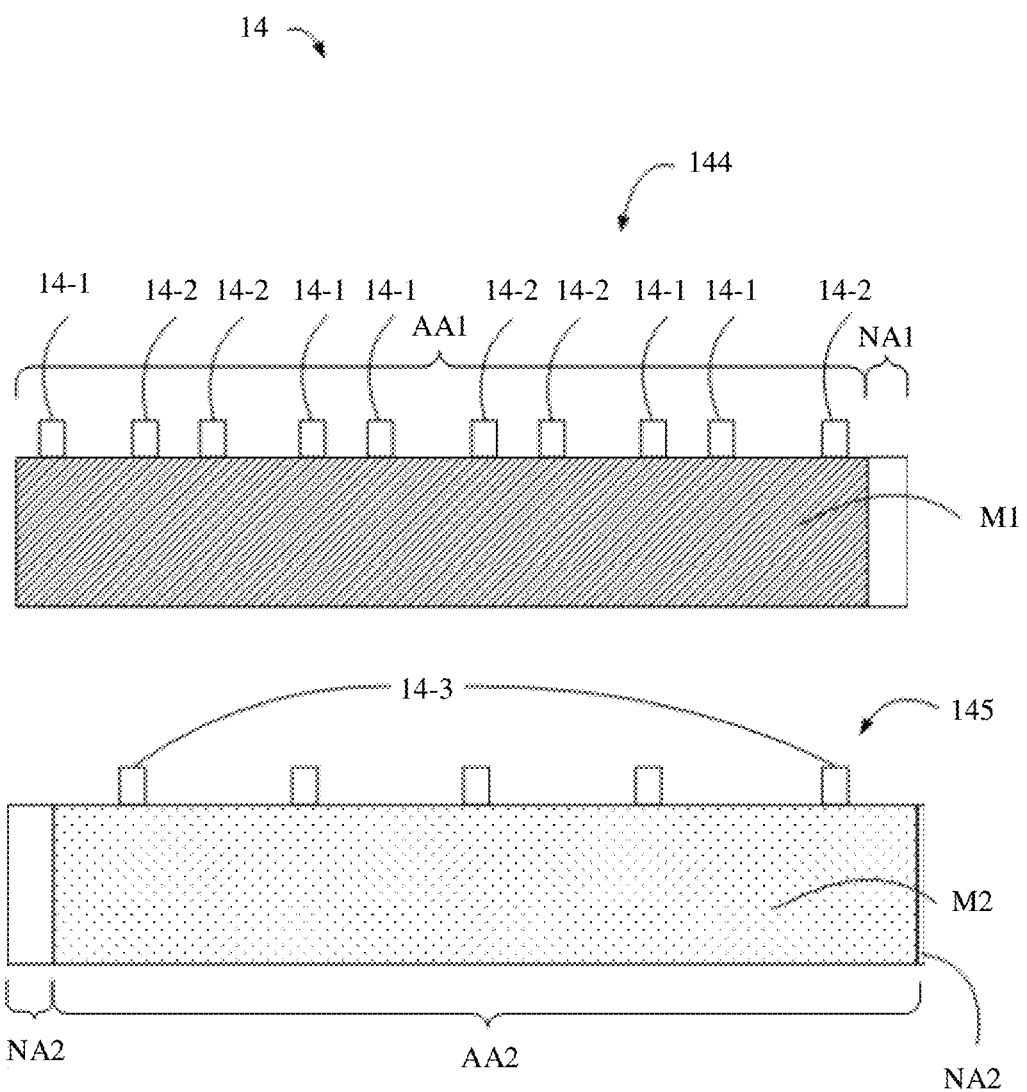
FIG. 26 is a schematic exploded structural diagram of a battery cell with three tabs according to an embodiment of this application.
Figure 27:
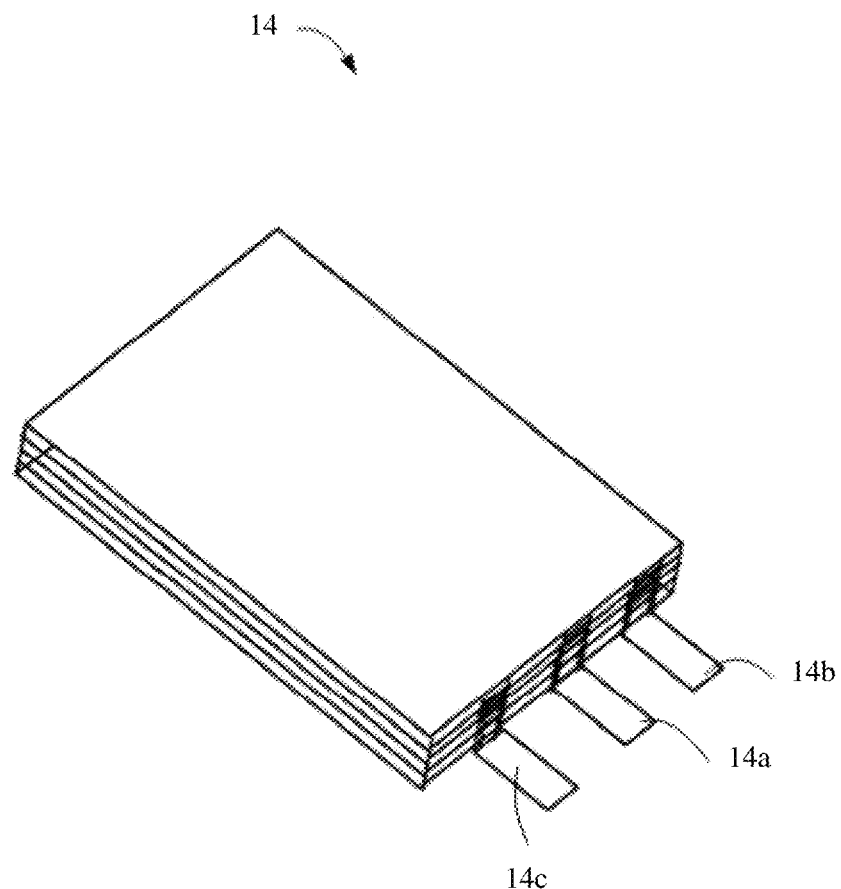
FIG. 27 is a schematic diagram of a three-dimensional structure of the battery cell shown in FIG. 26.
Figure 28:
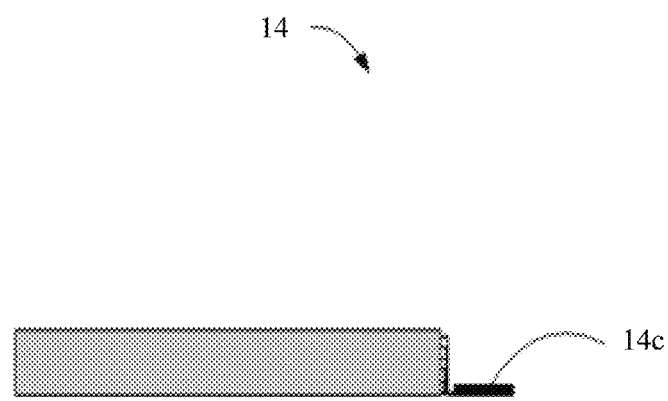
FIG. 28 is a left view of the battery cell shown in FIG. 27.

In the foregoing embodiments shown in FIG. 16A to FIG. 25, the tabs on the electrode plates are in a one-to-one correspondence with the tabs of the battery cell. To be specific, if a battery cell has three tabs, there are also three tabs in total on two electrode plates. In another embodiment, a plurality of tabs on an electrode plate may correspond to one tab of a battery cell. As shown in FIG. 26, an electrode plate 144 may include a plurality of tabs 14-1 (may also be referred to as sub-tabs) and a plurality of tabs 14-2. After the electrode plate 144 and an electrode plate 145 are wound together, the plurality of tabs 14-1 overlap and are electrically connected to form a tab 14b of a battery cell, and the plurality of tabs 14-2 overlap to form a tab 14c of the battery cell. Optionally, the electrode plate 145 may also include a plurality of tabs 14-3. After the electrode plate 144 and the electrode plate 145 are wound together, the plurality of tabs 14-3 overlap and are electrically connected to form a tab 14a of the battery cell. In this embodiment of this application, a quantity and positions that are of the tabs (the sub-tabs) on the electrode plates are not limited, provided that it is ensured that a required quantity of tabs at required positions can be formed after the two electrode plates are wound. A person skilled in the art may design the quantity and the positions that are of the tabs based on circuit design and a circuit layout. When an electrode plate includes a plurality of tabs, these tabs may be disposed in an active area of the electrode plate, may be disposed in a non-active area of the electrode plate, or it may be that some of the tabs are disposed in an active area, and others of the tabs are disposed in a non-active area. FIG. 27 is a schematic diagram of a three-dimensional structure of the battery cell 14 shown in FIG. 26. FIG. 28 is a left view of the battery cell 14 shown in FIG. 27. For a main view of the battery cell shown in FIG. 26 to FIG. 28, refer to FIG. 18.

In the foregoing embodiment, the battery cell is of a winding structure, and includes two electrode plates that are wound together. Optionally, an internal structure of the battery cell may further include another electrode plate structure, for example, a laminated structure. For example, the battery cell may include a plurality of electrode plates 144 that have a first polarity and a plurality of electrode plates 145 that have a second polarity. The electrode plates 144 and the electrode plates 145 are laminated to form the battery cell. During laminating, the electrode plates 144 and the electrode plates 145 may be disposed in an interleaved manner. To be specific, one electrode plate 145 is laminated between two electrode plates 144, and one electrode plate 144 is laminated between two electrode plates 145.

Figure 29:
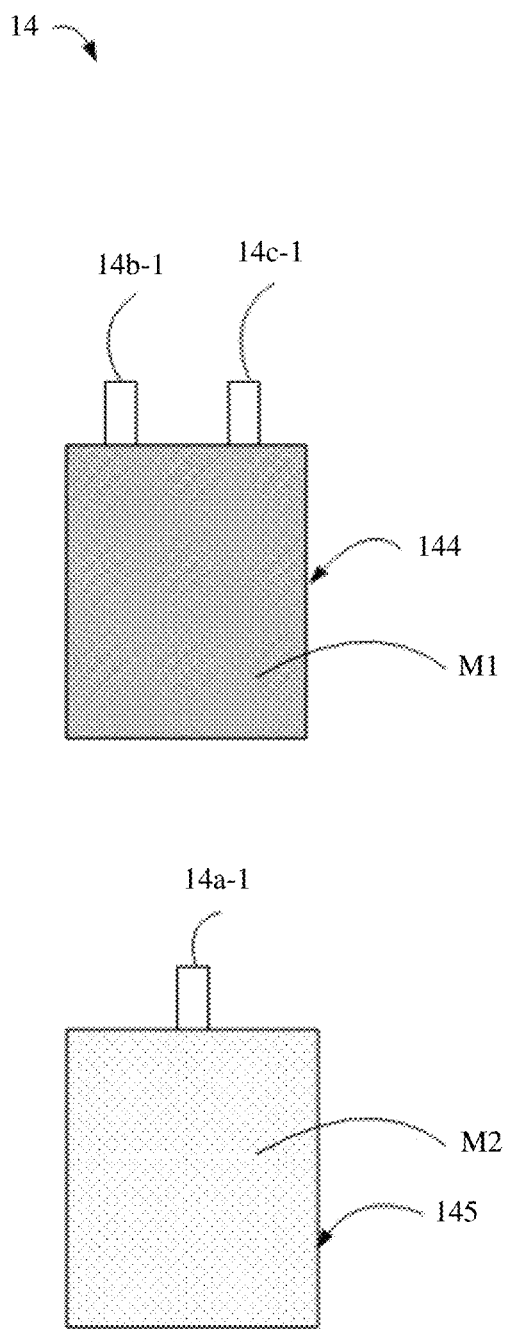
FIG. 29 is a schematic exploded structural diagram of a battery cell according to an embodiment of this application.

In the embodiments of this application, to form a three-tab battery cell, it may be that two tabs are disposed on any side of any electrode plate, and one tab is disposed on any side of the other electrode plate. FIG. 29 is a schematic exploded structural diagram of a battery cell 14 according to an embodiment of this application. It may be that a sub-tab 14*b*-1 and a sub-tab 14*c*-1 are disposed on a first side of each electrode plate 144, and a sub-tab 14*a*-1 is disposed on each electrode plate 145. All the electrode plates 144 and all the electrode plates 145 are laminated together. The sub-tabs 14*b*-1 on all the electrode plates 144 are electrically connected (for example, welded together) to form a tab 14*b* of the battery cell, the sub-tabs 14*c*-1 on all the electrode plates 144 are electrically connected to form a tab 14*c* of the battery cell, and the sub-tabs 14*a*-1 on all the electrode plates 145 are electrically connected to form a tab 14*a* of the battery cell.

Optionally, a plurality of sub-tabs disposed on an electrode plate may face different directions. As shown in FIG. 29, the sub-tab 14*b*-1, the sub-tab 14*c*-1, and the sub-tab 14*a*-1 all face upwards. In another embodiment, the three sub-tabs may face different arbitrary directions. For example, the sub-tab 14*a*-1 may face right or left.

For a schematic diagram of a three-dimensional structure of the battery cell formed after the electrode plates 144 and the electrode plates 145 in FIG. 29 are laminated, refer to FIG. 27.

Figure 30:
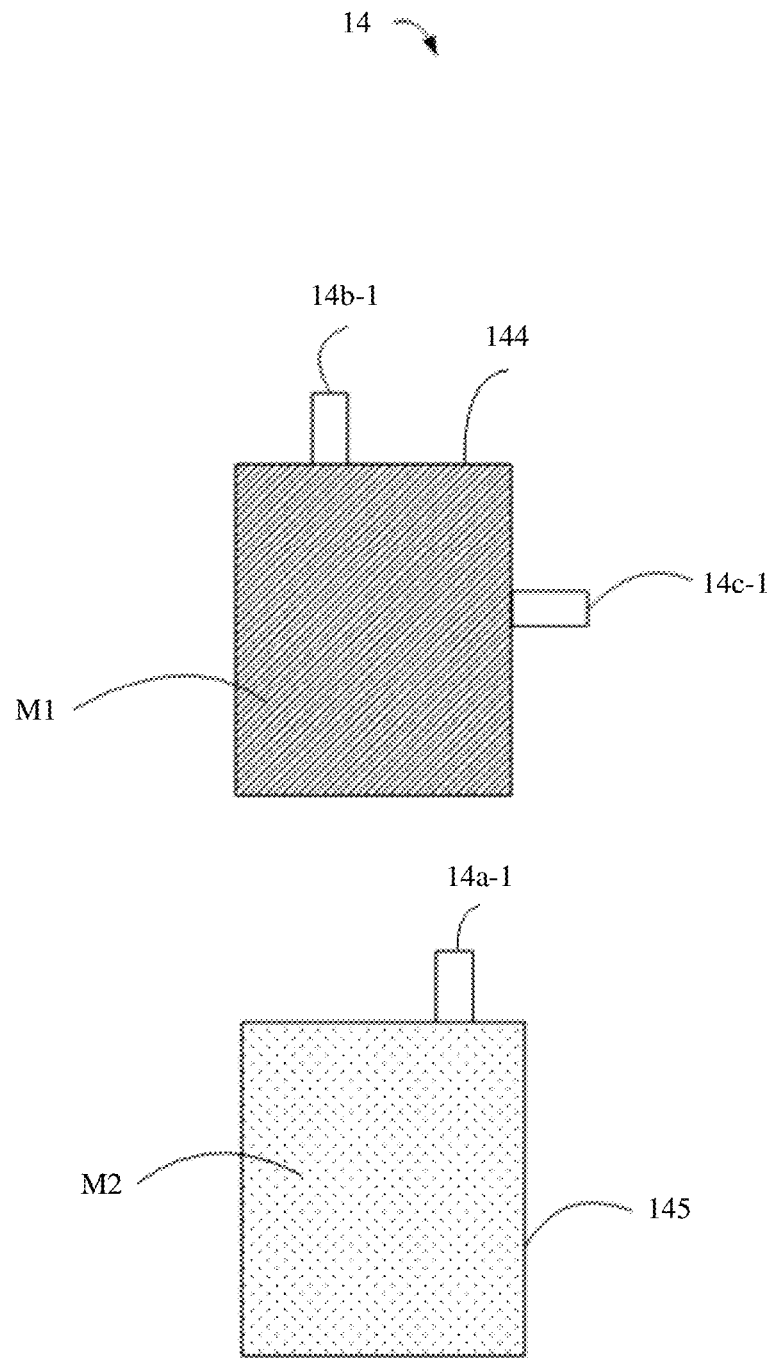
FIG. 30 is a schematic exploded structural diagram of a battery cell according to an embodiment of this application.
Figure 31:
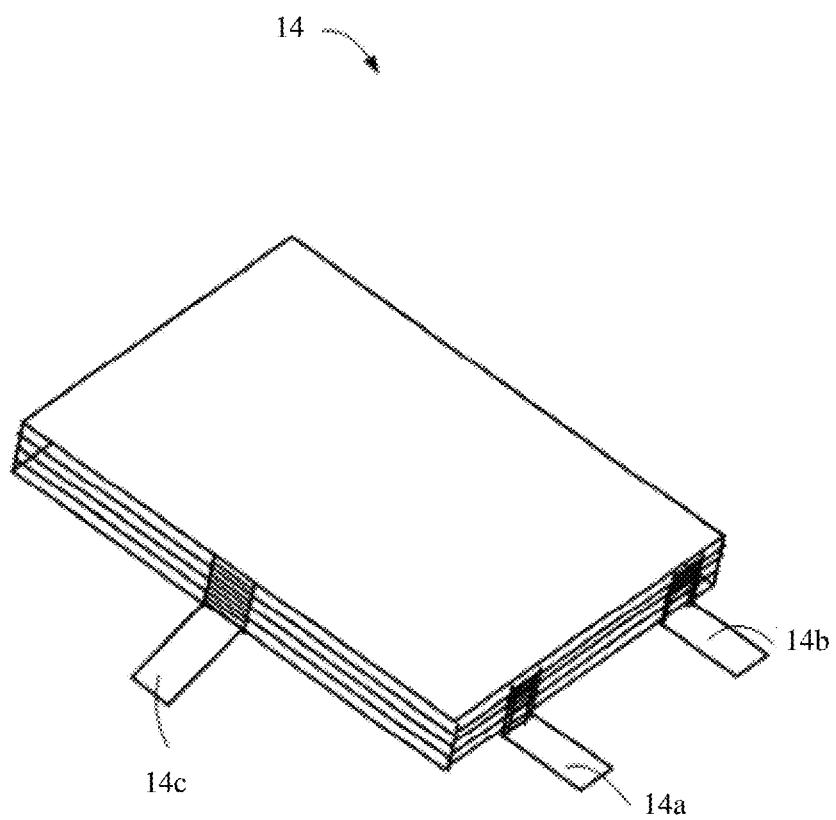
FIG. 31 is a schematic diagram of a three-dimensional structure of the battery cell shown in FIG. 30.
Figure 32:
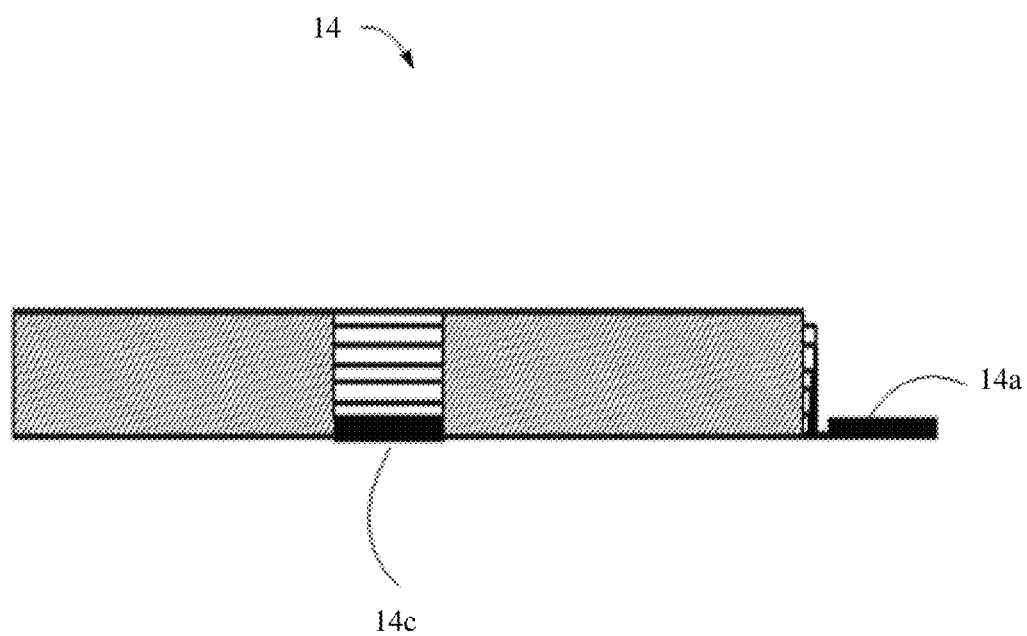
FIG. 32 is a left view of the battery cell shown in FIG. 31.
Figure 33:
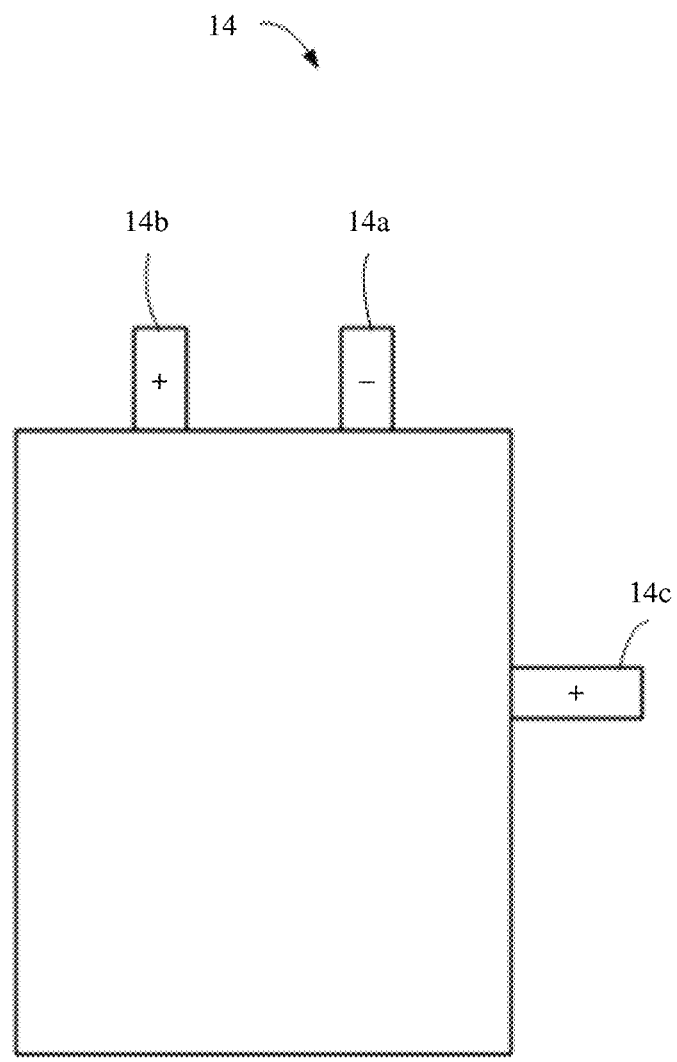
FIG. 33 is a main view of the battery cell shown in FIG. 31.

Optionally, a plurality of sub-tabs disposed on a same electrode plate may face different directions. For example, the sub-tab 14*b*-1 and the sub-tab 14*c*-1 on the electrode plate 144 face different directions. As shown in FIG. 30, a sub-tab 14*b*-1 and a sub-tab 14*a*-1 face upwards, and a sub-tab 14*c*-1 faces left. FIG. 31 is a schematic diagram of a three-dimensional structure of a battery cell 14 shown in FIG. 30. FIG. 32 is a left view of the battery cell 14 shown in FIG. 31. FIG. 33 is a main view of the battery cell shown in FIG. 31.

Figure 34:
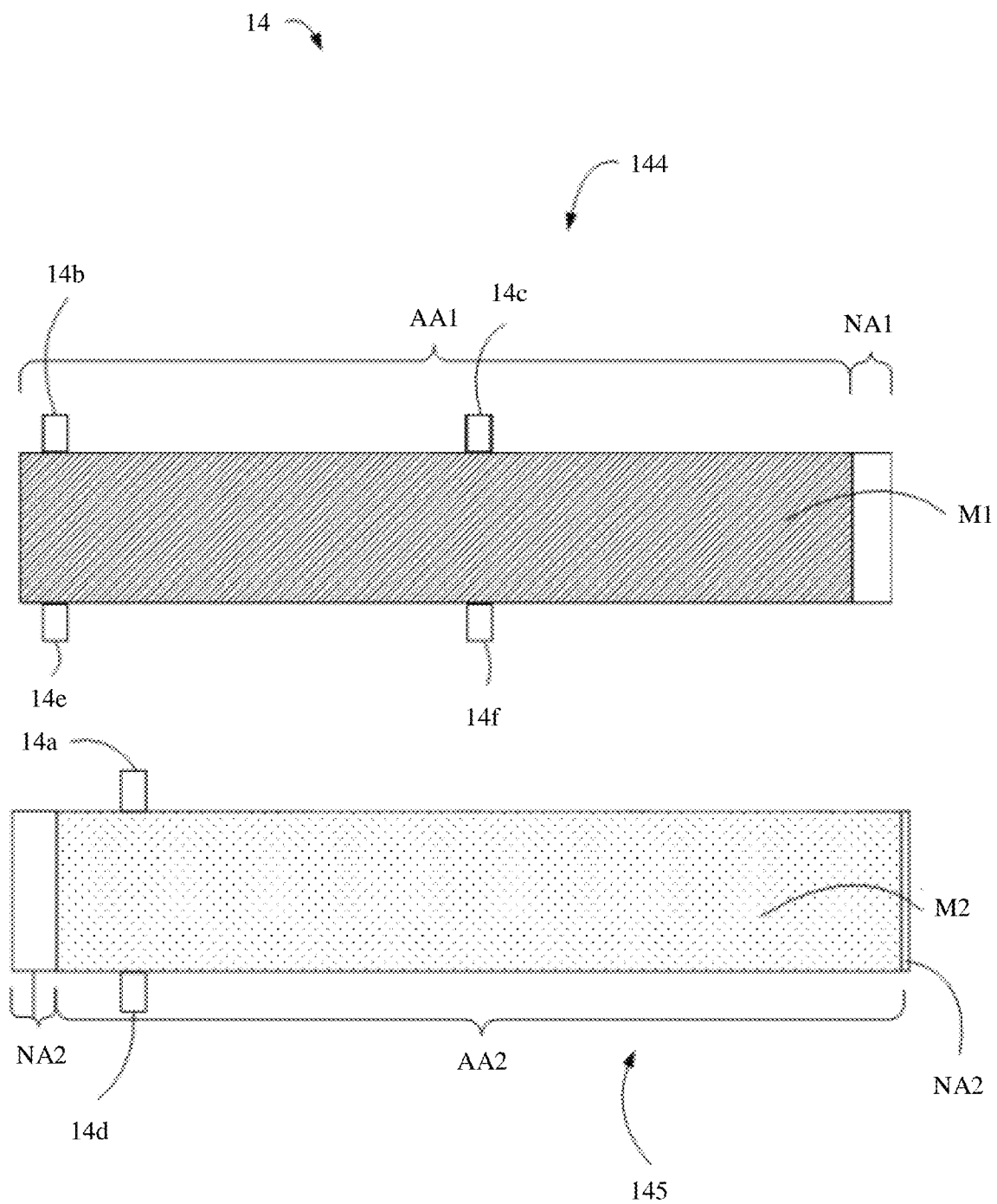
FIG. 34 is a schematic exploded structural diagram of a battery cell with six tabs according to an embodiment of this application.
Figure 35:
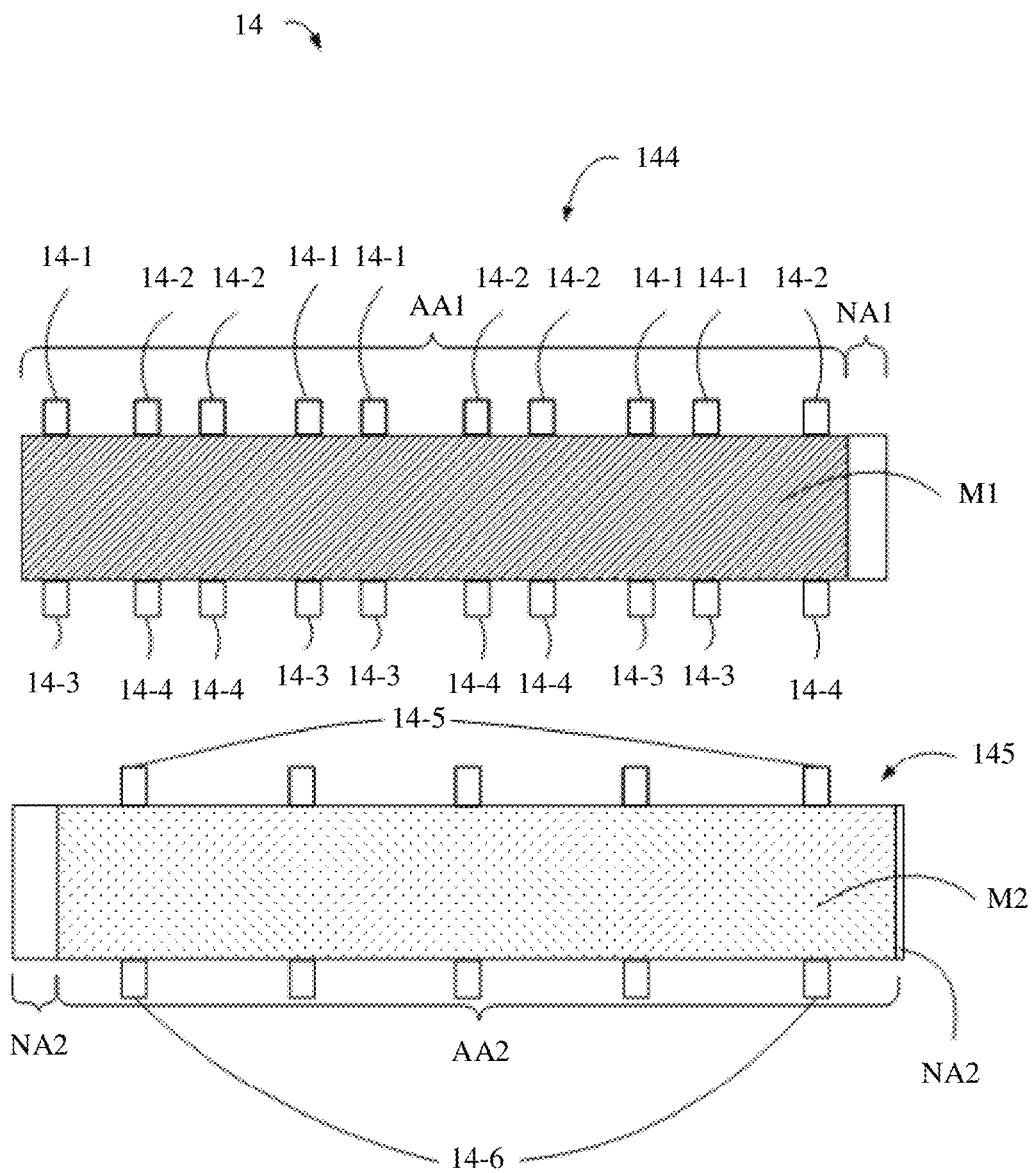
FIG. 35 is a schematic exploded structural diagram of a battery cell with six tabs according to an embodiment of this application.

In an embodiment of this application, as shown in FIG. 34, when a battery cell has six tabs, there are also six tabs in total on two electrode plates. For example, as shown in FIG. 34, four tabs having a same polarity are disposed on an electrode plate 144, and two tabs having a same polarity are disposed on an electrode plate 145. In another embodiment, a plurality of sub-tabs on an electrode plate may correspond to one tab of a battery cell. As shown in FIG. 35, an electrode plate 144 may include a plurality of sub-tabs 14-1, a plurality of sub-tabs 14-2, a plurality of sub-tabs 14-3, and a plurality of sub-tabs 14-4. After the electrode plate 144 and an electrode plate 145 are wound together, the plurality of sub-tabs 14-1 overlap and are electrically connected to form a tab 14*b* of a battery cell, the plurality of sub-tabs 14-2 overlap and are electrically connected to form a tab 14*c* of the battery cell, the plurality of sub-tabs 14-3 overlap and are electrically connected to form a tab 14*e* of the battery cell, and the plurality of sub-tabs 14-4 overlap to form a tab 14*f* of the battery cell.

Optionally, the electrode plate 145 may also include a plurality of sub-tabs 14-5. After the electrode plate 144 and the electrode plate 145 are wound together, the plurality of sub-tabs 14-5 overlap and are electrically connected to form a tab 14*a* of the battery cell, and the plurality of sub-tabs 14-6 overlap and are electrically connected to form a tab 14*d* of the battery cell.

Figure 36:
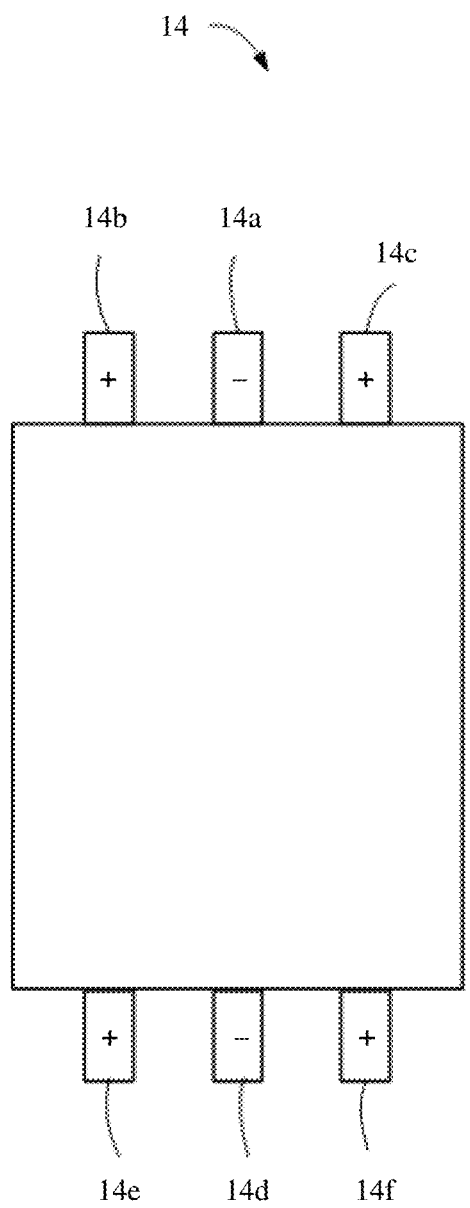
FIG. 36 is a schematic diagram of a planar structure of the battery cell shown in FIG. 34.

In this embodiment of this application, a quantity and positions that are of the tabs on the electrode plates are not limited, provided that it is ensured that a required quantity of tabs at required positions can be formed after the two electrode plates are wound. A person skilled in the art may design the quantity and the positions that are of the tabs based on circuit design and a circuit layout. When an electrode plate includes a plurality of tabs, these tabs may be disposed in an active area of the electrode plate, may be disposed in a non-active area of the electrode plate, or it may be that some of the tabs are disposed in an active area, and others of the tabs are disposed in a non-active area. FIG. 36 is a schematic diagram of a front of the battery cell 14 shown in FIG. 35.

Figure 37:
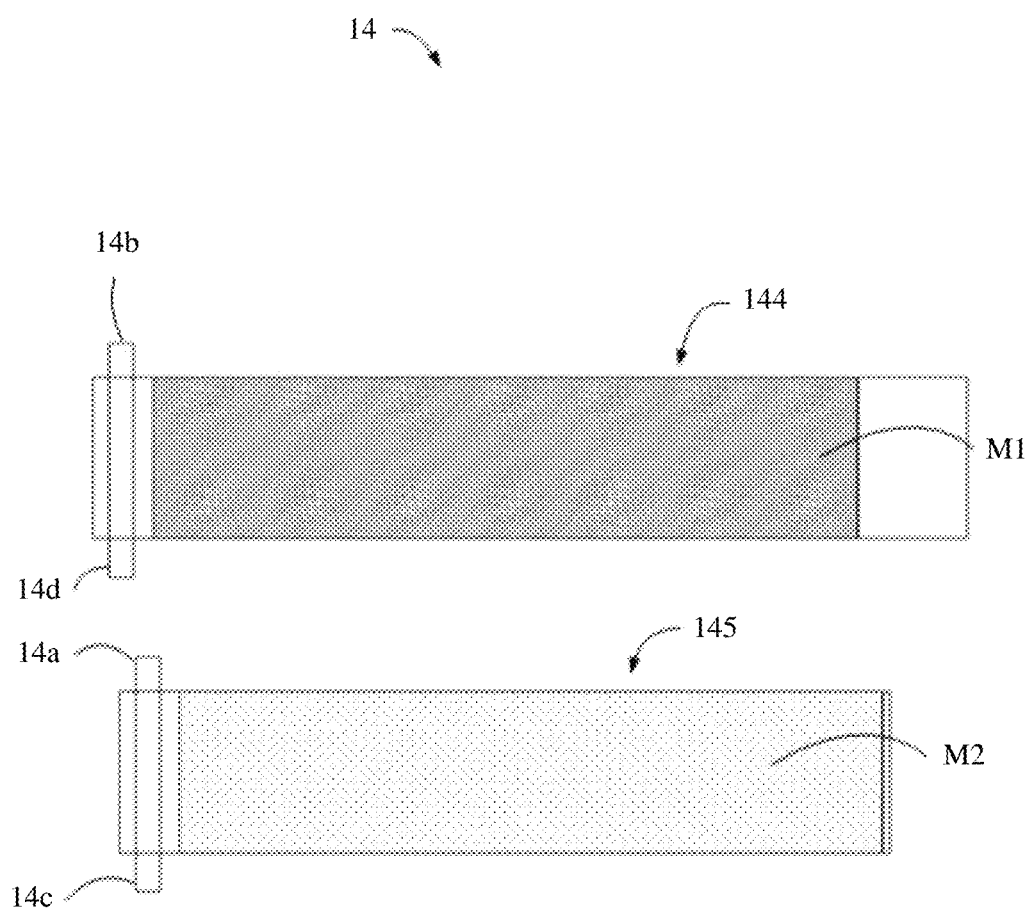
FIG. 37 is a schematic diagram of a planar structure of a battery cell with four tabs according to an embodiment of this application.
Figure 38:
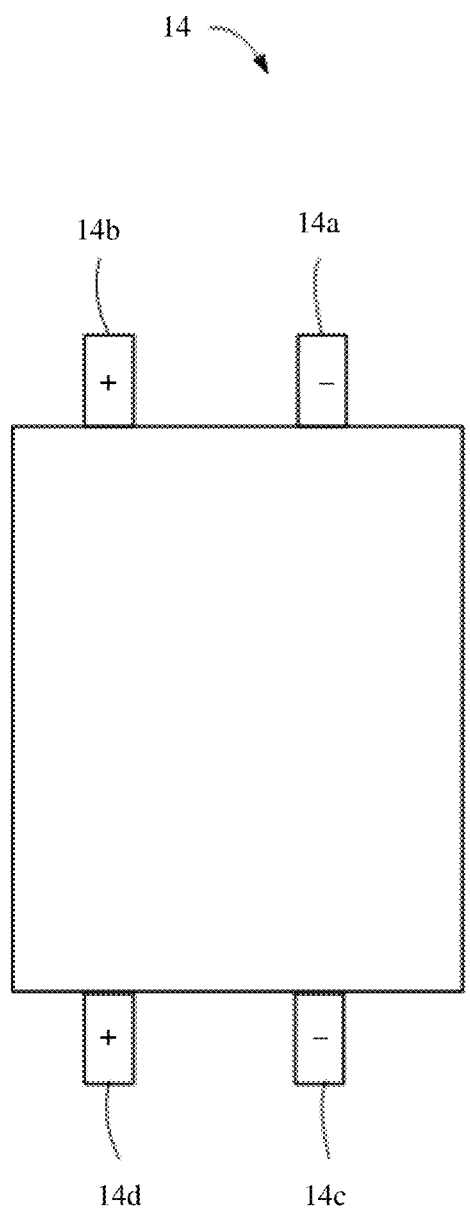
FIG. 38 is a schematic diagram of a frontal structure of the battery cell shown in FIG. 37.

Optionally, in a battery cell 14, all tabs having a same polarity are electrically connected to each other inside a battery cell body, so that the tabs having a same polarity have a same voltage. As shown in FIG. 37, in an electrode plate 144, two tabs 14*b* and 14*d* that are disposed along different sides and face two opposite directions are directly electrically connected in the electrode plate 144, or the two tabs 14*b* and 14*d* are integrally formed in the electrode plate 144. In an electrode plate 145, two tabs 14*a* and 14*c* that are disposed along different sides and face two opposite directions are directly electrically connected in the electrode plate 145, or the two tabs 14*a* and 14*c* are integrally formed in the electrode plate 145. FIG. 38 is a schematic diagram of a frontal structure of a battery cell 14 shown in FIG. 37. FIG. 37 and FIG. 38 are schematic diagrams of a four-tab structure.

It should be noted that when a tab is located in an active area AA of an electrode plate, it may be that no non-active area is disposed in the electrode plate, or it may be that a non-active area is disposed only at one end of the electrode plate.

It should be noted that in the embodiments of this application, a tab and an electrode plate may be two components, and are connected through welding; or a tab and an electrode plate may be integrated, and a tab is formed through cutting of the electrode plate based on a required position and a required quantity.

Figure 39:
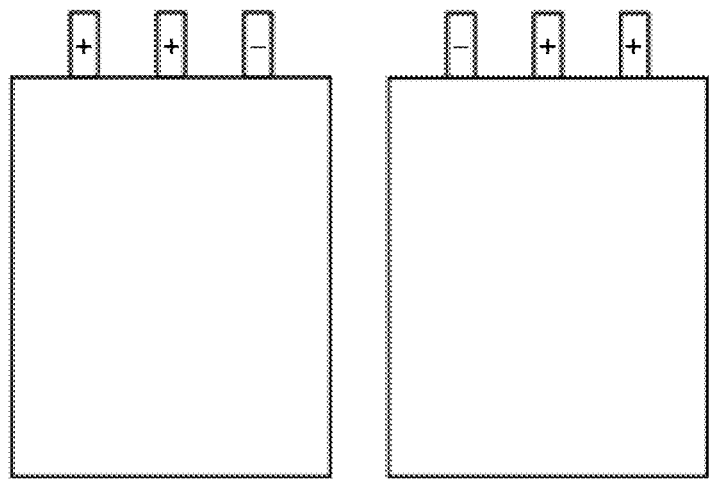
FIG. 39 is a schematic diagram of a battery cell with three tabs according to an embodiment of this application.
Figure 40:
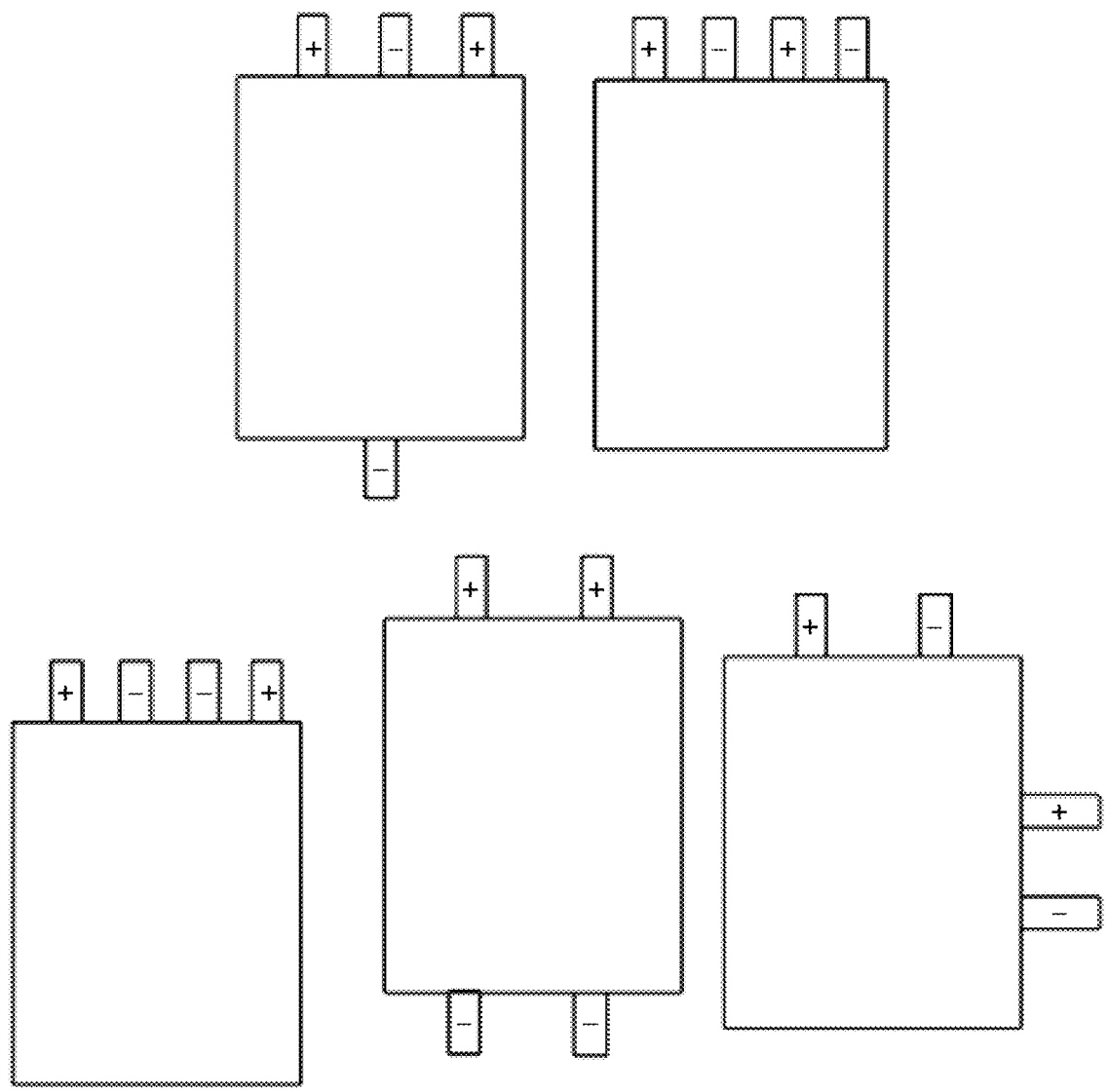
FIG. 40 is a schematic diagram of a battery cell with four tabs according to an embodiment of this application.
Figure 41:
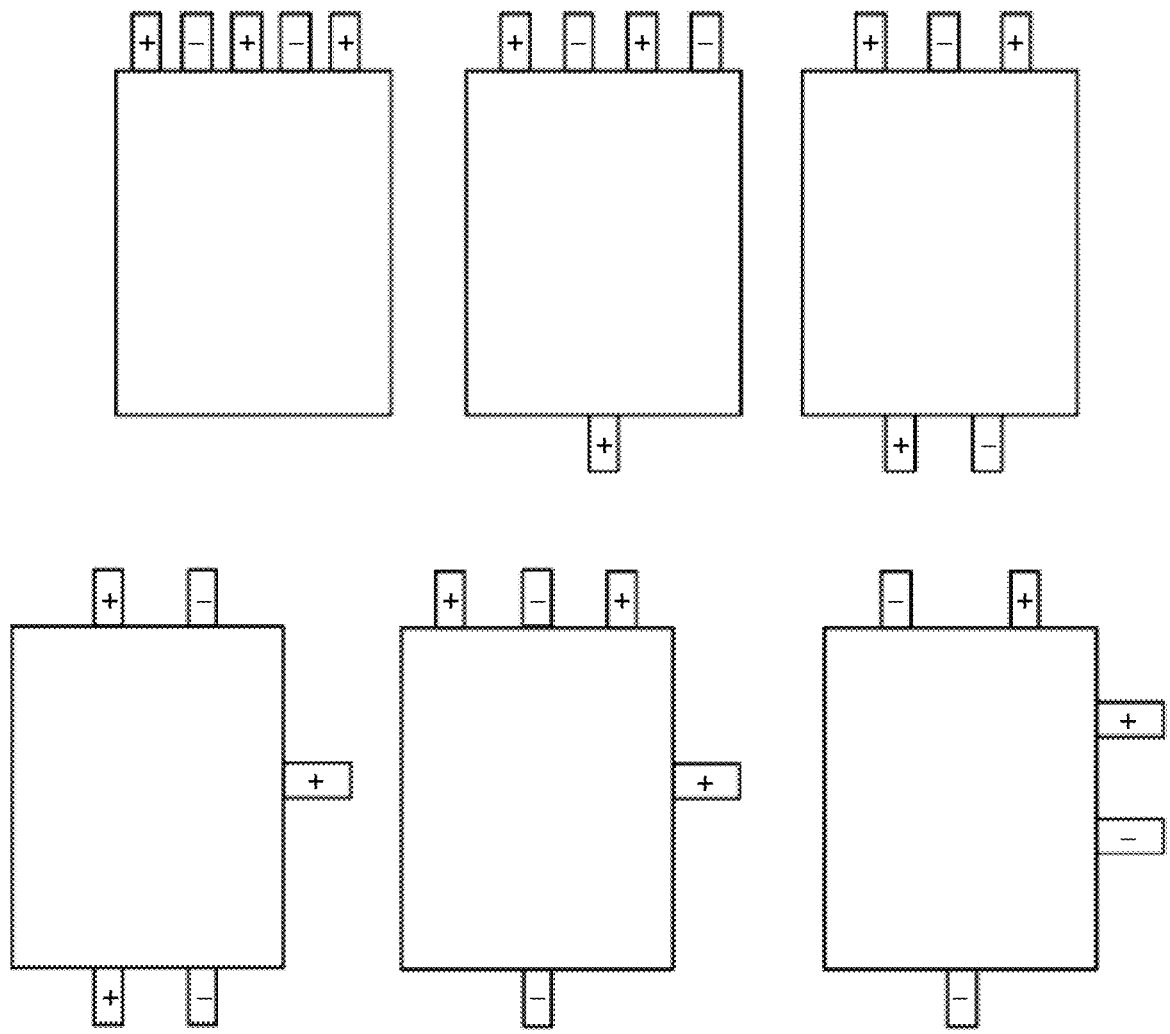
FIG. 41 is a schematic diagram of a battery cell with five tabs according to an embodiment of this application.
Figure 42:
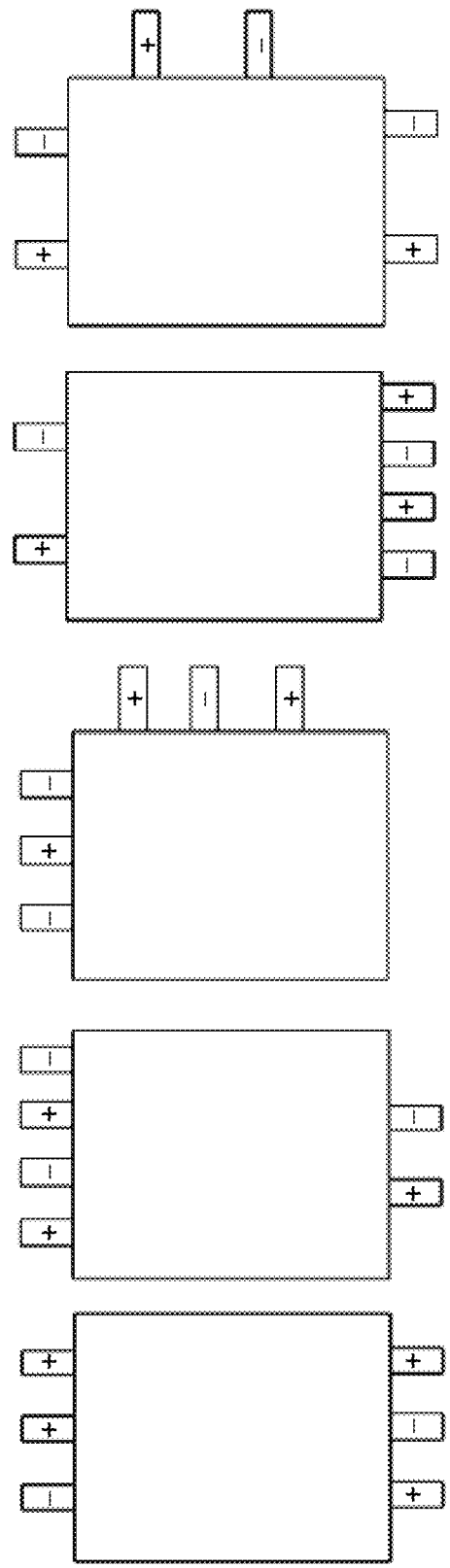
FIG. 42 is a schematic diagram of a battery cell with six tabs according to an embodiment of this application.

It should be noted that in the multi-tab battery modules provided in the embodiments of this application, the plurality of tabs may be disposed at any positions on a battery cell body. FIG. 39 shows structures of some possible three-tab battery modules according to an embodiment of this application. FIG. 40 shows structures of some possible four-tab battery modules according to an embodiment of this application. FIG. 41 shows structures of some possible five-tab battery modules according to an embodiment of this application. FIG. 42 shows structures of some possible six-tab battery modules according to an embodiment of this application.

Figure 43:
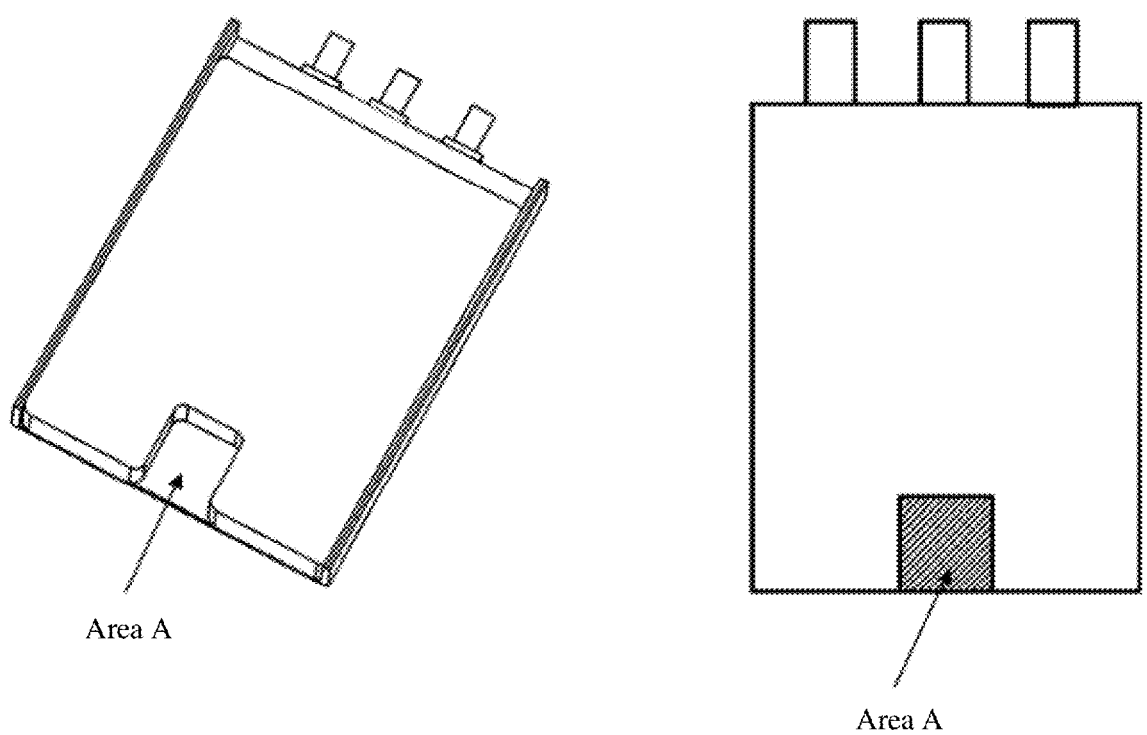
FIG. 43 is a schematic diagram of a non-penetrating battery cell according to an embodiment of this application.
Figure 44:
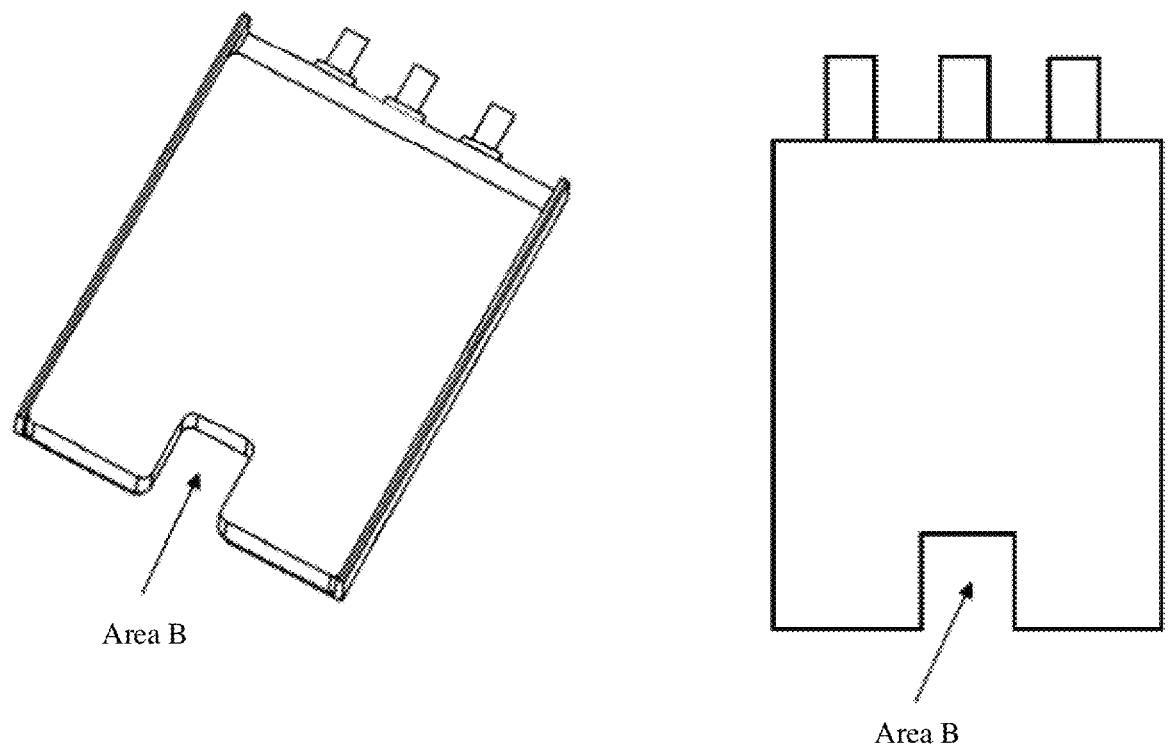
FIG. 44 is a schematic diagram of a penetrating battery cell according to an embodiment of this application.

It should be noted that in the battery modules provided in the embodiments of this application, a structure of a battery cell body is not limited. The battery cell body may be in a conventional shape, for example, a rectangle, a square, or a shape similar to a rectangle or a square. Alternatively, the battery cell body may be in an irregular shape. For example, as shown in FIG. 43, the battery cell body may be of a non-penetrating type. A non-penetrating battery cell body may be one with a non-penetrating area A (a shape of the area is not limited) present in the battery cell body or at an edge of the battery cell body, where aluminum plastic film of the battery at a position that corresponds to the area A is provided with no through-hole, but a positive electrode, a negative electrode, and a separator of the battery that are at that position may be provided with a through-hole. After the battery module is installed in an electronic device, a component of the electronic device may totally or partially extend into the area A, but cannot run through the battery cell body. Alternatively, as shown in FIG. 44, the battery cell body may be of a penetrating type. A penetrating battery cell body may be one with a through hole (an area B) provided in the battery cell body or at an edge of the battery cell body, where a positive electrode, a negative electrode, a separator, and aluminum plastic film of the battery that are at a position that corresponds to the area B are all provided with a through-hole. After the battery module is installed in an electronic device, a component of the electronic device can pass through the area B in the battery. Main materials of the battery include the aluminum plastic film, the positive electrode, the negative electrode, and the separator.

Figure 45:
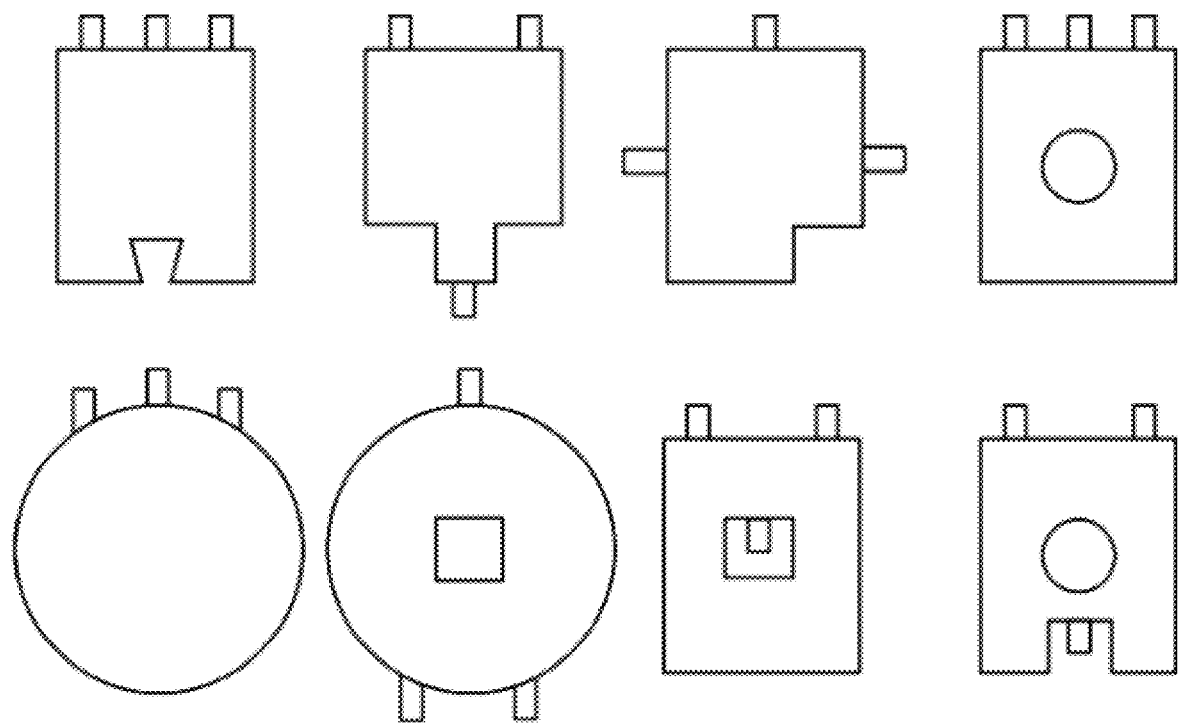
FIG. 45 is a schematic diagram of a battery cell with three tabs according to an embodiment of this application.
Figure 46:
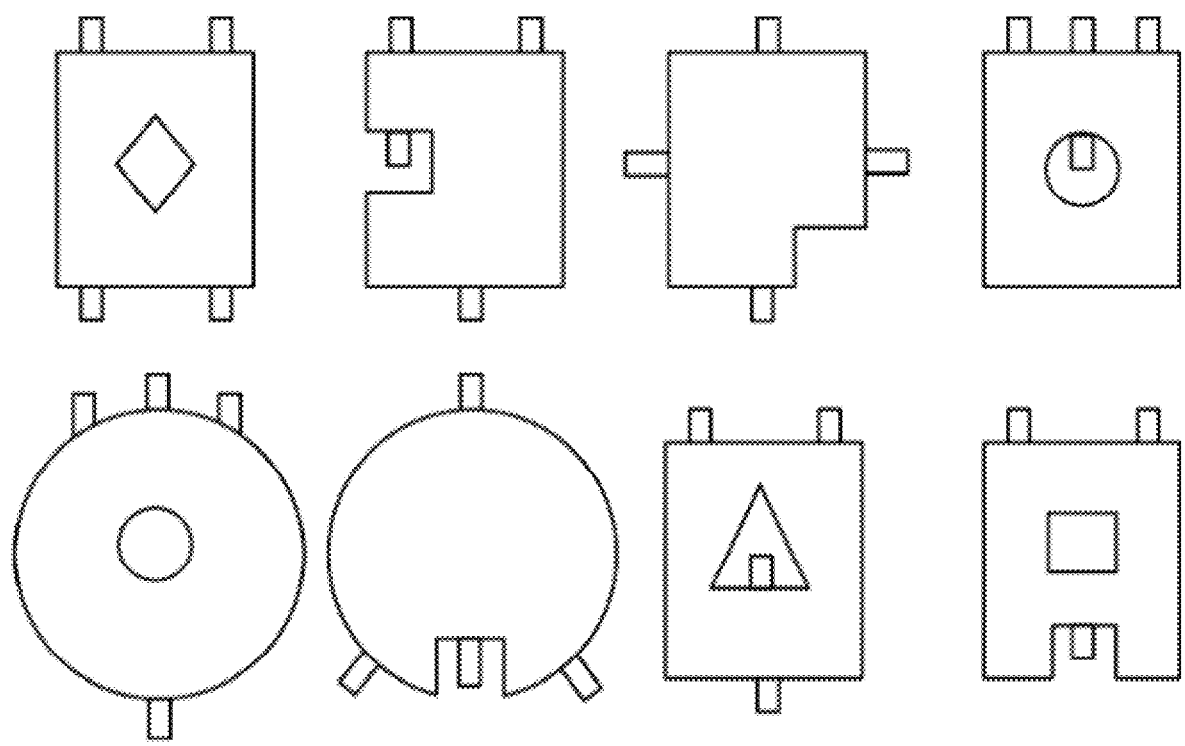
FIG. 46 is a schematic diagram of a battery cell with four tabs according to an embodiment of this application.
Figure 47:
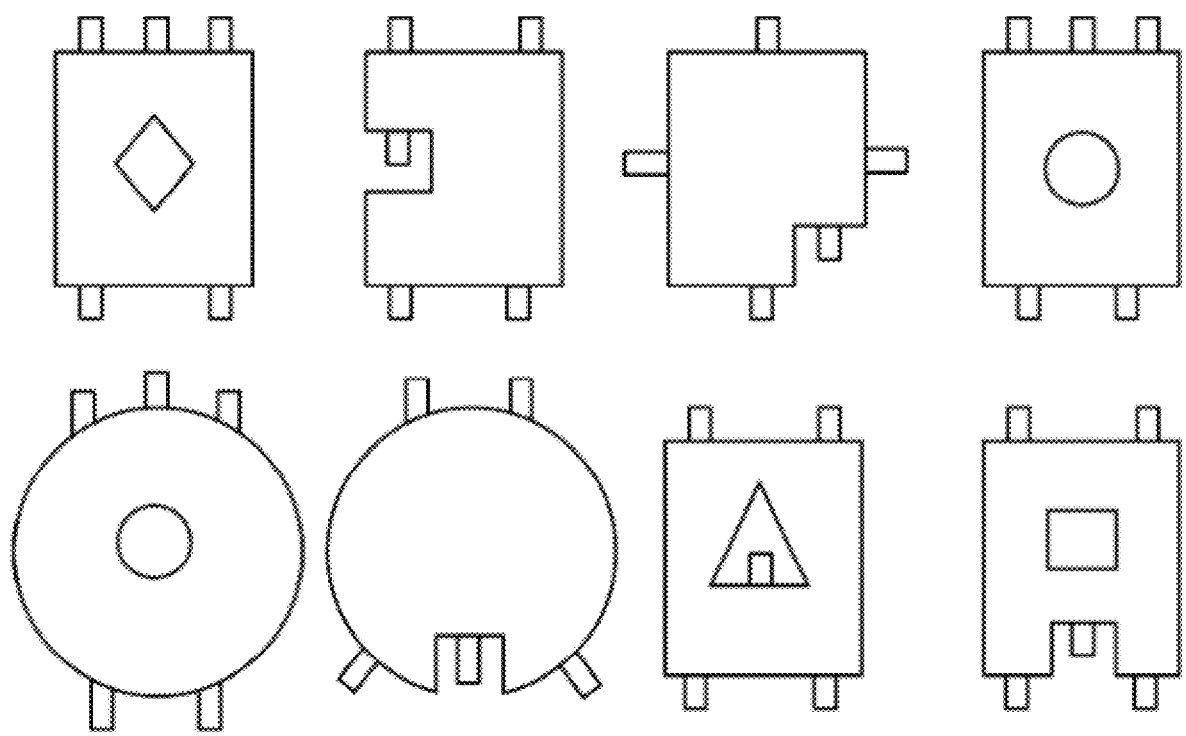
FIG. 47 is a schematic diagram of a battery cell with five tabs according to an embodiment of this application.
Figure 48:
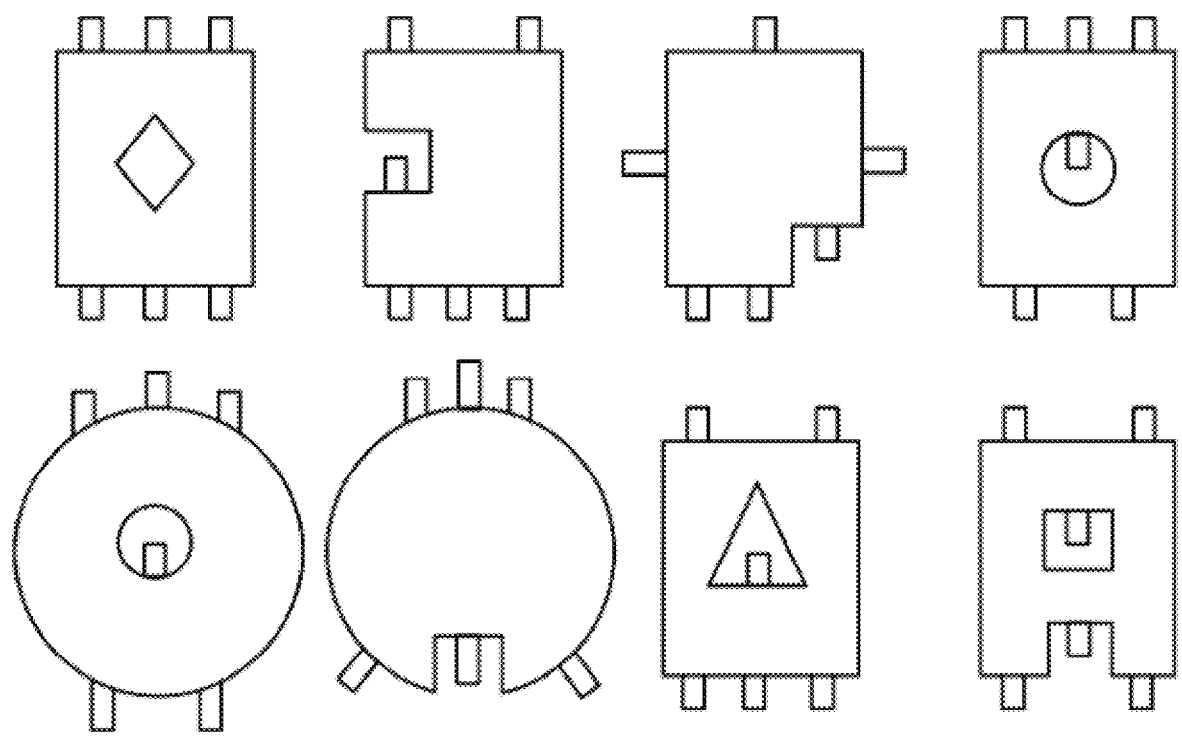
FIG. 48 is a schematic diagram of a battery cell with six tabs according to an embodiment of this application.

In addition, in the battery modules provided in the embodiments of this application, a shape of a battery cell body is not limited. The battery cell body may be in various shapes, and may have different tab distributions. FIG. 45 shows structures of some possible three-tab battery modules according to an embodiment of this application. FIG. 46 shows structures of some possible four-tab battery modules according to an embodiment of this application. FIG. 47 shows structures of some possible five-tab battery modules according to an embodiment of this application. FIG. 48 shows structures of some possible six-tab battery modules according to an embodiment of this application.

An embodiment of this application further provides an electronic device. The electronic device includes a functional circuit and the charging module described in the foregoing embodiments. The charging module is configured to provide an operating power supply for the functional circuit. The electronic device may be any portable device that can be charged, for example, a mobile phone, a notebook computer, a wearable device (for example, a smartwatch or a smart band), or a tablet computer. When the electronic device is a mobile phone, the charging module receives electrical energy of an external power supply and stores the electrical energy, and the battery module supplies power to another component of the mobile phone.

The charging circuits provided in the embodiments of this application are described in detail above. The principles and the embodiments of this application are described in this specification by using specific examples. The foregoing descriptions about the embodiments are merely provided to help understand the method and the core idea of this application. In addition, a person of ordinary skill in the art can make changes to the specific embodiments and the application scope according to the idea of this application. Therefore, the content of this specification shall not be construed as a limitation on this application.

What is claimed is:

1. A battery module, comprising:
a battery cell; and
a first battery protection board;
wherein the battery cell comprises a battery cell body, a first tab, a second tab, and a third tab, wherein the first tab, the second tab, and the third tab are separately electrically connected to the battery cell body, the first tab and the third tab have a first polarity, and the second tab has a second polarity;
working together, the second tab and the first tab are capable of inputting a voltage and a current to the battery cell body or capable of outputting a voltage and a current from the battery cell body;
working together, the second tab and the third tab are capable of inputting a voltage and a current to the battery cell body or capable of outputting a voltage and a current from the battery cell body;
the first polarity is a positive polarity, and the second polarity is a negative polarity; or
the first polarity is a negative polarity, and the second polarity is a positive polarity;
the first battery protection board comprises a first protection circuit, a first battery interface, and a second battery interface, and the first battery interface and the second battery interface are configured to be electrically connected to a component outside the battery module;
the first battery interface is separately electrically connected to the second tab and the first tab by using the first protection circuit, and wherein the first battery interface, the first tab, the battery cell body, the second tab, and the first protection circuit are a first conductive loop;
the second battery interface is separately electrically connected to the second tab and the third tab by using the first protection circuit, and the second battery interface, the third tab, the battery cell body, the second tab, and the first protection circuit are a second conductive loop; and
the first protection circuit is configured to detect voltages and currents that are in the first conductive loop and the second conductive loop, and configured to, when the voltages or the currents exceed a threshold range, disconnect the first conductive loop and the second conductive loop.

2. The battery module according to claim 1, wherein the first protection circuit comprises a first protection control circuit, a first sampling circuit, and a first switch circuit;
the first protection control circuit is separately electrically connected to the first conductive loop and the second conductive loop, and the first protection control circuit is configured to detect the voltages in the first conductive loop and the second conductive loop;
the first sampling circuit is separately electrically connected to the second tab, the first protection control circuit, and the first switch circuit, and the first protection control circuit is configured to detect the currents in the first conductive loop and the second conductive loop by using the first sampling circuit;

the first switch circuit is separately electrically connected to the first protection control circuit, the first sampling circuit, the first battery interface, and the second battery interface; and the first protection control circuit is configured to, when determining that the voltage or current in the first conductive loop or the second conductive loop exceeds a first threshold range, control the first switch circuit to cut off, to disconnect the first conductive loop and the second conductive loop.

3. The battery module according to claim 2, wherein the first switch circuit comprises a first switch and a second switch, the first switch is located in the first conductive loop, and the second switch is located in the second conductive loop.

4. The battery module according to claim 2, wherein the first protection circuit further comprises a second protection control circuit and a second switch circuit;

the second protection control circuit is separately electrically connected to the first conductive loop and the second conductive loop, and the second protection control circuit is configured to detect the voltages in the first conductive loop and the second conductive loop;

the second protection control circuit is electrically connected to the first sampling circuit, and is configured to detect the currents in the first conductive loop and the second conductive loop by using the first sampling circuit;

the second switch circuit is separately electrically connected to the second protection control circuit, the first switch circuit, the first battery interface, and the second battery interface; and the second protection control circuit is configured to, when determining that the voltage or current in the first conductive loop or the second conductive loop exceeds a second threshold range, control the second switch circuit to cut off, to disconnect the first conductive loop and the second conductive loop.

5. The battery module according to claim 4, wherein the second switch circuit comprises a third switch and a fourth switch, the third switch is located in the first conductive loop, and the fourth switch is located in the second conductive loop.

6. The battery module according to claim 1, wherein the battery cell is of a winding structure;

the battery cell comprises one first electrode plate that has the first polarity and one second electrode plate that has the second polarity;

the first tab and the third tab are disposed on the first electrode plate, and the second tab is disposed on the second electrode plate; and the first electrode plate and the second electrode plate are wound to form the battery cell with three tabs, and the first tab, the second tab, and the third tab are at different positions on the battery cell.

7. The battery module according to claim 1, wherein the battery cell is of a laminated structure;

the battery cell comprises at least two first electrode plates that have the first polarity and at least two second electrode plates that have the second polarity;

a first sub-tab and a third sub-tab are disposed on each first electrode plate, and a second sub-tab is disposed on each second electrode plate; and all the first electrode plates and all the second electrode plates are laminated to form the battery cell, all the first sub-tabs are electrically connected to form the first tab, all the second sub-tabs are electrically connected to form the second tab, all the third sub-tabs are electrically connected to form the third tab, and the first tab, the second tab, and the third tab are at different positions on the battery cell.

8. The battery module according to claim 6, wherein an end that is of the first tab and that is disposed on the first electrode plate is connected to an end that is of the third tab and that is disposed on the first electrode plate.

9. A battery module, comprising:

a battery cell;

a first battery protection board; and a second battery protection board;

wherein the battery cell comprises a battery cell body, a first tab, a second tab, a third tab, and a fourth tab;

the first tab, the second tab, the third tab, and the fourth tab are separately electrically connected to the battery cell body, the first tab and the third tab have a first polarity, and the second tab and the fourth tab have a second polarity;

working together, the second tab and the first tab are capable of inputting a voltage and a current to the battery cell body or capable of outputting a voltage and a current from the battery cell body;

working together, the fourth tab and the third tab are capable of inputting a voltage and a current to the battery cell body or capable of outputting a voltage and a current from the battery cell body;

the first polarity is a positive polarity, and the second polarity is a negative polarity; or the first polarity is a negative polarity, and the second polarity is a positive polarity;

the first battery protection board comprises a first protection circuit and a first battery interface, and the second battery protection board comprises a second protection circuit and a second battery interface;

the first battery interface is separately electrically connected to the second tab and the first tab by using the first protection circuit, and wherein the first battery interface, the first tab, the battery cell body, the second tab, and the first protection circuit are a first conductive loop;

the second battery interface is separately electrically connected to the third tab and the fourth tab by using the second protection circuit, and wherein the second battery interface, the third tab, the battery cell body, the fourth tab, and the second protection circuit are a second conductive loop;

the first protection circuit is configured to detect a voltage and a current that are in the first conductive loop, and is further configured to, when the voltage or the current exceeds a first threshold range, disconnect the first conductive loop; and the second protection circuit is configured to detect a voltage and a current that are in the second conductive loop, and is further configured to, when the voltage or the current exceeds a second threshold range, disconnect the second conductive loop.

10. The battery module according to claim 9, wherein the battery cell is of a winding structure;

the battery cell body comprises one first electrode plate that has the first polarity and one second electrode plate that has the second polarity;

the first tab and the third tab are disposed on the first electrode plate;

the second tab and the fourth tab are disposed on the second electrode plate; and the first electrode plate and the second electrode plate are wound to form the battery cell body with four tabs, and the first tab, the second tab, the third tab, and the fourth tab are at different positions on the battery cell body.

11. The battery module according to claim 9, wherein the battery cell body is of a laminated structure;
the battery cell body comprises at least two first electrode plates that have the first polarity and at least two second electrode plates that have the second polarity;
a first sub-tab and a third sub-tab are disposed on each first electrode plate;
a second sub-tab and a fourth sub-tab are disposed on each second electrode plate;
all the first electrode plates and all the second electrode plates are laminated to form the battery cell body, all the first sub-tabs are electrically connected to form the first tab, all the second sub-tabs are electrically connected to form the second tab, all the third sub-tabs are electrically connected to form the third tab, and all the fourth sub-tabs are electrically connected to form the fourth tab; and
the first tab, the second tab, the third tab, and the fourth tab are at different positions on the battery cell body.

12. A charging module, comprising:
a circuit board; and
a battery module, wherein the circuit board is electrically connected to the battery module;
wherein the circuit board is configured to:
receive a first charging voltage provided by an external source, step down the first charging voltage to obtain a battery cell voltage, and output the battery cell voltage to the battery module;
wherein the battery module comprises:
a battery cell; and
a first battery protection board;
wherein the battery cell comprises a battery cell body, a first tab, a second tab, and a third tab, wherein the first tab, the second tab, and the third tab are separately electrically connected to the battery cell body, the first tab and the third tab have a first polarity, and the second tab has a second polarity;
working together, the second tab and the first tab are capable of inputting a voltage and a current to the battery cell body or capable of outputting a voltage and a current from the battery cell body;
working together, the second tab and the third tab are capable of inputting a voltage and a current to the battery cell body or capable of outputting a voltage and a current from the battery cell body;
the first polarity is a positive polarity, and the second polarity is a negative polarity; or
the first polarity is a negative polarity, and the second polarity is a positive polarity;
the first battery protection board comprises a first protection circuit, a first battery interface, and a second battery interface, and the first battery interface and the second battery interface are configured to be electrically connected to a component outside the battery module;
the first battery interface is separately electrically connected to the second tab and the first tab by using the first protection circuit, and wherein the first battery interface, the first tab, the battery cell body, the second tab, and the first protection circuit are a first conductive loop;
the second battery interface is separately electrically connected to the second tab and the third tab by using the first protection circuit, and the second battery interface, the third tab, the battery cell body, the second tab, and the first protection circuit are a second conductive loop; and
the first protection circuit is configured to detect voltages and currents that are in the first conductive loop and the second conductive loop, and configured to, when the voltages or the currents exceed a threshold range, disconnect the first conductive loop and the second conductive loop.

13. The charging module according to claim 12, wherein the circuit board comprises a first circuit board and a third circuit board;
the first circuit board comprises an interface configured to receive the first charging voltage, and the first circuit board is configured to convert the first charging voltage into a second charging voltage, and transmits to transmit the second charging voltage to the third circuit board; and
the third circuit board is electrically connected to the battery module, and configured to convert the second charging voltage into the battery cell voltage and output the battery cell voltage to the battery module.

14. An electronic device, comprising a functional circuit and the charging module according to claim 12, wherein the charging module is configured to provide an operating power supply for the functional circuit.

15. The charging module according to claim 12, wherein the ratio of the first charging voltage to the battery cell voltage is N:1; and wherein N is greater than or equal to 2.

16. The charging module according to claim 15, wherein N=4.

17. The charging module according to claim 16, wherein the circuit board comprises a voltage converter;
the voltage converter is a 4:1 charger IC and is configured to convert the first charging voltage into the battery cell voltage.

18. The charging module according to claim 16, wherein the circuit board comprises a first voltage converter and a second voltage converter;
the first voltage converter is a 2:1 charger IC and the second voltage converter is a 2:1 charger IC; and
the first voltage converter and the second voltage converter are configured to convert the first charging voltage into the battery cell voltage.

* * * * *

UNITED STATES PATENT AND TRADEMARK OFFICE
CERTIFICATE OF CORRECTION

PATENT NO. : 12,362,402 B2
APPLICATION NO. : 17/763476
DATED : July 15, 2025
INVENTOR(S) : Zhou et al.

Page 1 of 1

It is certified that error appears in the above-identified patent and that said Letters Patent is hereby corrected as shown below:

In the Claims

In Column 42, in Claim 13, Line 27, after "voltage, and" delete "transmits".

Signed and Sealed this
Twenty-sixth Day of August, 2025

Coke Morgan Stewart
*Acting Director of the United States Patent and Trademark Office*